(12) United States Patent
Rotschild et al.

(10) Patent No.: US 9,541,901 B2
(45) Date of Patent: Jan. 10, 2017

(54) VIEWER TRACKING IN A PROJECTION SYSTEM

(71) Applicant: Real View Imaging Ltd., Yokneam (IL)

(72) Inventors: Carmel Rotschild, Ganei-Tikva (IL); Aviad Kaufman, Zikhron-Yaakov (IL)

(73) Assignee: Real View Imaging Ltd., Yokneam (IL)

( * ) Notice: Subject to any disclaimer, the term of this patent is extended or adjusted under 35 U.S.C. 154(b) by 566 days.

(21) Appl. No.: 13/936,262

(22) Filed: Jul. 8, 2013

(65) Prior Publication Data

US 2013/0293939 A1    Nov. 7, 2013

Related U.S. Application Data

(63) Continuation of application No. 13/003,309, filed as application No. PCT/IL2009/000686 on Jul. 9, 2009, now Pat. No. 8,500,284.
(Continued)

(51) Int. Cl.
*G03H 1/22* (2006.01)
*G02B 27/22* (2006.01)
(Continued)

(52) U.S. Cl.
CPC ........ *G03H 1/2294* (2013.01); *G02B 27/0093* (2013.01); *G02B 27/2271* (2013.01);
(Continued)

(58) Field of Classification Search
CPC .............. G03H 1/22; G03H 2001/2223; G03H 2001/2231; G03H 2001/2236; G03H 2001/2239; G03H 2001/2242; G03H 1/26; G03H 1/2205; G03H 1/265; G06F 3/04815; G02B 27/0093; G02B 26/0816; G02B 27/225; G02B 26/10; G02B 27/10656; G02B 27/2271; G02B 27/1066
(Continued)

(56) References Cited

U.S. PATENT DOCUMENTS

| | | | |
|---|---|---|---|
| 4,339,168 A | 7/1982 | Haines | |
| 4,835,088 A | 5/1989 | Gilson | |

(Continued)

FOREIGN PATENT DOCUMENTS

| | | |
|---|---|---|
| CA | 2277653 | 1/2001 |
| CA | 2278110 | 1/2001 |

(Continued)

OTHER PUBLICATIONS

Notice of Reason for Rejection Dated Jan. 7, 2014 From the Japanese Patent Office Re. Application No. 2011-517311 and Its Translation Into English.
(Continued)

*Primary Examiner* — William C Dowling
*Assistant Examiner* — Ryan Howard

(57) ABSTRACT

Disclosed are methods and systems for displaying images, and for implementing volumetric user interfaces. One exemplary embodiment provides a system comprising: a light source; an image producing unit, which produces an image upon interaction with light approaching the image producing unit from the light source; an eyepiece; and a mirror, directing light from the image to a surface of the eyepiece, wherein the surface has a shape of a solid of revolution formed by revolving a planar curve at least 180° around an axis of revolution.

23 Claims, 16 Drawing Sheets

Related U.S. Application Data

(60) Provisional application No. 61/129,665, filed on Jul. 10, 2008.

(51) Int. Cl.

| | | |
|---|---|---|
| *G06F 3/03* | (2006.01) | |
| *G06F 3/0346* | (2013.01) | |
| *H04N 13/04* | (2006.01) | |
| *G03H 1/08* | (2006.01) | |
| *G03H 1/26* | (2006.01) | |
| *G02B 27/00* | (2006.01) | |
| *G06F 3/0481* | (2013.01) | |
| *G06F 3/01* | (2006.01) | |
| *G03H 1/02* | (2006.01) | |
| *G03H 1/04* | (2006.01) | |
| *G03H 1/00* | (2006.01) | |
| *G03H 1/30* | (2006.01) | |

(52) U.S. Cl.
CPC ....... *G02B 27/2292* (2013.01); *G03H 1/0248* (2013.01); *G03H 1/08* (2013.01); *G03H 1/0866* (2013.01); *G03H 1/2205* (2013.01); *G03H 1/2286* (2013.01); *G03H 1/265* (2013.01); *G06F 3/011* (2013.01); *G06F 3/013* (2013.01); *G06F 3/017* (2013.01); *G06F 3/0304* (2013.01); *G06F 3/0346* (2013.01); *G06F 3/04815* (2013.01); *H04N 13/0468* (2013.01); *H04N 13/0488* (2013.01); *G03H 2001/0038* (2013.01); *G03H 2001/0055* (2013.01); *G03H 2001/0061* (2013.01); *G03H 2001/0426* (2013.01); *G03H 2001/221* (2013.01); *G03H 2001/2207* (2013.01); *G03H 2001/2223* (2013.01); *G03H 2001/2231* (2013.01); *G03H 2001/2236* (2013.01); *G03H 2001/2239* (2013.01); *G03H 2001/2242* (2013.01); *G03H 2001/2271* (2013.01); *G03H 2001/2284* (2013.01); *G03H 2001/2292* (2013.01); *G03H 2001/2297* (2013.01); *G03H 2001/262* (2013.01); *G03H 2001/266* (2013.01); *G03H 2001/2655* (2013.01); *G03H 2001/303* (2013.01); *G03H 2210/20* (2013.01); *G03H 2210/30* (2013.01); *G03H 2210/32* (2013.01); *G03H 2210/36* (2013.01); *G03H 2222/20* (2013.01); *G03H 2222/22* (2013.01); *G03H 2222/33* (2013.01); *G03H 2222/52* (2013.01); *G03H 2223/24* (2013.01); *G03H 2225/60* (2013.01); *G03H 2225/61* (2013.01); *G03H 2226/02* (2013.01); *G03H 2226/04* (2013.01); *G03H 2226/05* (2013.01); *G03H 2227/02* (2013.01); *G03H 2227/03* (2013.01); *G03H 2240/61* (2013.01)

(58) Field of Classification Search
USPC .................................................... 359/32, 35
See application file for complete search history.

(56) References Cited

U.S. PATENT DOCUMENTS

| | | |
|---|---|---|
| 5,044,708 A | 9/1991 | Garcon |
| 5,189,531 A | 2/1993 | Palmer et al. |
| 5,311,335 A | 5/1994 | Crabtree |
| 5,589,957 A | 12/1996 | Aritake et al. |
| 5,594,559 A | 1/1997 | Sato et al. |
| 5,774,262 A | 6/1998 | Schwerdtner et al. |
| 5,949,557 A | 9/1999 | Powell |
| 6,031,519 A | 2/2000 | O'Brien |
| 6,061,118 A | 5/2000 | Takeda |
| 6,097,472 A | 8/2000 | Tanaka et al. |
| 6,154,211 A | 11/2000 | Kamachi et al. |
| 6,195,184 B1 | 2/2001 | Chao et al. |
| 6,409,351 B1 | 6/2002 | Ligon |
| 6,478,432 B1 | 11/2002 | Dyner |
| 6,765,566 B1 | 7/2004 | Tsao |
| 6,791,570 B1 | 9/2004 | Schwerdtner et al. |
| 6,816,291 B2 | 11/2004 | Tanaka et al. |
| 6,844,948 B2 | 1/2005 | Lieberman |
| 6,874,891 B1 | 4/2005 | Fleming |
| 7,046,272 B2 | 5/2006 | Schwerdtner |
| 7,128,420 B2 | 10/2006 | Kapellner et al. |
| 7,230,759 B2 | 6/2007 | Huang et al. |
| 7,245,408 B1 | 7/2007 | Huang et al. |
| 7,400,431 B2 | 7/2008 | Schwerdtner et al. |
| 8,395,833 B2 * | 3/2013 | Schwerdtner ........ G03H 1/2205 359/9 |
| 2001/0006426 A1 | 7/2001 | Son et al. |
| 2003/0184831 A1 | 10/2003 | Lieberman |
| 2003/0214710 A1* | 11/2003 | Takahashi ............ G02B 27/225 359/443 |
| 2003/0222869 A1 | 12/2003 | Yoshino |
| 2004/0169829 A1* | 9/2004 | Kwon ................ G02B 27/0031 353/98 |
| 2005/0264558 A1 | 12/2005 | Vesely et al. |
| 2006/0050340 A1 | 3/2006 | Schwerdtner et al. |
| 2006/0050374 A1 | 3/2006 | Slinger |
| 2006/0139711 A1* | 6/2006 | Leister ................ G03H 1/0808 359/9 |
| 2006/0152784 A1 | 7/2006 | Usami |
| 2006/0171008 A1 | 8/2006 | Mintz et al. |
| 2006/0221063 A1* | 10/2006 | Ishihara ............. G06F 3/03545 345/173 |
| 2007/0127097 A1 | 6/2007 | Tanaka et al. |
| 2010/0066662 A1 | 3/2010 | Tomisawa et al. |
| 2014/0033052 A1 | 1/2014 | Kaufman et al. |
| 2016/0077489 A1 | 3/2016 | Kaufman et al. |

FOREIGN PATENT DOCUMENTS

| | | |
|---|---|---|
| CA | 2286937 | 3/2001 |
| CA | 2474630 | 3/2001 |
| CA | 2289999 | 5/2001 |
| CA | 2435245 | 1/2005 |
| CA | 2435250 | 1/2005 |
| CN | 1517744 | 8/2004 |
| JP | 05-336549 | 12/1993 |
| JP | 07-253749 | 10/1995 |
| JP | 08-129447 | 5/1996 |
| JP | 09-068674 | 3/1997 |
| JP | 10-154052 | 6/1998 |
| JP | 10-510187 | 10/1998 |
| JP | 2000-033184 | 2/2000 |
| JP | 2001-022958 | 1/2001 |
| JP | 2001-502071 | 2/2001 |
| JP | 2001-118015 | 4/2001 |
| JP | 2002-258215 | 9/2002 |
| JP | 2003-029198 | 1/2003 |
| JP | 2003-0757770 | 3/2003 |
| JP | 2003-536297 | 12/2003 |
| JP | 2007-017558 | 1/2007 |
| JP | 2008-064950 | 3/2008 |
| JP | 2011-527760 | 11/2011 |
| WO | WO 95/14247 | 5/1995 |
| WO | WO 96/17545 | 6/1996 |
| WO | WO 01/95016 | 12/2001 |
| WO | WO 2006/027228 | 3/2006 |
| WO | WO 2008/041314 | 4/2008 |
| WO | WO 2010/004563 | 1/2010 |

OTHER PUBLICATIONS

Office Action Dated May 5, 2015 From the State Intellectual Property Office of the People's Republic of China Re. Application No. 201310336947.5 and Its Translation Into English.

Office Action and Search Report Dated Jun. 30, 2015 From the State Intellectual Property Office of the People's Republic of China Re.

(56) References Cited

OTHER PUBLICATIONS

Application No. 201310336948.X and Its Translation Into English.
Notice of Reason for Rejection Dated Dec. 2, 2014 From the Japanese Patent Office Re. Application No. 2011-517311 and Its Translation Into English.
Communication Pursuant to Article 94(3) EPC Dated Oct. 13, 2014 From the European Patent Office Re. Application No. 09787464.8.
Notice of Preliminary Rejection Dated Aug. 20, 2015 From the Korean Intellectual Property Office Re. Application No. 2014-7020075 and Its Translation Into English.
Notice of the Reason for Rejection Dated Sep. 22, 2014 From the Korean Intellectual Property Office Re. Application No. 10-2011-7002157 and Its Translation Into English.
International Preliminary Report on Patentability Dated Oct. 18, 2010 From the International Preliminary Examining Authority Re. Application No. PCT/IL2009/000686.
International Search Report and the Written Opinion Dated Oct. 16, 2009 From the International Searching Authority Re.: Application No. PCT/IL2009/000686.
Notice of Allowance Dated Apr. 3, 2013 From the US Patent and Trademark Office Re. U.S. Appl. No. 13/003,309.
Response Dated May 10, 2010 to International Search Report and the Written Opinion of Oct. 16, 2009 From the International Searching Authority Re.: Application No. PCT/IL2009/000686.
Translation of Office Action Dated Jan. 11, 2013 From the State Intellectual Property Office of the People's Republic of China Re. Application No. 200980135202.4.
Translation of Office Action Dated May 28, 2012 From the State Intellectual Property Office of the People's Republic of China Re. Application No. 200980135202.4.
CGSociety "ICT Researchers Win 'Best Emerging Technology' at SIGGRAPH 2007", CGSociety of Digital Artists, CGSociety, CGNews, 1 P., Aug. 16, 2007.
Favalora "Volumetric 3D Displays and Application Infrastructure", IEEE Computer Society, p. 37-44, Aug. 2005.
Favalora et al. "100 Million-Voxel Volumetric Display", To Be Published in: Cockpit Displays IX: Displays for Defense Applications (of the SPIE's 16th Annual International Symposium of Aerospace/Defense Sensing, Stimulation, and Controls), 13 P., Apr. 2002.
H?ussler et al. "Large Holographic Displays as an Alternative to Stereoscopic Displays", Society if Photo-Optical Instrumentation EngineersProceedings of the Conference on Stereoscopic Displays and Applications XIX, SPIE, 6803: 1-10, 2008.
Huebschman et al. "Dynamic Holographic 3-D Image Projection", Optics Express, OSA, 11(5): 437-445, Mar. 10, 2003.
Janda et al. "Holography Principles", Technical Report No. DCSE/TR-2006-08, University of West Bohemia, Pilsen, Czech Republic, 41 P., Dec. 2006.
Jones et al. "Rendering for an Interavtive 360° Light Field Display", To Appear int the ACM SIGGRAPH Conference Proceedings, p. 1-10.
Kahn et al. "Wireless Infrared Communications", Proceedings of the IEEE, 85(2): 265-298, Feb. 1997.
Leister et al. "Full-Color Interactive Holographic Projection System for Large 3D Scene Reconstruction", Society of Photo-Optical Instrumentation Engineers, Proceedings of the Conference on Emerging Liquid Crystal Technologies III, SPIE, 6911: 1-11, 2008.
Liesener et al. "Multi-Functional Optical Tweezers Using Computer-Generated Holograms", Optics Communications, Pre-Publication, 6 P., 2000.
Lucente "Interactive Three-Dimensional Holographic Displays: Seeing the Future in Depth", For Special Issue of SIGGRAPH's 'Computer Graphics', Publication on 'Current, New, and Emerging Display Systems', 17 P., May 1997.
Plesniak et al. "Reconfigurable Image Projection Holograms", Optical Engineering, 45(11): 115801-1-115801-15, Nov. 2006.
Reichelt et al. "Capabilities of Diffractive Optical Elements for Real-Time Holographic Displays", Proceedings of Conference on Practical Holography XXII: Materials and Applications, SPIE, 6912: 69120-69131, 2008.
Rosen "Computer-Generated Holograms of Images Reconstructed on Curved Surfaces", Applied Optics, 38(29): 6136-6140, Oct. 10, 1999.
Schwerdtner et al. "Large Holographic Displays for Real-Time Applications", Society of Photo-Optical Instrumentation Engineers, Proceedings of Conference on Practical Holography XXII: Materials and Applications, SPIE, 6912: 1-9, 2008.
SeeReal Technologies "Like Being There. Holography", SeeReal Technologies S.A., Product Description, 4 P.
Tao "The Generation of an Array of Nondiffractiving Beams by a Single Composite Computer Generated Hologram", Journal of Optics A: Pure and Applied Optics, 7: 40-46, 2005.
Notice of Final Rejection Dated Sep. 7, 2015 From the Korean Intellectual Property Office Re. Application No. 10-2011-7002157 and Its Translation Into English.
Office Action Dated Nov. 25, 2015 From the State Intellectual Property Office of the People's Republic of China Re. Application No. 201310336947.5 and Its Translation Into English.
Restriction Official Action Dated Dec. 30, 2015 From the US Patent and Trademark Office Re. U.S. Appl. No. 14/040,749.
Notice of Reason for Rejection Dated Feb. 12, 2016 From the Japanese Patent Office Re. Application No. 2015-062271 and Its Translation Into English.
Notice of Reason for Rejection Dated Feb. 12, 2016 From the Japanese Patent Office Re. Application No. 2015-062086 and Its Translation Into English.
Notice of Preliminary Rejection Dated Apr. 28, 2016 From the Korean Intellectual Property Office Re. Application No. 2014-7020075 and Its Translation Into English.
Office Action Dated Apr. 13, 2016 From the State Intellectual Property Office of the People's Republic of China Re. Application No. 201310336948.X and Its Summary in English.
Official Action Dated May 16, 2016 From the US Patent and Trademark Office Re. U.S. Appl. No. 14/040,749.
Translation of Office Action Dated Apr. 13, 2016 From the State Intellectual Property Office of the People's Republic of China Re. Application No. 201310336948.X.
Notice of Preliminary Rejection Dated May 1, 2015 From the Korean Intellectual Property Office Re. Application No. 2011-7002157 and Its Translation Into English.

* cited by examiner

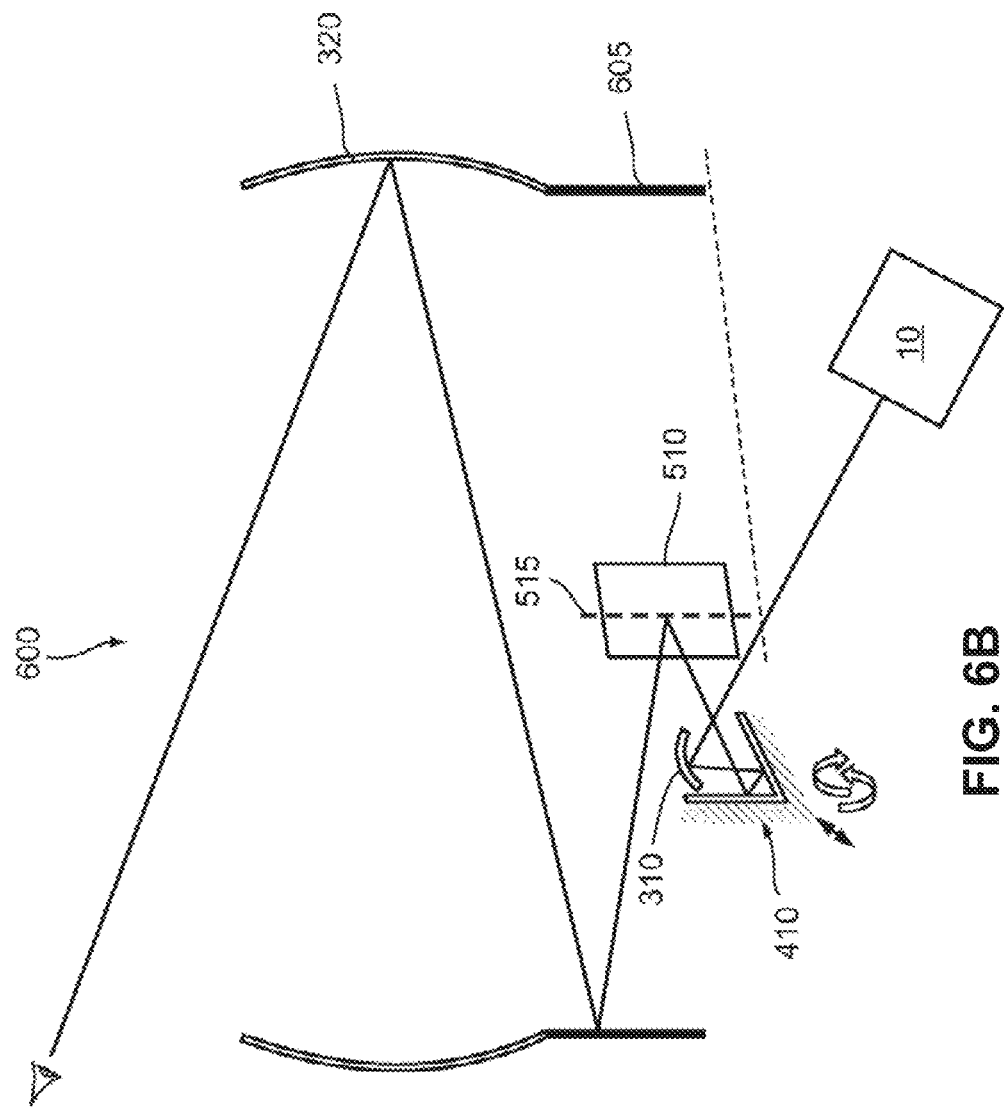

VIEWER TRACKING IN A PROJECTION SYSTEM

RELATED APPLICATIONS

This application is a continuation of U.S. patent application Ser. No. 13/003,309 filed on Jan. 10, 2011, which is a National Phase of PCT Patent Application No. PCT/IL2009/000686 filed on Jul. 9, 2009, which claims the benefit of priority under 35 U.S.C. 119(e), of U.S. Provisional Patent Application No. 61/129,665 filed on Jul. 10, 2008. The contents of which are incorporated herein by reference.

FIELD AND BACKGROUND OF THE INVENTION

The present invention, in some embodiments thereof, relates to methods and devices for displaying images and, more particularly, but not exclusively, to such methods and devices that allow seeing images from a broad viewing angle, for example, from 360° around the image.

The present invention, in some embodiments thereof, relates to a computerized user interface system, and, more particularly, but not exclusively, to a user interface system including a floating-in-the-air display.

US Patent Application Publication No. 2006-0171008 describes a three-dimensional (3D) display system. The 3D display system includes a projector device for projecting an image upon a display medium to form a 3D image. The 3D image is formed such that a viewer can view the image from multiple angles up to 360 degrees. Multiple display media are described, namely a spinning diffusive screen, a circular diffuser screen, and an aerogel. The spinning diffusive screen utilizes spatial light modulators to control the image such that the 3D image is displayed on the rotating screen in a time-multiplexing manner. The circular diffuser screen includes multiple, simultaneously-operated projectors to project the image onto the circular diffuser screen from a plurality of locations, thereby forming the 3D image. The aerogel can use the projection device described as applicable to either the spinning diffusive screen or the circular diffuser screen. While this publication sometimes calls the 3-D image a hologram, in fact, the display media taught thereby generate non-holographic 3-D images.

Some computer generated three dimensional displays are known. Some use micro-lenses on flat screens. Some include computer generated holograms which can be viewed from a relatively narrow angle.

A class of three-dimensional (3D) displays, called volumetric displays, is currently undergoing rapid advancement. The types of displays in this class include swept volume displays and static volume displays. Volumetric displays allow for three-dimensional (3D) graphical scenes to be displayed within a true 3D volume. That is, a volumetric display is not a projection of volumetric data onto a 2D display but a true physical 3D volume.

Some user interfaces display location of a user input indicator in a first, display space, translating the location of the user input from a second space, which is the input space. One example of such a user interface is a mouse, where an indicator on a computer screen moves corresponding to motions of the mouse, in which the mouse moves on a desk, in one coordinate system, and the indicator moves on the screen, in a second coordinate system.

U.S. Pat. No. 7,528,823 to Balakrishnan et al. describes a system that creates a volumetric display and a user controllable volumetric pointer within the volumetric display. The user can point by aiming a beam which is vector, planar or tangent based, positioning a device in three-dimensions in association with the display, touching a digitizing surface of the display enclosure or otherwise inputting position coordinates. The cursor can take a number of different forms including a ray, a point, a volume and a plane. The ray can include a ring, a bead, a segmented wand, a cone and a cylinder. The user designates an input position and the system maps the input position to a 3D cursor position within the volumetric display. The system also determines whether any object has been designated by the cursor by determining whether the object is within a region of influence of the cursor. The system also performs any function activated in association with the designation.

White-boarding is a term used to describe the placement of shared files on an on-screen "shared notebook" or "whiteboard". Videoconferencing and data conferencing software often includes tools that let the user mark up the electronic whiteboard much as one would with a traditional wall-mounted board. A general property of this type of software is to allow more than one person to work on the image at any one time, with the two versions being kept in sync with one another in near real time.

Haptic feedback, often referred to as simply "haptics", is the use of the sense of touch in a user interface design to provide information to an end user. When referring to mobile phones and similar devices, this generally means the use of vibrations from the device's vibration alarm to denote that a touch-screen button has been pressed. In this particular example, the phone would vibrate slightly in response to the user's activation of an on-screen control, making up for the lack of a normal tactile response that the user would experience when pressing a physical button. The resistive force that some "force feedback" joysticks and video game steering wheels provide is another form of haptic feedback.

Background art includes:
U.S. Pat. No. 6,377,238 to McPheters;
U.S. Pat. No. 7,054,045 to McPheters;
U.S. Pat. No. 7,528,823 to Balakrishnan et al;
US Published Patent Application No. 2006/0171008 of Mintz et al; and
An article titled "Overview of three-dimensional shape measurement using optical methods", by Chen F., Brown G. M., Song M., published in Opt. Eng. 39(1) 10-22 (January 2000).

SUMMARY OF THE INVENTION

The present invention, in some embodiments thereof, relates to displaying holograms to many viewers, such that each viewer sees the hologram at exactly the same place, and if touches a certain portion of the hologram, all the other viewers see, each from his own viewing angle, the image touched at the same place.

The present invention, in some embodiments thereof, relates to projecting paraxial images 360° around.

Thus, in accordance with an exemplary embodiment of the invention, there is provided a method of displaying content to multiple viewers, the method comprising:

forming multiple volumetric images, each of at least a portion of the content and each viewable from its own viewability space; and overlapping a portion of one or more of said viewability spaces with a pupil of each of the viewers.

In some embodiments, the content is a single scene; and each of said volumetric images is of a face, whether solid or partly transparent of said single scene as viewable from a different viewing point.

Optionally, a plurality of the volumetric images overlap or abut in space.

Optionally, all the volumetric images overlap in space.

Optionally, the overlap between volumetric images is full.

Optionally, the volumetric images fully overlap in space.

Optionally, volumetric images are considered to overlap if image points of one image overlap or spaced between image points of the other. Similarly, full overlap may be defined as the state when all the image points of one image overlap or are between image points of the other image. Optionally, each point in space identified by a viewer as being a part of the image is an image point.

In some embodiments of the invention, the viewers are at different azimuthal angles around the space occupied by one of the volumetric images.

Optionally, the different azimuthal angles span an entire circle, half a circle or quarter of a circle.

In some embodiments, two of the viewers are distanced from each other at least 1 meter.

In some embodiments, the viewers see the images in the same time.

Optionally, a viewability space overlaps with an eye of a viewer only for a sequence of short periods, and said short periods are timely spaced such that said viewer sees a continuous view.

The present invention, in some embodiments thereof, relates to a user interface including a floating-in-the-air display.

The term floating-in-the-air display used herein for a substrate-less display. The floating-in-the-air display is optically produced, and does not require a substrate, therefore may appear floating-in-the-air, or floating in water, or floating in a solid.

In some embodiments, the user interface allows a user to reach into the display space up to and/or into a displayed object and/or scene. The "reaching into" provides natural hand-eye coordination for the user interacting with the user interface. For example, the user is enabled to "touch" a displayed object, and the user, and optionally other viewers, see the "touching".

Where in some prior art the user manipulates an input device, such as a mouse, in one space, and views a result of the manipulation in another space, the space of the display. The user interface of the invention enables manipulating an input device and viewing the result of the manipulation in the same space.

In some embodiments, the user provides input to the user interface, and the user interface effects some change in the display, be it marking a part of the display, or causing a greater change, such as cutting apart, uncovering a layer, and so on. The user appears to have effected the change on the object itself, since the user reached into the object and appeared to have manipulated the object.

In some embodiments, sensory feedback is provided when a user appears to touch an object being displayed. Since the displayed object is floating-in-the-air and provides no resistance to touching, the user may optionally use a device for pointing, which the user interface optionally causes to provide sensory feedback when the user "touches" the displayed object.

One example method for optionally providing sensory feedback to the user when "touching" an object in the display includes evoking an artificial touch sensation, as known in the art of artificial reality, for example, by the user wearing a vibrating ring or glove. Another example method is by projecting a beam, such as infrared heat at the user's hand and/or finger such that the hand and/or finger is heated. Yet another example method includes projecting a beam of sound, for example, ultrasound, modulated to cause sensation.

Yet another example method for providing sensory feedback to the user includes visually marking the point of touch, for example, by highlighting the point of touch. It is noted that the user interface digitally defines the image displayed, therefore the user interface may optionally cause a location in the displayed image to be highlighted, to blink, to change hue, and so on.

Yet another example method for providing sensory feedback to the user is by audible feedback, such as sounding a "knock" when a pointer "touches" an object, and/or selecting from a variety of sounds for feedback, optionally dependent on which object is "touched".

The sensory feedback is to be considered as an option in suitable locations herein where "touch", "grab", and other such manipulative terms are used in describing a user interaction.

Where the term "sensory feedback" is used herein, the term is intended to mean any of the methods listed above, as well as other providing feedback to a user.

Some non-limiting examples of forms of command to the user interface system described herein include; actuating actuators on tools which are also used for interface within the display space, such as pressing a button on a pointer which is also used to reach into the display space; and voice commands.

In some embodiments, two or more user interfaces, in different locations, display the same objects and/or scene. A user in one location interacts with the user interface at that location, and all users see the interaction. Optionally, a user in another location interacts with the user interface, optionally at the same time, and all users see both interactions. This enables the above-mentioned natural hand-eye coordinated interaction between remote locations, with many examples uses. Some non-limiting examples include remote medical practice; remote teaching; remote robotic manipulation; arcade gaming; and interactive gaming. The distance by which one location mat be remote from another includes being in another room; in another building; across town; across a country; across an ocean; being two meters away; a hundred meters or more away; a kilometer or more away; and hundreds or thousands of kilometers away.

In some applications of the user interface, the floating-in-the-air display utilizes embodiments of the volumetric display described herein. In other applications of the user interface, other volumetric displays are optionally used, provided their properties support the specific application.

There is also provided by an exemplary embodiment of the invention a system for displaying content to multiple viewers, the system comprising:

a unit for generating volumetric images, each of at least a portion of the content and each viewable from its own viewability space; and an optical system, controlling a portion of one or more of said viewability spaces to overlap with a pupil of each of the viewers.

In some embodiments, a plurality of the volumetric images generated by the unit overlap in space.

Optionally, all the volumetric images generated by said unit overlap in space.

Optionally, there is a full overlap between two or more of volumetric images.

In some exemplary embodiments, the optical system comprises an azimuth determining element that determines the azimuth of at least one of said viewability spaces in respect of the volumetric image viewable from said viewability space.

Optionally, the azimuth determining element comprises a revolving mirror.

Optionally, the azimuth determining element is configured to determine the azimuth of different viewability space to differ in up to 90°, up to 180°, or up to 360°.

In some embodiments, the system comprises a time sharing control, controlling each of the viewability spaces to overlap with said pupil for only a sequence of short periods, and said short periods are timely spaced such that said viewer sees a continuous view.

Optionally, the time sharing control controls the revolution of said revolving mirror.

In accordance with an exemplary embodiment of the invention, there is provided a system comprising:
an image producing unit, producing a paraxial image; and
an optical system defining a stage and imaging said paraxial image to said stage, such that the image on the stage is viewable from a viewability space, wherein said optical system comprises an eyepiece and a mirror, the mirror being configured to direct light to the eyepiece in a plurality of different azimuthal angles, and wherein
each of said azimuthal angles determines a different location for said viewability space; and
for each of said azimuthal angles the location of the stage is the same.

In some embodiments, if one viewer touches a given point and another viewer sees the same point as being touched, the location of the stage for the two viewers is considered the same. Optionally, this allows a tolerance, in accordance with the ability of a viewer to feel differences in locations.

Optionally, the location of the stage is considered the same for all azimuthal angles if touching a point in the figure causes viewers looking from all of the azimuthal angles to see the same point touched. In this context, the point is "the same" if the viewers cannot tell a difference.

In some exemplary embodiments, the eyepiece has a light receiving surface receiving light from the paraxial image, and the said light receiving surface has a shape of a revolved curve, which resides on a plane and revolved around an axis that is out of said plane. In an exemplary embodiment of the invention, the light receiving surface is a cylinder, optionally having walls with curvature to provide image magnification. Optionally, the curvature is not symmetric up-down. Optionally or alternatively, the axis crosses the image, for example at its center.

Optionally, the shape of the light receiving surface is of the curve revolved at least 90° around the axis. For instance, if the curve is of half a circle, the surface is of quarter of a spherical shell.

Optionally, the shape of the light receiving surface is of the curve revolved 360° around the axis, such that said eyepiece defines an inner cavity. For instance, if the curve is of half a circle, the defined inner cavity is a sphere.

Optionally, the curve is an arc, making a portion of a circle.

Optionally, the curve is a parabola.

In some embodiments where the curve is an arch, the axis of revolution does not go through the arc's center. Optionally or alternatively, the axis crosses the image. Optionally, the axis crosses the image but not as a perfect vertical. Optionally or alternatively, the axis wobbles.

In some embodiments, the axis of revolution is in the curve's plane, in the middle and perpendicular to the stage.

Optionally, the curve is concave in relation to the axis of revolution.

Optionally, the curve is convex in relation to the axis of revolution.

In some exemplary embodiments, the mirror revolves around an axis. Optionally, the axis around which the mirror revolves is the axis around which said curve is revolved to obtain the shape of the inner surface of the eyepiece.

Optionally, the axis around which the mirror revolves and/or the axis around which the curve is revolved to form the shape of the inner surface, is a symmetry axis of the stage.

In some exemplary embodiments, the system comprises an optical element, and light going from the paraxial image to the mirror goes through the optical element.

Optionally, the optical element comprises a lens.

Optionally, the optical element comprises a curved mirror.

In some embodiments, the light source is inside the cavity defined by the eyepiece.

Optionally, the mirror, the image forming unit, and/or the optical element is inside the cavity.

In some embodiments, at least a portion of the optical path between the light source and the stage is inside the cavity.

In some embodiments of the invention, the image forming unit comprises a transmissive LCD.

In some embodiments of the invention, the image forming unit comprises a reflective LCD.

In some embodiments of the invention, the image forming unit comprises a spatial light modulator (SLM). Optionally, the paraxial image is a computer generated hologram (CGH).

Optionally, the paraxial image is a paraxial parallax barrier image.

Optionally, the paraxial image is a two-dimensional image.

Optionally, the paraxial image is a three-dimensional image.

Optionally, the image on the stage is volumetric. In this context, a volumetric image is an image composed of image points, which are not confined to a single plane, but rather fill a three-dimensional space. Thus, a volumetric image is an image that occupies volume, but there is nothing in the volume, except for air or the like, and light emerging from image points within the volume. Optionally, the three physical dimensions of a volumetric image are of the same order of magnitude, for instance, each of the height, breadth, and depth of the image has a measurement of between 1 cm and 20 cm, for example, 10 cm. Optionally, larger measurements are provided for one or more of the dimensions, for example, 30 cm, 50 cm, 80 cm, 100 cm or more. Optionally, this is provided using a viewer location which is inside the imaging system. In an exemplary embodiment of the invention, the diameter of the light receiving surface its height are selected to match desired viewing angles and image sizes. In an exemplary embodiment of the invention, the stage is not curved or is piecewise curved and the image forming unit and/or optics are used to compensate therefore. Optionally, the image forming unit is not at a center of the curve, so different magnifications and/or angular sizes may be generated for different viewing angles at a same distance form the system.

In exemplary embodiments, the image producing unit is configured to produce the same image to be viewed from all said different azimuthal angles. Optionally, the image is seen as being different in size from different distances. Optionally or alternatively, the image moves up or down for different viewing height angles. Alternatively, the image may be the same even if a viewer raises his head or lowers it. In an exemplary embodiment of the invention, however, the system modifies and generates the display so that any movement, distance, azimuth or height change, generates a visual effect in the beholder which is the same as if a real image was floating in space and being viewed. As noted, in some implementations, such perfect fidelity is not provided and may be, for example, degrade by not supporting one or more eye position change types. For example, a same image (rotated to fit) may be provided form any viewing angle, optionally with different views for each eye. In another example, vertical repositioning of the eyes does not provide a change in the part of image observed.

In some embodiments, the image producing unit is configured to produce different images to be viewed from different azimuthal angles. For example, the image producing unit may be configured to produce partial images of a scene, each viewable from a different angle, and the system is configured to image the partial images of the scene to be each viewable from said different angle.

In some embodiments, the mirror is inclined in respect of the axis around which the mirror revolves.

An aspect of some embodiments of the invention concerns a method of imaging a paraxial image to be seen by a viewer having a pupil in a first location and looking at a second location, the method comprising:

generating the paraxial image;

imaging the paraxial image to the location at which the viewer looks, such that an image of the paraxial image is viewable from a viewability space having a broadest portion and narrower portions;

selecting, responsive to the location of the viewer's pupil, a third location; and imaging the broadest portion of the viewability space to the selected third location. Optionally, imaging comprises imaging the paraxial image to the image viewability space, and simultaneously imaging the projector's plane to the plane of the viewer's pupil. For example, the projector in a holographic configuration is the SLM.

In an exemplary embodiment of the invention, the paraxial image is a computer generated hologram (CGH) generated with a spatial light modulator (SLM); and the image of the SLM is at the broadest portion of the viewability space.

In an exemplary embodiment, the third location is selected to overlap with the pupil of the viewer.

Optionally, the image of the CGH is viewable from a viewability space, and the third location is selected such that said viewability space overlaps with the viewer's pupil. Optionally, imaging comprises imaging the paraxial image to the image viewability space, and simultaneously imaging the projector (e.g., SLM in holographic configuration) plane to the plane of the viewer's pupil.

In some embodiment, the method comprises:

receiving an indication of the position of the viewer's pupil; and defining, responsive to said indication, a viewing porthole, inside which said pupil resides, wherein the third location is selected such that the viewability space at least partially overlaps said viewing porthole. Optionally, the third location is selected such that the viewability space overlaps the entirety of said viewing porthole.

In some embodiment, receiving an indication of the position of the viewer's pupil comprises:

receiving an indication of the location of the face of the viewer; and analyzing said indication to obtain an indication of the position of the viewer's pupil.

Optionally, imaging the SLM comprises generating an image that is larger than the SLM.

Optionally or additionally, the image of the CGH is larger than the SLM.

In some exemplary embodiments, the method comprises:

(a) imaging the SLM responsive to the location of one of the viewer's eyes; and thereafter (b) imaging the SLM responsive to the location of the other of the viewer's eyes; and repeating (a) and (b) such that the viewer sees a continuous image.

Optionally, a first CGH is projected to a first of the viewer's eyes, and a second CGH is projected to a second of the viewer's eyes.

In some embodiments, the first and second CGH are holograms of the same scene, as would be seen by the first and second eye of the viewer, had the scene was at said second location, on which the CGH is imaged.

In an exemplary embodiment, the viewer is one of a plurality of viewers having together a plurality of eyes, and the SLM is sequentially imaged, each time responsive to the location of another of said plurality of eyes, such that each viewer sees a continuous view.

Optionally, one or more of the images imaged to the second location is the same each time the SLM is imaged to overlap with an eye of the same viewer, thus showing the viewer a still or a similar (e.g., dynamic) image.

In some embodiments of the invention, the method of imaging a paraxial image to be seen by a viewer having a pupil in a first location and looking at a second location comprises:

projecting light from the SLM to a mirror; and moving said mirror to follow movements of the viewer's eye.

In some embodiments, the method comprises imaging the SLM to a revolving mirror; and revolving said revolving mirror such that the viewer sees a continuous image.

Optionally, the SLM is one of a plurality of SLMs, and images of said plurality of SLMs are projected to the same revolving mirror.

Optionally, the mirror is at a focus of a focusing element of said optical system.

Optionally, imaging is for at least 24 periods per second, each of said periods being 1-20 microseconds long.

In some embodiments, the method comprises performing eye tracking to receive an indication of the position of the viewer's pupil.

In some embodiments, receiving an indication of the position of the viewer's pupil comprises:

receiving light reflection from said viewer's eye; and analyzing said reflection to estimate the location of said viewer's eye.

Optionally, receiving an indication of the position of the viewer's pupil comprises:

receiving an indication of the position where the viewer's face is identified; and processing said indication to obtain an indication of the position of the viewer's pupil.

In some embodiments, the paraxial image is a paraxial parallax barrier image.

In some embodiments, the paraxial image is a two-dimensional image.

In some embodiments, the paraxial image is a three-dimensional image.

Optionally, the image of the paraxial image is volumetric. There is also provided by an exemplary embodiment of the invention a method of displaying a scene to a viewer looking towards a given location, the method comprising:

estimating the position of the viewer's eye;

estimating which scene-portions the viewer would have seen if the scene was at the given location in a given orientation; and imaging to the given location a computer generated hologram of only a portion of the scene, said portion comprising said estimated scene-portions, wherein imaging is such that the viewer can see the hologram.

In preferred embodiments, the imaging is in a method described above.

Optionally, the method comprises tracking the position of the viewer's eye, and imaging the computer generated hologram such that when the viewer moves he keeps seeing the hologram at said given location. In some embodiments, this is so even when the viewer moves, for example, one or two meter.

An aspect of some embodiments of the invention concerns a system for imaging a computer-generated hologram (CGH), the system comprising:

a hologram generating unit comprising a spatial light modulator (SLM);

an optical system configured to image a hologram generated by said unit to a first location and an image of the SLM to a second location; and a controller configured to control the imaging of said image of the SLM to the second location, such that the CGH is imaged to a location between the optical system and the image of the SLM. Optionally, the controller controls at least one of the optical system and the hologram generating unit.

Optionally, said controller is configured to control said optical system to generate an image of the SLM at said desired location at a desired orientation.

In some embodiments, the controller is configured to change the desired location and/or orientation online.

In some embodiments, the system includes an input for online receipt of indications of said desired location and/or orientation.

Optionally, the input comprises a receiver for receiving, from an eye-tracking unit, a signal indicative of the location of a viewer's eye, and the controller controls said optical system to project said image of the SLM to said desired location such that the viewer's eye is within a viewability space comprising said desired location.

Optionally, both eyes of the viewer are in the viewability space at the same time.

In some embodiments, the optical system comprises: an objective; an eyepiece, and an optical-length adjusting unit, controllable to adjust the optical length between the objective and the eyepiece responsive to a distance between said desired location and one or more of the eyepiece and the objective.

Optionally, the optical-length adjusting unit is configured to adjust said optical length online.

In some embodiments, the system comprises a mirror that reflects light reaching the mirror from the objective to a portion of the eyepiece, wherein the mirror is controllable to reflect said light to different portions of the eyepiece.

Optionally, the eyepiece comprises a hollow body or a transparent solid or fluid.

In some embodiments, the hollow body is shaped as a solid of revolution obtainable by revolving a parabola around an axis that passes through a center of the image.

Optionally, the hollow cylindrical body is a portion of a sphere.

Optionally, the hologram generating unit is inside said eyepiece.

In some embodiments, the system comprises a revolving mirror, revolving around a central axis of said eyepiece, at the center of the eyepiece.

Optionally, light coming to said revolving mirror from the objective is reflected towards the eyepiece.

Optionally, the light reaches the revolving mirror from the objective through one or more optical elements.

Optionally, the one or more optical elements comprises an optical-length adjusting element, controllable to adjust the optical length between the objective and the eyepiece.

Optionally, the one or more optical elements comprises an optical-light adjusting element, controllable to adjust the optical light direction with regard to elevation per specific azimuth toward the eyepiece.

An aspect of some embodiments of the invention concerns a system for imaging holograms, the system comprising:

a hollow eyepiece having an inner wall, the inner wall defining a central cavity;

a hologram generating unit, residing inside said cavity; and an objective on an optical path going from a hologram generated by said hologram generating unit to said inner wall.

Optionally, the system comprises a plurality of hologram generating units, each associated with an objective.

Optionally or alternatively, the system comprises a plurality of unit cells which optionally rotate with the viewpoint. Exemplary such cells include hologram generating unit cells and tracking cells, for example, for tracking an eye or finger or input element.

Optionally, the system is configured to create, using said eyepiece, images of holograms produced by different ones of the computer generating units at a single location.

Optionally, the single location is inside said eyepiece, optionally in the center of rotation of the eyepiece.

Optionally, the hollow eyepiece has an inner reflective surface.

In some embodiments, the shape of the inner surface is obtainable by revolving a curve residing on a first plane around an axis of revolution residing in the same plane.

Optionally, the axis of revolution is perpendicular to the middle of the stage. Alternatively, the axis is at an angle to the stage or wobbles with the rotation.

Optionally, the inner surface is shaped as a portion of a spherical shell.

In some embodiments, each of the plurality of hologram generating units comprises a spatial light modulator (SLM), and each of the plurality of unit cells comprises a light-converging objective placed with a focal point between the SLM and the hologram produced by said SLM.

Optionally, each of the plurality of unit cells has an objective, and an optical-length determining element configured to determine the optical length between said objective and the eyepiece.

Optionally, each of the optical length determining elements is controllable independently of the other optical length determining elements.

Optionally, the system comprises a revolving mirror at the center of said eyepiece, configured to receive light from the plurality of unit cells and reflect said light onto the eyepiece.

Optionally, one or more optical elements comprises an optical-light adjusting element, controllable to adjust the optical light direction with regard to elevation per specific azimuth toward the eyepiece.

According to an aspect of some embodiments of the present invention there is provided a method of floating-in-the-air image display, including providing a floating-in-the-air display device at a location, and projecting from the device one or more floating-in-the-air computer generated images, viewable over a range of angles including at least 200 arc degrees surrounding the location.

According to some embodiments of the invention, projecting includes selectively projecting over a small angle where a viewer is expected. According to some embodiments of the invention, projecting includes selectively projecting using a plurality of image generation modules. According to some embodiments of the invention, projecting includes projecting different images with a same coordinate system, in different directions. According to some embodiments of the invention, projecting includes projecting a 2D image.

According to some embodiments of the invention, projecting includes projecting image of an object such that the object's presentation angle changes with a viewing angle thereof to match an effect of moving around the object. According to some embodiments of the invention, projecting includes projecting a 3D image.

According to some embodiments of the invention, projecting includes projecting a hologram. According to some embodiments of the invention, projecting includes adjusting a projection distance of the image. According to some embodiments of the invention, projecting includes adjusting a focal distance of the image.

According to some embodiments of the invention, projecting includes projecting different images for different eyes of a same viewer. According to some embodiments of the invention, projecting includes projecting from a single point in the device. According to some embodiments of the invention, projecting includes projecting images with a shared coordinate system. According to some embodiments of the invention, projecting includes imaging the images at a location not occupied by a display substrate.

According to an aspect of some embodiments of the present invention there is provided a hologram display device projecting a floating in the air computer generated hologram simultaneously viewable over a range of viewing angles of at least 180 degrees.

According to some embodiments of the invention, the hologram shares a same coordinate set from viewing points separated by at least 20 degrees. According to some embodiments of the invention, including a hologram generating unit and at least one lens for projecting the hologram. According to some embodiments of the invention, including at least one distance control unit. According to some embodiments of the invention, including at least one hologram aiming mechanism.

According to an aspect of some embodiments of the present invention there is provided a method of displaying content to multiple viewers, the method including forming multiple volumetric images, each of at least a portion of the content and each viewable from its own viewability space, and overlapping a portion of one or more of the viewability spaces with a pupil of each of the viewers.

According to some embodiments of the invention, the viewability spaces can cover over 90 degrees.

According to some embodiments of the invention, the content is a single scene, and each of the volumetric images is of a face of the single scene as viewable from a different viewing point.

According to some embodiments of the invention, the viewers are at different azimuthal angles around the space occupied by one of the volumetric images. According to some embodiments of the invention, the different azimuthal angles span an entire circle. According to some embodiments of the invention, the different azimuthal angles span at least half a circle.

According to some embodiments of the invention, two of the viewers are distanced from each other at least 1 meter.

According to some embodiments of the invention, the viewers see the images at a same time.

According to some embodiments of the invention, a viewability space overlaps with an eye of a viewer only for a sequence of short periods, and the short periods are timely spaced such that the viewer sees a continuous view.

According to an aspect of some embodiments of the present invention there is provided a system for displaying content to multiple viewers, the system including a unit for generating volumetric images each of at least a portion of the content and each viewable from its own viewability space, and an optical system, controlling a portion of one or more of the viewability spaces with a pupil of each of the viewers.

According to an aspect of some embodiments of the present invention there is provided a system according to claim 29, wherein the optical system includes an azimuth determining element that determines the azimuth of at least one of the viewability spaces in respect of the volumetric image viewable from the viewability space.

According to an aspect of some embodiments of the present invention there is provided a system including an image producing unit, producing a paraxial image, and an optical system defining a stage and imaging the paraxial image to the stage, such that the image on the stage is viewable from a viewability space, wherein the optical system includes an eyepiece and a mirror, the mirror being configured to direct light to the eyepiece in a plurality of different azimuthal angles, and wherein each of the azimuthal angles determines a different location for the viewability space, and for each of the azimuthal angles the location of the stage is the same.

According to some embodiments of the invention, for at least two different azimuthal angles, two different elevations are provided.

According to an aspect of some embodiments of the present invention there is provided a method of imaging a paraxial image to be seen by a viewer having a pupil in a first location and looking at a second location, the method including generating the paraxial image, imaging the paraxial image to the location at which the viewer looks, such that an image of the paraxial image is viewable from a viewability space having a broadest portion and narrower portions, selecting, responsive to the location of the viewer's pupil, a third location, and imaging the broadest portion of the viewability space to the selected third location.

According to an aspect of some embodiments of the present invention there is provided a method of displaying a scene to a viewer looking towards a given location, the method including estimating the position of the viewer's eye, estimating which scene-portions the viewer would have seen if the scene was at the given location in a given orientation, and imaging to the given location a computer generated hologram of only a portion of the scene, the portion including the estimated scene-portions, wherein imaging is such that the viewer can see the hologram.

According to some embodiments of the invention, including tracking the position of the viewer's eye, and imaging the computer generated hologram such that when the viewer moves he keeps seeing the hologram at the given location.

According to an aspect of some embodiments of the present invention there is provided a system for imaging a computer-generated hologram (CGH), the system including a hologram generating unit including a spatial light modulator (SLM), an optical system configured to image a hologram generated by the unit to a first location and an image of the SLM to a second location, and a controller configured to control the imaging of the image of the SLM to the second location, such that the CGH is imaged to a location between the optical system and the image of the SLM.

According to some embodiments of the invention, the controller is configured to control the optical system to generate the image of the SLM at the desired location at a desired orientation.

According to some embodiments of the invention, the controller is configured to change the desired location and/or orientation online.

According to some embodiments of the invention, including an input for online receipt of indications of the desired location and/or orientation.

According to some embodiments of the invention, the input includes a receiver for receiving, from an eye-tracking unit, a signal indicative of the location of a viewer's eye, and the controller controls the optical system to project the image of the SLM to the desired location such that the viewer's eye is within a viewability space including the desired location.

According to some embodiments of the invention, the optical system includes an objective, an eyepiece, and an optical-length adjusting unit, controllable to adjust the optical length between the objective and the eyepiece responsive to a distance between the desired location and one or more of the eyepiece and the objective.

According to some embodiments of the invention, the optical-length adjusting unit is configured to adjust the optical length online.

According to some embodiments of the invention, including a mirror that reflects light reaching the mirror from the objective to a portion of the eyepiece, wherein the mirror is controllable to reflect the light to different portions of the eyepiece.

According to some embodiments of the invention, the eyepiece includes a hollow body. According to some embodiments of the invention, the hollow body is shaped as a solid of revolution obtainable by revolving a parabola around an axis that is not on the same plane as the parabola. According to some embodiments of the invention, the hollow cylindrical body is a portion of a sphere.

According to some embodiments of the invention, the hologram generating unit is inside the eyepiece.

According to some embodiments of the invention, including a revolving mirror, revolving around a central axis of the eyepiece.

According to some embodiments of the invention, light coming to the revolving mirror from the objective is reflected towards the eyepiece.

According to some embodiments of the invention, the light reaches the revolving mirror from the objective through one or more optical elements.

According to some embodiments of the invention, the one or more optical elements includes an optical-length adjusting element, controllable to adjust the optical length between the objective and the eyepiece.

According to an aspect of some embodiments of the present invention there is provided a system for imaging, the system including an eyepiece having an inner reflecting wall covering at least 90 degrees arc angle, and an image generating unit, residing inside the cavity, wherein the eye piece is configured to project an image from the image generation unit to one or more viewers.

According to some embodiments of the invention, the image generation unit includes at least one element which moves so as to project the image over a range of angles.

According to some embodiments of the invention, the system is configured so that the viewer is surrounded by the wall.

According to some embodiments of the invention, the eye piece is hollow, defining a cavity and wherein image generating unit includes a hologram generating unit, residing inside the cavity, and including an objective on an optical path going from a hologram generated by the hologram generating unit to the inner wall.

According to some embodiments of the invention, including a plurality of hologram generating units, each associated with an objective.

According to some embodiments of the invention, configured to create, using the eyepiece, images of holograms produced by different ones of the computer generating units at a single location.

According to some embodiments of the invention, the single location is inside the eyepiece. According to some embodiments of the invention, the hollow eyepiece has an inner reflective surface.

According to some embodiments of the invention, the shape of the inner surface is obtainable by revolving a curve residing on a first plane around an axis of revolution residing on a second plane, other than the first plane.

According to some embodiments of the invention, the axis of revolution is perpendicular to the first plane.

According to some embodiments of the invention, the inner surface is shaped as a portion of a spherical shell.

According to some embodiments of the invention, each of the plurality of hologram generating units includes a spatial light modulator (SLM), and each of the plurality of unit cells includes a light-converging objective placed with a focal point between the SLM and the hologram produced by the SLM.

According to some embodiments of the invention, each of the plurality of unit cells has an objective, and an optical-length determining element configured to determine the optical length between the objective and the eyepiece.

According to some embodiments of the invention, each of the optical length determining elements is controllable independently of the other optical length determining elements.

According to some embodiments of the invention, including a revolving mirror at the center of the eyepiece, configured to receive light from the plurality of unit cells and reflect the light onto the eyepiece.

According to some embodiments of the invention, the controller controls the optical system. According to some embodiments of the invention, the controller controls the hologram generating unit.

According to an aspect of some embodiments of the present invention there is provided a method for implementing a floating-in-the-air user interface, including displaying a first image in a display space of a first floating-in-the-air display, inserting a real object into the display space of the first floating-in-the-air display, locating a location of the real object within the display space of the first floating-in-the-air display, locating the real object in the display space, and providing the location as input to the floating-in-the-air user interface.

According to some embodiments of the invention, further including displaying a second image in the display space of the first floating-in-the-air display, based, at least in part, on the location.

According to some embodiments of the invention, the floating-in-the-air display is a volumetric display.

According to some embodiments of the invention, the second image is displayed at near real-time after the inserting the real object into the display space. According to some embodiments of the invention, the time is less than 1/24 of a second.

According to some embodiments of the invention, the first image is a blank image, and the second image includes a display of the location.

According to some embodiments of the invention, the real object is a finger.

According to some embodiments of the invention, further including displaying an actuator in the first image, moving the location of the real object substantially close to the actuator, and interpreting the location input as the real object actuating the actuator.

According to some embodiments of the invention, further including moving the location of the real object, tracking the location of the real object over time, interpreting the location input as the real object manipulating at least a part of the first image.

According to some embodiments of the invention, further including sending control commands to a robotic device based, at least in part, on the interpreting.

According to some embodiments of the invention, the real object further includes a plurality of real objects, and using the locations of each of the real objects as location inputs for the volumetric user interface.

According to some embodiments of the invention, the second image is different from the first image.

According to some embodiments of the invention, the second image is substantially equal to the first image plus an added indicator of the location input.

According to some embodiments of the invention, the location includes a location of what is substantially a point on the real object.

According to some embodiments of the invention, further including capturing a sub-image based, at least in part, on the location. According to some embodiments of the invention, the sub-image includes a voxel.

According to some embodiments of the invention, the location further includes a plurality of locations based, at least in part, on a plurality of locations of the point on the real object.

According to some embodiments of the invention, a path connecting the plurality of locations is displayed by the first floating-in-the-air display.

According to some embodiments of the invention, the plurality of locations includes two locations, and further including defining a line in three dimensions based, at least in part, on the two locations.

According to some embodiments of the invention, the plurality of locations includes three locations not in a straight line, and further including defining a plane in three dimensions based, at least in part, on the three locations.

According to some embodiments of the invention, the plurality of locations includes four locations not in a one plane, and further including defining a volume in three dimensions based, at least in part, on the four locations.

According to some embodiments of the invention, further including implementing, based, at least in part, on the plurality of locations, one function of the group of functions: zooming in on the first image, zooming out of the first image, cropping the first image, rotating the first image, slicing the first image, measuring a length within the first image, measuring an area within the first image, and measuring a volume within the first image.

According to some embodiments of the invention, further including implementing a sub-image capture based, at least in part, on the plurality of locations.

According to some embodiments of the invention, further including marking the point so as to substantially contrast with a rest of the real object.

According to some embodiments of the invention, further including the marking to be marking by a substantially compact light source.

According to some embodiments of the invention, the location includes a line defined by a long axis of the real object.

According to some embodiments of the invention, the location includes a frame corresponding to a shape of the real object.

According to some embodiments of the invention, further including the first floating-in-the-air display displaying a second image at substantially the same time as the first floating-in-the-air display displays the first image, and wherein the first image is displayed to a first user, and the second image is displayed to a second user.

According to some embodiments of the invention, the first image and the second image appear to be in a same location in space.

According to some embodiments of the invention, further including a second floating-in-the-air display displaying a second image at substantially the same time as the first floating-in-the-air display displays the first image, and wherein the first image is displayed to a first user, and the second image is displayed to a second user.

According to some embodiments of the invention, the first floating-in-the-air display is substantially remote from the second floating-in-the-air display, and further including a communication channel between the first floating-in-the-air display and the second floating-in-the-air display.

According to some embodiments of the invention, the first display and the second display are used to implement a remote medicine interaction between the first user and the second user.

According to some embodiments of the invention, the first display and the second display are used to implement a whiteboard-like collaborative sharing between the first display and the second display.

According to some embodiments of the invention, the first display and the second display are used to implement remote teaching by a user at the first floating-in-the-air display.

According to some embodiments of the invention, the first display and the second display are used to implement a game in which the first user and the second user participate.

According to some embodiments of the invention, the first display differs from the second display. According to some embodiments of the invention, the first display displays more content than the second display.

According to an aspect of some embodiments of the present invention there is provided a method for enabling a viewing of dynamically generated a floating-in-the-air displayed object and a real object in a same display space, including displaying the volumetrically displayed object on a first floating-in-the-air display, and inserting the real object into the display space of the first floating-in-the-air display.

According to some embodiments of the invention, the floating-in-the-air display is a volumetric display.

According to some embodiments of the invention, dynamically generated includes computer generated.

According to some embodiments of the invention, further including comparing the real object to at least a portion of the floating-in-the-air displayed object.

According to some embodiments of the invention, the real object includes a standard against which objects are measured, and the comparing enables a judgment of conformance to standard.

According to some embodiments of the invention, the real object is a medical device for inserting into a body, and the at least a portion of the floating-in-the-air displayed object is at least a portion of the body, generated from a three-dimensional dataset.

According to some embodiments of the invention, the comparing further includes measuring a difference in size between the real object and the at least a portion of the floating-in-the-air displayed object.

According to some embodiments of the invention, the measuring the difference in size includes at least one of the group consisting of: a difference in length, a difference in planar area, a difference in surface area, and a difference in volume.

According to an aspect of some embodiments of the present invention there is provided a method for enabling a viewing of a floating-in-the-air displayed body part from a three dimensional data set of the body and a volumetrically displayed virtual object from a three dimensional data set of one or more virtual objects, including displaying the floating-in-the-air displayed body part on a first floating-in-the-air display, and overlaying the virtual object into the display space of the first floating-in-the-air display.

According to some embodiments of the invention, the virtual object and the floating-in-the-air displayed body part are moved relative to each other in the display space of the first floating-in-the-air display.

According to some embodiments of the invention, further including comparing the virtual object to at least a portion of the body part.

According to an aspect of some embodiments of the present invention there is provided a user interface including a first floating-in-the-air display, and a first input unit adapted to accept input from a first location within a first display space, the first display space being a volume within which objects are displayed by the first floating-in-the-air display.

According to some embodiments of the invention, the floating-in-the-air display is a volumetric display. According to some embodiments of the invention, the floating-in-the-air display is a two-dimensional floating-in-the-air display.

According to some embodiments of the invention, the first floating-in-the-air display is adapted to display the first location.

According to some embodiments of the invention, further including a second floating-in-the-air display, wherein the second floating-in-the-air display displays an identical display as the first floating-in-the-air display, including displaying the first location.

According to some embodiments of the invention, further including a second input unit adapted to accept input from a second location within a second display space, the second display space being a volume within which objects displayed by the second floating-in-the-air display appear, and wherein the first floating-in-the-air display is adapted to display an identical display as the second floating-in-the-air display, including displaying the second location.

According to some embodiments of the invention, the input from the first location and the input from the second location are both displayed.

According to some embodiments of the invention, the first floating-in-the-air display is located in a different room than the second floating-in-the-air display. According to some embodiments of the invention, the first floating-in-the-air display is at least 100 meters away from the second floating-in-the-air display.

According to some embodiments of the invention, the first floating-in-the-air volumetric display is adapted to provide sensory feedback based, at least in part, on the location and on what is being displayed in the location.

According to some embodiments of the invention, the first floating-in-the-air volumetric display is adapted to display a hologram.

According to an aspect of some embodiments of the present invention there is provided a method for implementing a floating-in-the-air user interface, including displaying a first image in a display space of a first floating-in-the-air display, inserting a real object into the display space, detecting location of the real object within the display space, using the location as an input for the user interface, and highlighting the location in the display space.

According to an aspect of some embodiments of the present invention there is provided a user interface including means for displaying a floating-in-the-air display, means for accepting an input from a location within the display space, the display space being a volume within which objects displayed by the floating-in-the-air display appear.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Although methods and materials similar or equivalent to those described herein can be used in the practice or testing of embodiments of the invention, exemplary methods and/or materials are described below. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6B is a schematic presentation of the system pictorially presented in FIG. 6A;

DESCRIPTION OF SPECIFIC EMBODIMENTS OF THE INVENTION

Overview

Figure 1A:
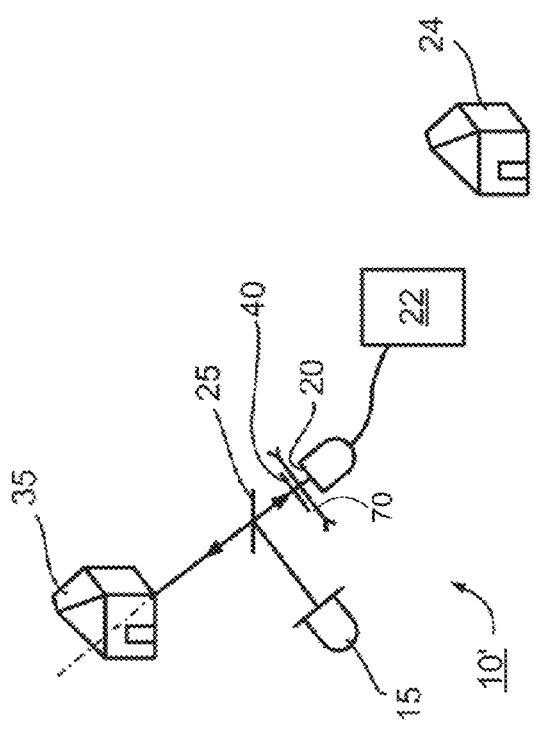
FIG. 1A is a schematic illustration of a unit for generating holograms.

The present invention, in some embodiments thereof, relates to methods and devices for displaying images and, more particularly, but not exclusively, to such methods and devices that allow viewing three-dimensional images from a broad viewing angle. Some embodiments of the invention also allow viewing two-dimensional images from a broad viewing angle.

The present invention, in some embodiments thereof, relates to a computer generated user interface and, more particularly, but not exclusively, to a floating-in-the-air user interface.

In some embodiments, a viewer can walk around a stage, and watch different faces of a scene projected on the stage, each face viewable from another viewing angle, just as when looking at the real, original, scene. For instance, a viewer walking around a hologram of the globe can see Europe, when watching the hologram from one point, America when watching the hologram from another, and so on. In some embodiments, different viewers see different data, possibly aligned to same coordinates.

Additionally or alternatively, the viewer can go back and forth, coming closer to the stage or more distant from the stage, adjusting the eye to the distance from the image similarly to focus adjustment required when looking at a real object and changing the distance thereto. In an exemplary embodiment of the invention, the display device can adjust a distance of projection according to a viewer distance, for example, over a range factor of 1.2, 2, 3, 4, or intermediate or greater factors, for example, moving a projection point distance 5 cm, 10 cm, 20 cm, 30 cm or intermediate amounts more, as needed.

Optionally, the viewer can freely walk and see the hologram from wherever he is, as long as he is looking at the stage within the systems viewing zone.

Optionally, the stage is a physical construct. Alternatively, the stage is an imagery volume in space, on which the hologram is projected and towards which the viewer is looking. A hologram on an imagery stage looks like it is floating in the air.

In some embodiments, a viewer can touch the hologram. Such viewer will not necessarily feel that his finger is touching anything, but will see his finger touching the hologram. Optionally, artificial touching feeling is evoked in the viewer, as known in the art of artificial reality, for example, by the user wearing a vibrating ring or glove or by projecting a beam of light form the system or a different location at the finger so that the finger is heated and feels the heating. Optionally or alternatively, a beam of sound, for example, ultrasound, is projected and/or modulated to cause sensation.

Optionally, only viewers that are in a viewability space of the hologram can actually view the hologram. Others, who are not within the viewability space of the hologram but are watching the stage, will see the viewer's finger, but not the hologram, which the viewer is touching. Optionally, a hologram of the same scene, as viewable from the viewing angle of each of a plurality of viewers is displayed to each of the viewers, and when one of the viewers touches the hologram all the other viewers see the finger of the first viewer touching the hologram. Optionally, all viewers see a same hologram (or other image type). Alternatively, different viewers see different images, for example, a same structure with different data thereon.

Optionally, all the viewers that see the finger touching the hologram see the finger touching the hologram at the same place (for instance, the hologram is of a doll, and all viewers see a finger touching the left eyelid of the doll).

In some embodiments, a viewer can go around a hologram and see the hologram from all sides, as if the viewer walked around a physical object. In some such embodiments, as long as the viewer's eye is within a certain space, referred to as a first viewing porthole, a first hologram is imaged to the stage, showing the scene as would have been seen from points in the first viewing porthole. Thanks to the holographic nature of the image of the first hologram, a viewer moving his eyes within a viewing porthole can detect different features of the scene from different points within the viewing porthole. Optionally, when the viewer's eye is out of the first porthole, a second porthole covering the viewer's eye is defined, and a second hologram of the scene is projected to the stage, showing the scene as would have been seen from points in the second porthole. In some embodiments, a hologram of the scene as seen from every possible porthole is continuously projected; however, these embodiments require much harder computational effort and do not necessarily improve the viewer's watching experience. In some more computation-efficient embodiments, the position of the viewer's eye (or both eyes) is estimated, a porthole is defined around it, and only a hologram of a portion of the scene that would be viewable from within the estimated porthole is projected to the stage.

In some embodiments, the viewer can manipulate the image. For example the viewer can move, rotate, scale, or otherwise manipulate the image. In some embodiments, the viewer can move the stage, instead of or in addition to moving around the stage. Additionally or alternatively, the viewer can change the portion of the scene shown on the stage. For instance, a viewer looking at a hologram of the globe can rotate the globe around an axis going through the two poles or around any other axis. Additionally or alternatively, the viewer can translate the hologram and/or the stage, zoom into the image, zoom out, and so on. In some embodiments, zoom in is not accompanied by resolution loss, because a larger hologram of the watched smaller portion is imaged at the same resolution, at which the larger portion was imaged before the viewer zoomed in.

In some embodiments of the invention, holograms of the scene as viewable from different viewing portholes are projected simultaneously, such that different viewers, looking at the stage from different viewing portholes, can simultaneously watch holograms of the scene, each from his own viewing point. Optionally, each of the viewers can walk around the stage independently of the other. Optionally, each viewer is identified, for example, based on an image of his face, based on a marker (e.g., infra-red readable marker on the face) and/or based on other identification technology, such as an RFID. Optionally, each user is shown data and/or viewing parameters personalized for the viewer, for example, distance or size may be set for a user's eyesight acuity and accommodation ability and data content per user preference (e.g., external view of object or inner view of object).

In some embodiments, different holograms, each viewable from a different viewing porthole, are sequentially projected to a single stage in a high enough frequency to allow viewers, each looking through one of the viewing portholes, to see each a different and continuous image hologram. This way, different viewers can see simultaneously and continuously different holograms, or, in some embodiments, different holographic movies, or, in some embodiments, different viewers can see simultaneously and continuously different 2D content, for instance, video or TV, on a single display, or different 3D content (non-hologramic, focal-length controlled or hologramic) optionally with a shared coordinate system.

An aspect of some embodiments of the invention relates to a method of displaying paraxial images, for example, holograms or paraxial parallax barrier images.

A paraxial image or object is one wherein each point emits light rays that span a cone with a small solid angle, typically of about 3°, and the heights of these cones are approximately parallel to each other (e.g., or otherwise matched to a rotation from vertical of a viewer's eyes). In general, an entire paraxial object or image can be seen only by a viewer that has an eye pupil that overlaps with all of these cones. If the pupil overlaps with only some of the cones, only some of the points on the paraxial image or object are viewed, those at which the overlapping cones originate. Therefore, paraxial images or objects are viewable from a relatively narrow space, referred herein as a viewability space.

In the following description, there is sometimes a reference to a semi-paraxial image. This term refers to an image wherein each point emits light rays that span a cone with a small solid angle, but the axes of these cones are not parallel to each other. In some embodiments of the invention, the cones converge at the viewabilty space, thus at the viewabilty space the entire image can be seen.

In some embodiments of the invention, a hologram is a reproduction of a light field produced by a scene. In these embodiments, a hologram of a scene seems to a human spectator identical to the scene itself. Optionally, the reproduced light field is identical to produced by the scene. Optionally, the resemblance between the original light field and the one reproduced by the hologram is in the field's phase and intensity, forming a monochromatic hologram. Alternatively, the wavelength of the emanated light is also reproduced, forming a colored hologram.

In some embodiments, a hologram is a reproduction of a Fourier transform of the scene. When such a hologram is viewed through a lens, the scene appears in the Fourier plane of the lens.

In some embodiments, a hologram is composed by a light beam, which interacts with a spatial light modulator (SLM). A spatial light modulator is a medium that has different optical behavior at different points. The term SLM is used herein to denote both a static medium with different optical behavior at different points, such as a slotted film, and a dynamic medium, having different points with controllable optical behavior. SLMs of latter kind are routinely used in the field of computerized generation of holograms. The spatial light modulator (SLM) is designed or controlled, such that a light beam interacting with the SLM (for instance, reflected from the SLM or goes through the SLM), creates a holographic reconstruction of the scene. Many ways of producing SLMs for scenes are known in the field of holography, and each of these may be used for creating a hologram to be projected or imaged according to various embodiments of the present invention. It is noted that when a non-holographic image is shown, an SLM which does not modify phase may be used (e.g., a DMD or LCD). Optionally or alternatively, a non-coherent light source may be used.

In the following, reference is made mainly to computer controlled SLMs; nevertheless, in some embodiments other SLMs, for instance, plates or films slotted as to form a static hologram, may also be utilized.

A computer controlled SLM is made of a plurality of pixels (for instance, 500×500 pixels) and the optical behavior of each pixel of the SLM may be controlled by a computer, independently of the other pixels. Such SLMs are currently commercially available from variety of sources, for instance, from Fourth Dimension Displays, London. Some commercially available SLMs are transmission based, that is, light should be transmitted through them to create the object hologram, and some reflective, that is, the light should be reflected from them to form the object hologram. One kind of reflective SLM is known in the field as LCoS.

Some embodiments are limited to dealing with still scenes. In some embodiments, the scene changes over time, like in a video motion picture. In these embodiments, the hologram optionally changes at a rate suitable for providing a sense of continuous motion. As well known from the art of cinema, this rate is about 16 or 24 views per second or higher.

In some embodiments of the invention holograms are paraxial. That is, each point in the hologram emits light rays spanning a cone having a small solid angle, typically of about 3°, and all heights of these cones are approximately parallel to each other and to the optical axis of the system that created the hologram. Paraxial holograms can be seen only by a viewer that faces them directly, looking at the direction of the optical axis. Therefore, paraxial holograms, as well as paraxial images in general, are viewable from a relatively narrow viewability space, as illustrated in FIG. 1B.

As stated above, an aspect of some embodiments of the invention relates to displaying holograms. In some embodiments of the invention, displaying a hologram comprises generating a hologram (hereinafter referred to as an object hologram) and optically creating an image of the created hologram (hereinafter referred to as an image hologram). At least some embodiments of the invention relate to displaying paraxial objects, including, but not necessarily limited to holograms. For convenience, mainly holograms are referred to below, but unless otherwise stated explicitly, other paraxial objects may be treated similarly. Images formed in embodiments of the invention from paraxial images or objects and viewed by the viewer, such as the image hologram, are optionally semi-paraxial.

An aspect of some embodiments of the invention relates to displaying images to be shown from a wide angle around the display. In some embodiments, the angle is larger than 180°, for instance, 270°, or even 360°, or intermediate angle. Optionally, the image viewed from the broad viewing angle is a hologram. Examples of images that are displayed to viewers positioned around the display include: holograms, auto-stereoscopic images, stereoscopic images, focus controlled 3D or other images (e.g., using optics to set a perceived focal distance to the image) and 2D images.

In some embodiments, displaying an object hologram comprises creating an image hologram that is different from the object hologram. For example, the image hologram may be larger than the object hologram and/or may be seen from a broader viewing angle than the object hologram.

In an exemplary embodiment, creating an image hologram viewable from a broad viewing angle involves imaging, with a single optical system, the hologram and the SLM, such that the image SLM is broader than the object SLM. Projecting the hologram and the SLM with a single optical system ensures that the image hologram is viewable from any point in the image SLM.

The image SLM does not necessarily cover the entire space from which the entire image hologram is viewable, referred herein as a viewability space.

It may be noted that a paraxial hologram is a specific kind of a paraxial object, and that other paraxial objects may also be displayed similarly. Accordingly, in some exemplary embodiments, an image of a paraxial object is created in a process comprising imaging, with a single optical system, the paraxial image, and at least a portion of a space, from which the paraxial object is viewable. Optionally, the image of the viewability space is broader than the viewability space itself. Imaging the paraxial image and its viewability space with a single optical system ensures that the image hologram is viewable from any point in the image of the viewability space.

In some embodiments, to ensure that the paraxial image is viewable by a particular viewer, it is sufficient that the viewer's pupil will overlap with a portion of the image viewability space.

In some embodiments, the viewers see and touch non-holographic three-dimensional images of a scene, for instance, 3-D parallax barrier images. However, at least in some non-holographic embodiments, each viewer has to choose between focusing on the finger and focusing on the touched point, because the finger and the touched point are not necessarily at the same focus.

In some embodiments, the viewer's eyes are tracked, and only holograms that represent the original scene as viewable from the viewing point of the viewer are projected to the stage, while images of the SLM are constantly projected to the viewer's eyes.

In some embodiments, the viewer's eyes are tracked to facilitate projecting the SLM onto the viewer's eye. At least in the embodiments where a partial overlap between the image SLM and the viewer's eye is sufficient to allow the viewer to see a full hologram, projecting larger images of the SLM allows tracking the viewer's eye less accurately. Thus, projecting a large SLM image may help in loosening the demands from the tracking system. It should be noted that while the system as a whole optionally ensures that the eye of the viewer overlaps with the image SLM, tracking is not necessarily of the eye itself. Optionally, tracking is of the face center of the viewer, and the position of the eye is deduced from the position of the face-center. Optionally, the viewer wears headphones, and headphones transmit a signal (or include a marker) indicative of the headphone's position, and the eye position is determined responsive to the headphone position. Optionally, the viewer's face is identified in an image of the space around the display, and the eye position is determined responsive to face identification. Thus, the term eye tracking as used herein means tracking any signal that is indicative of the eye's position, not necessarily tracking the eye itself. It should be noted that in some embodiments tracking signals indicative of the eye's position is much easier than tracking the eye itself, and may simplify the tracking system considerably.

In some embodiments, the image viewing space is large enough to cover both eyes of a viewer. In some embodiments, two portholes are defined, each around each eye, and a different SLM is imaged to each of the eyes. Optionally, the two different SLMs are two portions of a single SLM. Optionally, the two SLMs overlapping with the viewer's eyes create an identical image hologram, optionally, an image hologram that would be viewable from between the two eyes. Color hologram can either be projected by the same SLM with sequential lighting by red, green and blue light. Optionally, red, green and blue light can be projected in parallel to three different SLMs all synchronized mechanically to the same porthole.

Optionally, portholes overlap or abut, such that switching from one porthole to another is as smooth as going from one point to another within a single viewing porthole.

In some embodiments, the different holograms are produced sequentially in a rate that is rapid enough to allow each viewer the impression that he views a continuous image. For example, each of 3 viewers sees 30 images each second, each for a period of 1/180 seconds or shorter. When producing for two eyes and 3 viewers, 3×2 eyes=6.

In some embodiments, each viewer sees a hologram produced by a different optical system. In some embodiments, two or more viewers watch holograms produced by the same optical system. Optionally, the optical system and the SLM are repeatedly tuned to the needs of different viewers. The SLM is tuned to create holograms of the scenes currently watched by the viewers; and the optical system is tuned to project the image of the SLM to the eyes of the different viewers at their current position.

In some embodiments of particular applicative opportunities, a hologram is an image for viewing by a viewer such that the viewer can touch, for instance with his finger or a Man Machine Interface (MMI) tool, a portion of the hologram. Optionally, the hologram includes portions activated by touching.

In some embodiments, a plurality of viewers can each touch the hologram each is viewing. For instance, two viewers watch a hologram of the same house from different viewing portholes, and a finger of one of them touches the handle of the main door. In some embodiments, if the second viewer is simultaneously touching the same place (say, the same spot on the handle), each of the two viewers see the two fingers touching the holograms. Optionally, the two fingers that touch the holograms also touch each other. Optionally, image manipulation by one user is conveyed to the viewing of another user, so, for example, zoom and orientation are shared, if desired.

In some embodiments, one viewer can touch a hologram, and another viewer can walk around the hologram (or move the hologram around). This way, the walking viewer can see the hologram, together with the touching finger, from different angles. For example, a tutor can touch an arterial valve in a hologram of a heart model, and a student can walk around it and see the touched valve from different angles.

An aspect of some embodiments of the invention relates to a design of a projection system, in which an inner element generates an image or a hologram, which is then projected on the inside of an imaging mirror, which magnifies and/or aims the image or hologram to a user. Optionally, the imaging mirror is generally cylindrical and is optionally curved to provide magnification. In some embodiments, a viewer is outside the imaging mirror. In other embodiments, a viewer is inside the imaging mirror, which may be, for example, mounted on the walls of a room.

An aspect of some embodiments of the invention relates to a design of a projection system in which one or more modules generate images and are rotated to help aim the images at a viewer's eye. Optionally, the one or more modules rotate or aim at a rotating mirror. Optionally, the mirror rotates at a substantially fixed speed or oscillates at a fixed rate.

An aspect of some embodiments of the invention relates to the design of a projection system having a modular design such that each of a plurality of modules can have a line of sight to a same viewer's eye. Optionally, this shared line of sight is provided by a rotating mirror. Optionally or alternatively, the shared line of sight is provided by rotating the modules, and taking note of their position so that they can act as if they share a same coordinate system. Optionally, the modules include a plurality of image or hologram generating modules. Optionally or alternatively, the modules include at least one viewer tracking and/or user interaction module. In an exemplary embodiment of the invention, system abilities are enhanced or reduced by replacing, adding or removing modules.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
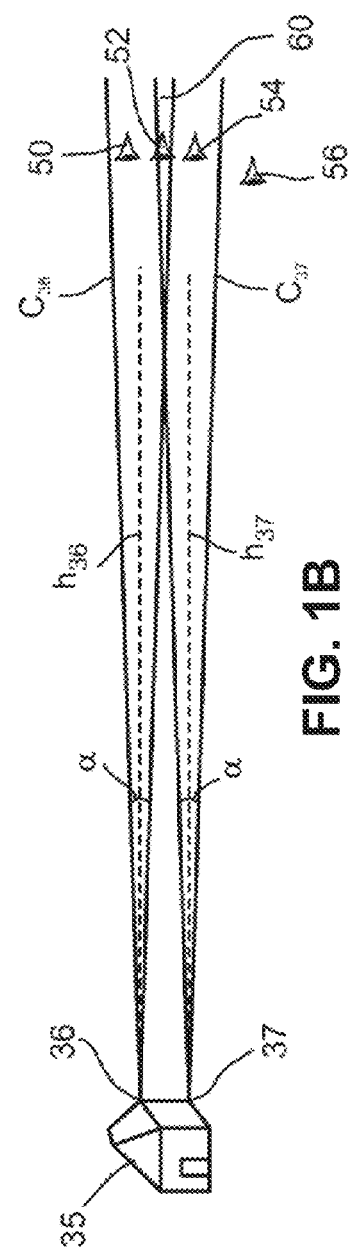
FIG. 1B is a schematic illustration of a viewability space of some points in a hologram.

Reference is now made to the construction and operation of a hologram generation unit as illustrated in FIG. 1A and to viewability space of a paraxial object as illustrated in FIG. 1B.

Exemplary Computerized Hologram Generation Unit

In an exemplary embodiment of the invention, hologram generation unit 10' comprises a light source 15, and a spatial light modulator (SLM) 20.

SLM 20 is connected to a computerized control unit 22, which controls the optical behavior of each pixel of the SLM independently of the others, such that light reflected from the SLM will reproduce the light field front emanated from a scene (24, in the illustrated case, a house). For that, light received from scene 24 is detected and data representing it is inputted into computerized unit 22, which processes the input data to obtain required optical behavior of the different pixels, and controls the SLM accordingly.

In an exemplary embodiment of the invention, light going from source 15 is deflected with polarizing beam splitter 25, passes through a quarter wavelength plate (40), goes to SLM 20, and reflected from the SLM to create hologram 35. On the way to polarizing beam splitter 25 the beam passes once again through quarter wavelength plate 40 and continues without deflection through the polarizing beam splitter.

Optionally, unit 10' also includes an optical element 70 that changes the wave front of light source 15, such that upon interaction with SLM 20 hologram 35 is larger. Optionally, lens-less magnification is used. In lens-less magnification, a spherical wave-front beam illuminates an SLM configured for producing an image from planar wave-front beam illumination. The image produced with the spherical wave front beam is scaled in relation to that produced with a planar wave-front beam. Optionally, the image produced with the spherical wave front beam is larger than that produced with a planar wave-front beam. Optionally, the system includes several lenses, and the one in use is selected to produce an object hologram of a desired size and location. Optionally, selection of the lens is part of the tuning of the optical system. Optionally, selection of the lens is part of the design of the optical system, and the selection is permanent.

The technique of lens-less magnification is described in detail, for instance, in the book "Introduction to Fourier optics" by J. W. Goodmann, published by McGraw-Hill.

Unit 10' is only one possible arrangement suitable for creating a hologram using a coherent light source and a spatial light modulator. Many other arrangements are known in the art and may be used in accordance with various embodiments of the invention. Furthermore, unit 10' may be replaced, at least in some embodiments, with units for generating non-holographic paraxial images or other image types. For easier understanding, in the following description, a unit for generating a paraxial object will be generally referred to as unit 10 to illustrate that unit 10' described above is only one possible construction of such a unit. In an exemplary embodiment of the invention, all units 10, however, have a light source and a paraxial (or other type of) image forming unit, such as SLM or Liquid Crystal (LC) panel. In embodiments where a non-hologram image is used, the display panel may be, for example, light emitting.

In one exemplary variation, if the SLM is polarization sensitive, for example, then the design may be varied, for example, such that polarized light going from source 15 is deflected by a beam splitter 25 to hit the SLM 20, and reflected from the SLM to create hologram 35. Quarter wavelength plate 40 is optionally omitted.

In a further alternative design, the light is aimed at the SLM at a slight of axis angle, so it is reflected away for the SLM at a different axis and no beam splitter is used.

In some embodiments, a transmissive SLM is used, and the light is also not reflected by a beam splitter.

Viewability Space of a Paraxial Image

FIG. 1B illustrates some principles in viewing paraxial images, such as, for instance, an object hologram 35.

As object hologram 35 is a paraxial image, each point (for example, 36, 37) in the paraxial object emits light in a single direction ($h_{36}$, $h_{37}$) and in some narrow angle ($\alpha$) around it, creating a cone ($C_{36}$, $C_{37}$). Point 36 is seen from every point within cone $C_{36}$, and point 37 is seen from every point within cone $C_{37}$. Thus, cones $C_{36}$ and $C_{37}$ are referred herein as the viewability spaces of points 36 and 37, respectively.

The two points 36 and 37 can be seen simultaneously from every point that forms part of both cone 36 and cone 37, which forms a viewability space 60, from which both points are viewable. Similarly, a space from which the entire hologram is viewable may be determined, and denoted the viewability space of hologram 35.

Thus, eye 52, which overlaps with a portion of space 60 can see both points 36 and 37, eye 54 can see point 37 but not 36, and eye 56 cannot see any of points 36 and 37.

Exemplary Optical System

Figure 2A:
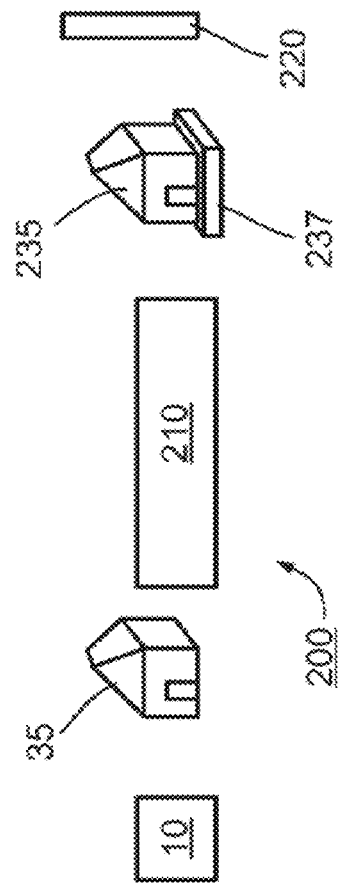
FIG. 2A is a schematic illustration of a system for imaging a hologram according to an embodiment of the invention.

FIG. 2A illustrates a basic system 200 for projecting an object hologram 35 according to an embodiment of the invention.

System 200 comprises a paraxial object generating unit 10, which is optionally a hologram generating unit, and an optical system 210. Hologram generating unit 10 generates hologram 35 (the object hologram), and optical system 210 images object hologram 35 to be seen as an image hologram 235 (the image hologram) standing on stage 237, which optionally is empty space. Optical system 210 also projects SLM 20 (the object SLM, shown in FIG. 1) to provide an image SLM 220. Image SLM 220 is optionally larger than SLM 20, and a viewer looking at image hologram 235 from any point along image 220 can see image hologram 235.

Figure 2B:
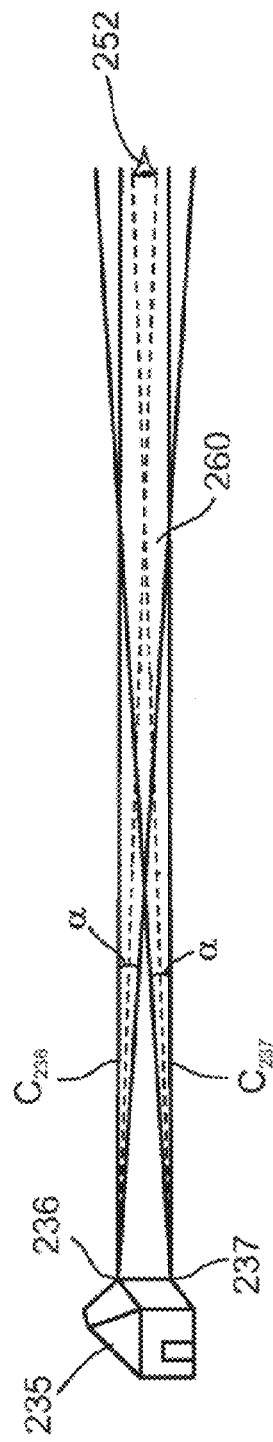
FIG. 2B is a schematic illustration of a viewability space of some points in an image hologram produced by the system of FIG. 2A.

FIG. 2B illustrates some principles in viewing a semi-paraxial image, produced by optical system 210 from a paraxial object.

Similar to the paraxial object 35 of FIG. 1B, each point (for instance, 236, 237) of semi-paraxial image 235 is viewable from a cone-like space ($C_{236}$, $C_{237}$), and both points are viewable 252 in a space 260 where cones 238 and 239 overlap. However, in difference from the paraxial object 35, the viewability spaces of the different points composing together image 235 are not parallel to each other. It is a role of optical system 210 to break the parallelism between viewability spaces of the different points, thus providing a larger and optionally closer viewability space 260. Consequently, in some embodiments, system 210 brings image hologram 235 closer to the viewer, like a telescope, but also broadens the viewability space of the hologram, from a relatively narrow space 60 illustrated in FIG. 1B to a larger viewability space 260 illustrated in FIG. 2B.

Viewability space 260 encompasses image SLM 220 (FIG. 2A); therefore, in some embodiments of the invention, optical system 210 is tuned to form image SLM 220 to overlap with an eye of the viewer. This way it may be ascertained that the image 235 is viewable to the viewer. Optionally or additionally, other portions of viewability space 260 are imaged to overlap an eye of the viewer.

Figure 3A:
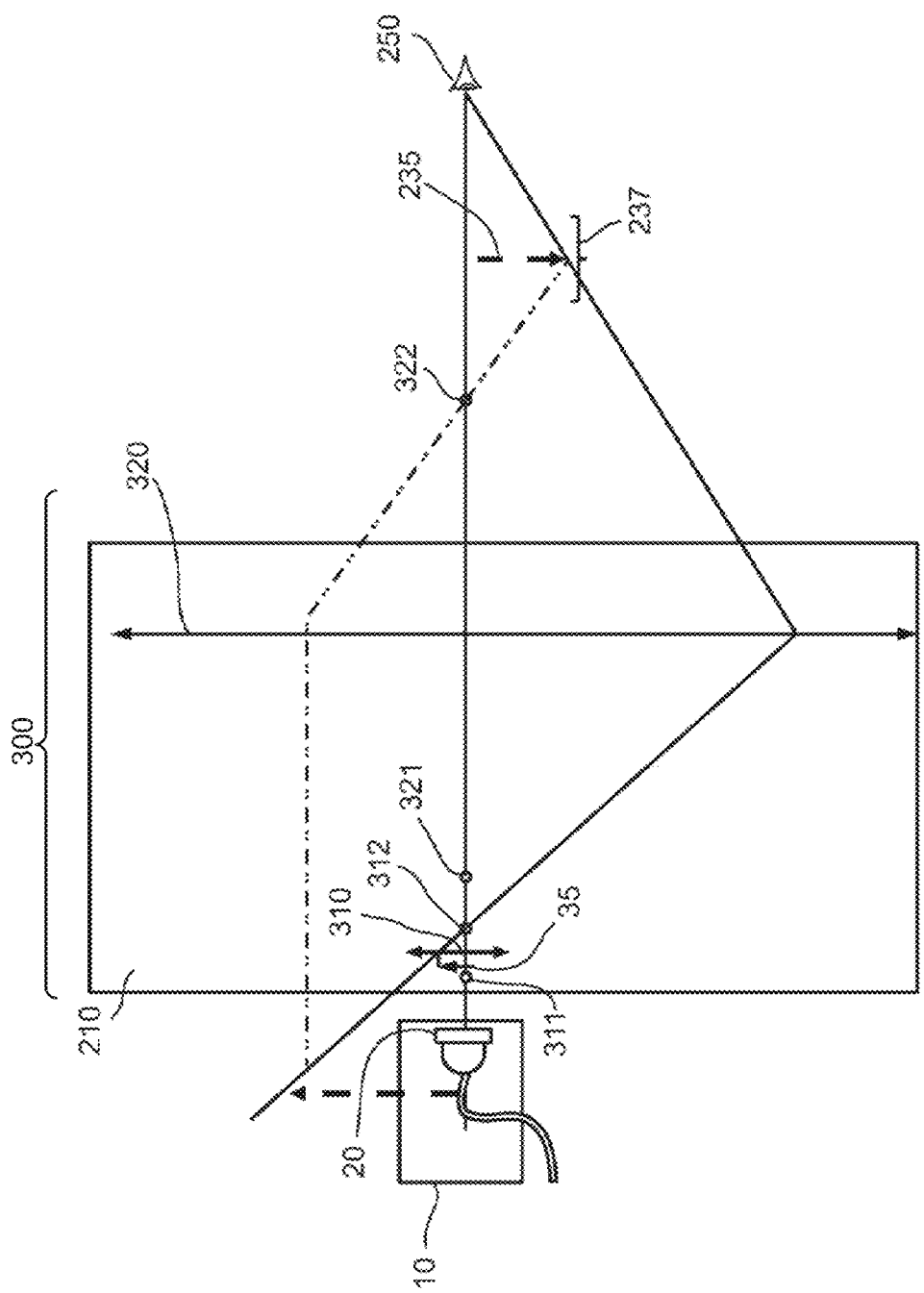
FIG. 3A is a ray tracing diagram explaining image hologram producing by a projection system according to an embodiment of the invention.
Figure 3B:
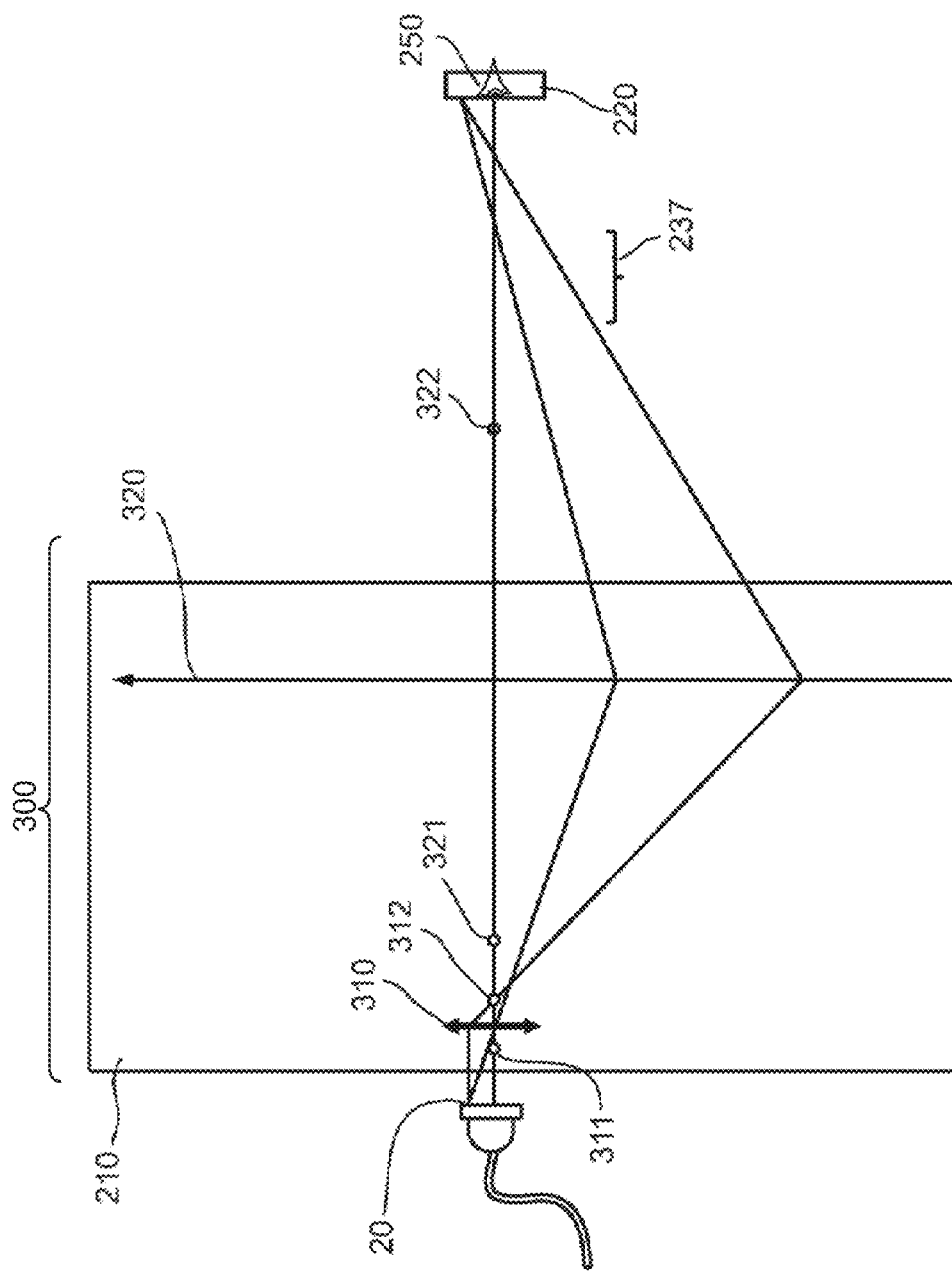
FIG. 3B is a ray tracing diagram explaining image SLM producing by the same projection system referred to in FIG. 3A.

FIGS. 3A and 3B illustrate an optional construction of an optical system (300) that allows projecting an enlarged image of the SLM (20) and an enlarged image of the hologram (35), thereby enlarging the hologram and/or broadening the space from which the hologram is viewable.

FIG. 3A shows ray tracing of light rays producing the image hologram; and FIG. 3B shows ray tracing of light rays producing the image SLM.

It should be noted, that the only requirements from system 210, in some embodiments of the invention, are: (i) to image object hologram 35 to stage 237 (ii) to image SLM 20 to a plane (or volume) out of stage 237, and (iii) to allow the exact position of said plane to be tunable. A large variety of optical architectures may accomplish this task, and a person of ordinary skill in the art may easily come up with many alternatives to the construction illustrated in FIG. 3A or 3B, once faced with the above requirements.

In both FIGS. 3A and 3B shown are hologram generating unit 10, including an SLM 20; and optical system 210, comprising an objective 310 and an eyepiece 320.

In the embodiment shown, objective 310 has two focal points: 311 and 312; and eyepiece 320 has two focal points: 321 and 322.

In the embodiment shown, objective 310 and hologram generating unit 10 are positioned such that the object hologram is produced by unit 10 between objective 310 and its focal point 311. Optical units 310 and 320 are positioned distanced from each other in more than the sum of their focal lengths, such that focal point 321 of element 320 is between element 320 and focal point 312 of element 310.

Optionally, objective 310 comprises a lens and/or a curved mirror. Optionally, eyepiece 320 comprises a lens and/or a curved mirror.

Each of objective 310 and 320 can independently be a light converging element (for instance, a concave mirror) or a light diverging element (for instance, a convex mirror).

As shown in FIG. 3A, an image hologram 235 is formed in front of viewer's eye 250, on stage 237.

As shown in FIG. 3B, an image of SLM 20 is formed at the viewer's eye 250.

Thus, FIGS. 3A and 3B together show that optical system 210 images hologram 35 to stage 237 and SLM 20 to partially overlap with the viewer's eye 250.

In an exemplary embodiment of the invention, optical system 210 is tunable to change the position at which image SLM is formed, for instance, by changing the distance between the two optical elements 310 and 320. Such a tuning might also change the position at which image hologram 235 appears. If desired, this may be compensated for by computing unit 22 (FIG. 1A), that may drive SLM 20 to form object hologram 35 in a different place without moving SLM 20.

In the embodiment shown the eyepiece is a hollow mirror, however, the eyepiece can also be a transmissive element (e.g., a lens), optionally which also changes the angle of light (e.g., a prism), so that the hologram does not overlay on the image generation system.

Optional Shapes for Objective 310

Objective 310 is optionally a mirror having a form of a paraboloid of revolution, where the axis of the revolution is a symmetry axis of the parabola. Another optional shape is a paraboloid of revolution, where the axis of the revolution is perpendicular to the symmetry axis of the parabola. Optionally, the shape of objective mirror 310 is of a spherical cap. Optionally, the shape of objective mirror 310 is of a slice of any of the above-suggested shapes. A spherical cap is optionally preferred because it is easier to manufacture, and spherical aberrations do not play a significant role in the system, because hologram 35 is paraxial.

Optionally, eyepiece 320 has any of the above shapes that the objective may have. An eyepiece with a particularly useful shape is described below, under the heading "exemplary eyepiece".

In some embodiments, objective 310 is a cylindrical mirror or an arcuate portion thereof. As noted, such a mirror may be paraboloid, rather than flat.

Exemplary Dimensions of an Optical System

In an exemplary embodiment, the setup illustrated in FIGS. 3A and 3B is used to provide an enlarged image SLM using a lens 310 having a focus length of −50 cm; and an eyepiece 320 placed 100 cm from lens 310 at a first side (in the figure, right) of lens 310. The SLM stands a few millimeters or so from lens 310, at a second side of lens 310.

The SLM receives input so as to generate the Fourier transform of the object hologram, and therefore, an object hologram is found at the focal plane of lens 310, 50 cm to the left of lens 310. The size of the object hologram is similar to that of the SLM portion used for forming the hologram.

Two images are formed by the eyepiece:

An image of the object hologram is formed 150 cm to the right of the eyepiece 320 and has the same size of the object hologram; and an image of the SLM is formed 200 cm to the right of eyepiece 320 and is three times larger than the SLM.

When the viewer's eye overlaps with the image SLM, the viewer is 50 cm from the image hologram.

This example shows one setup that creates an image hologram that has larger viewability space than that of the object hologram. The image hologram is viewable at least from anywhere at the image SLM, which is 3 times larger than the SLM, and 50 cm away of the object hologram.

In some embodiments, generating an image SLM larger than the image hologram, results in a viewability space which diverges at larger distances from the image, until it reaches the image of the SLM, and than it converges. In some such embodiments, the need to precisely track the distance of the viewer from the image is alleviated, and so is the need to project the image of the SLM exactly to the viewer's eye. However, in some such embodiments information on the distance between the viewer and the image is still helpful to estimate the size of the viewability space and determine when the viewer moves from one viewing porthole to another. Ensuring that the image SLM is at the vicinity of the viewer's eye, where the viewability space is broadest, optionally relieves the requirements from the azimuthal tracking.

Exemplary Tuning of Image SLM Locations

For displaying an image with limited viewability space to a moving viewer, the image SLM should follow the viewer's eye. Some exemplary embodiments that provides such flowing are described below.

In some of the described embodiments, changing the location of the image SLM also changes the location of the image; however, the image movement is small in comparison to the SLM movement, and can be compensated using the limited optical power of the SLM.

Figure 4:
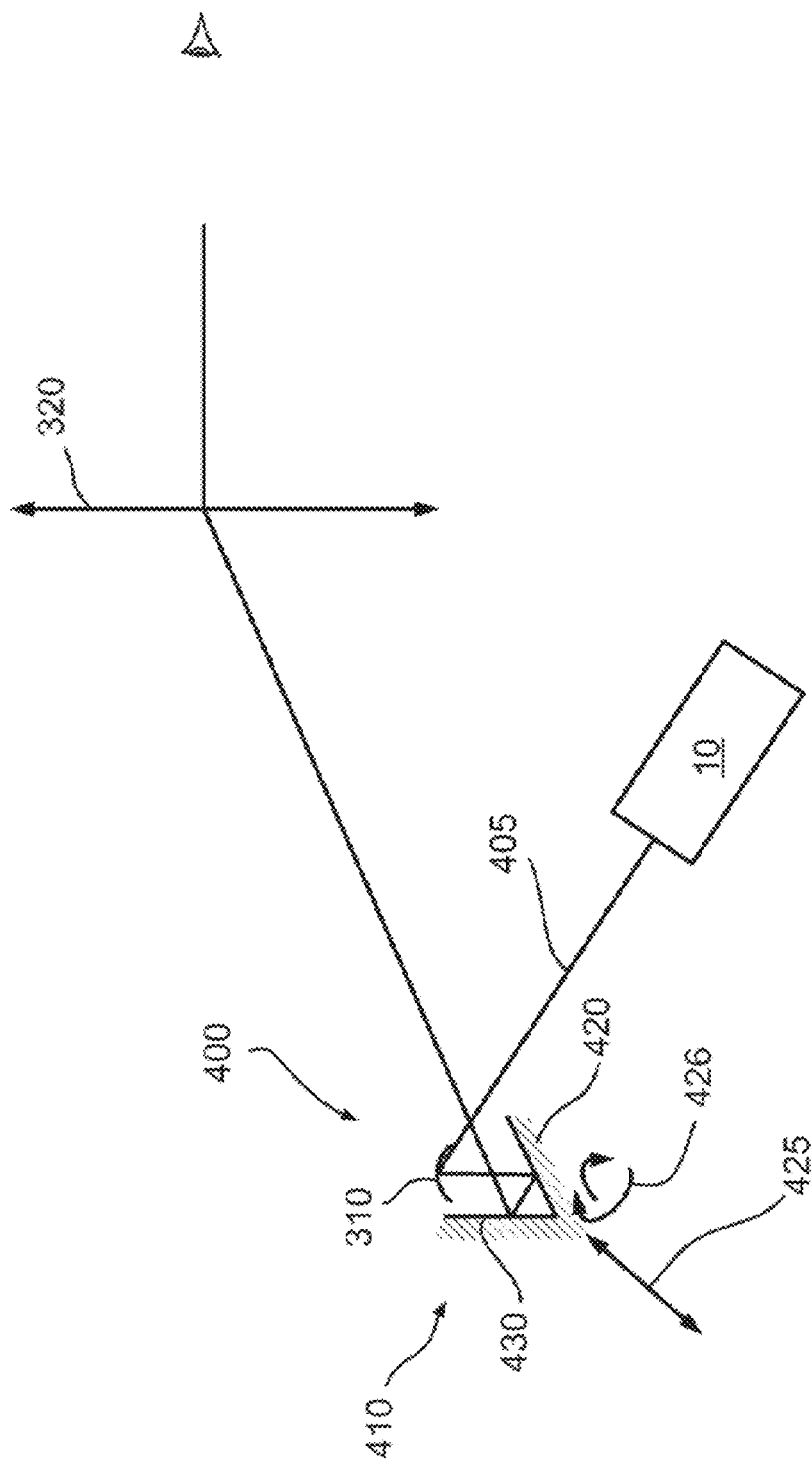
FIG. 4 is a schematic illustration of an optical system designed to allow tuning of the projections of the SLM and the hologram to desired locations according to an embodiment of the invention.

FIG. 4 is a schematic illustration of one possible structure of an optical system 400, designed to allow tuning of the projections of the SLM and the hologram to the locations of the stage and the viewer's eye, respectively.

System 400 comprises all the components of system 210, including hologram generating unit 10, objective 310 and an eyepiece 320. In the embodiment shown, objective 310 is a curved mirror and eyepiece 320 is a convex lens.

System 210 further includes a tuning unit 410, for facilitating the control of the locations to which the SLM and the hologram are projected. Tuning unit 410 is illustrated in the figure as a V-shaped mirror comprising mirroring surfaces 420 and 430, fixed at, for example, 60° from each other, but many other realizations are apparent for a skilled person.

As shown, a light ray 405 going from objective 310 to eyepiece 320 through v-shaped mirror 410 is reflected first from objective 310 to mirror 420, and from there to mirror 430, from which the light is reflected towards eyepiece 320.

Moving the mirroring surfaces 420 and 430 back and forth in the direction of arrow 425 changes the distance between eyepiece 320 and the SLM image. Thus, moving mirroring surfaces 420 and 430 along arrow 425 allows for following eyes of a viewer who moves away from the hologram or comes near the hologram along the optical axis.

Optionally, v-shaped mirror 410 is omitted, and elements 310 and/or 320 are moved in relation to each other to get a similar effect. Any other known means for changing the location of the back focal length of system 400 may be also useful to replace v-shaped mirror 410 in moving the image SLM along the optical axis.

Rotating one of the mirrors making up the v-shaped mirror 410 in the directions shown by arrows 426 (i.e. around an axis parallel to the line of contact between surfaces 420 and 430, and on the V plane allows for following the tracked eyes of a viewer looking up and down.

In an exemplary embodiment, v-shaped mirror 410 is mounted on a motor (not shown) that moves the mirrors as shown in arrows 425 and/or 426.

To follow the eyes of the viewer when they move horizontally out of the image hologram viewability space (in the figure: into the page and out of the page), lens 320 is optionally moved to face the viewer.

Optionally, controlling the position of the image hologram comprises computing and generating the holographic object such that the image hologram is generated exactly at a desired location, for instance, exactly where it is seen by another viewer.

Optionally, the optical system is tuned to generate the image SLM in the vicinity of the viewer and the computational unit computes the object hologram to be formed such that the image hologram is exactly at the desired place. Optionally, such computation is omitted, and the accuracy of the image hologram position is compromised.

Figure 5:
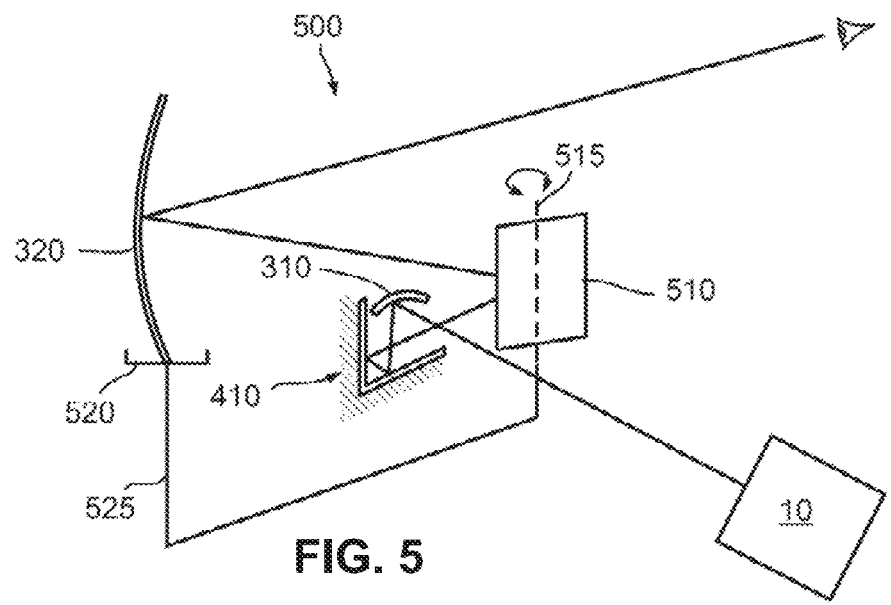
FIG. 5 is schematic illustration of a system useful for projecting a hologram to, such that the hologram has a broad viewability space in accordance with an embodiment of the invention.

FIG. 5 is a schematic presentation of a system 500, useful for showing a different hologram for each eye of a viewer. System 500 is similar to system 400, only here, there is an additional flat mirror, 510, which rotates or revolves around its axis 515.

In one embodiment, mirror 510 moves right and left in an angle of, for instance, 3 degrees, and the SLM creates one hologram in the first half of each movement and another in the second half. This way, each eye sees a different hologram. Optionally, the movement is at such a frequency, that each eye perceives the hologram projection as if it was continuous. Optionally, the central position around which the mirror moves is changed to follow the center of the viewer's face.

In another embodiment, mirror 510 revolves around its axis 515 at a frequency of at least about 15 Hz, for example, 24 Hz, 30 Hz, 45 Hz, or 60 Hz, and the SLM creates one hologram at one half of the revolution and another in the second half. Optionally, the SLM creates one hologram at a first revolution and a second hologram a second revolution. For instance, a mirror revolving at 30 Hz and an SLM updated twice per revolution may be updated at a similar rate to a mirror revolving at 60 Hz and updated once each revolution.

Switching points where the SLM changes from creating one hologram to creating another is optionally when none of the eyes overlaps with the image SLM. This optionally happens twice in each revolution: once when the image SLM is projected to between the eyes of the viewer, and once when the image SLM is projected away from the viewer's eyes.

Optionally, each eye overlaps with an image of another SLM, and each SLM changes the object hologram once per revolution, before it overlaps with the viewer's eye.

Optionally, the image SLM overlaps with both of the viewer's eyes at once.

Another difference between the embodiments shown in FIGS. 4 and 5 is that in FIG. 4 eyepiece 320 is a lens, and in FIG. 5 it is a curved mirror. However, this difference is accidental, the embodiment of FIG. 4 can work just as well with a mirror as element 320 and the embodiment of FIG. 5 can work just as well with a lens as element 320.

Optionally, eyepiece 320 is mounted on a base (520), which is rigidly connected to axis 515 with a bridge (525), such that eyepiece 320 follows the movements of flat mirror 510. In this option, eyepiece mirror 320 optionally has any of the forms suggested above for objective mirror 310, independently of the shape of object mirror 310. Another possible shape of eyepiece 320 is discussed in the context of FIGS. 6A and 6B, below.

Thus, in one embodiment, all the image forming components move together to aim at a viewer's eye. Optionally, the objective mirror moves as well and is thus less than a complete 360 degrees. Moving the objective mirror and/or the image generating module at such speeds may be energy inefficient or noisy and thus not practiced in some embodiments.

In another embodiment, mirror 510 rotates at half the angular rotation of eyepiece 320, to compensate for the doubling of angular speed caused by reflection.

Single Viewer

In an exemplary embodiment of the invention, system 500 is used for imaging a hologram to a single viewer, such that the hologram has a large image and broad viewability space.

In one embodiment, the location to which the hologram image is projected (the stage) is fixed, and the viewer is free to look at the hologram from different places, but sees the hologram from everywhere. In this embodiment, an eye of the viewer is tracked, and the viewability space of the hologram is projected to follow the eye.

Tracking the eye is, for instance, by an eye-tracking system having good enough accuracy to tell when the eye is in the hologram viewability space, and when the eye is out of said space. The tracking system may be any commercially available eye-tracking system having a suitable accuracy, for instance, TrackIR™ head tracking system, available from Natural Point based in Corvallis, Oreg., USA. Optionally, the tracking system has common parts with system 500, as will be described below.

The position of the viewer's eye, as detected by the tracking system is communicated to a computation unit, that determines how the system should be tuned to project the image SLM into the vicinity of the viewer's eye, for instance, the exact position of v-shaped mirror 410, the exact point to which mirror 510 is facing, or any other tuning required in accordance with the particular set up being used.

When the viewer's eye moves, its movement is tracked by the tracking unit, and the optical system is controlled to keep projecting the image SLM in the vicinity of the viewer's eye. This way, the viewer sees the entire hologram from wherever he is, as long as he is watching the stage.

In some embodiments, the computing unit controls the SLM to create holograms that reproduce the scene as would be seen from the viewing angle of the viewer. Optionally, the hologram is displayed using the revolving mirror all around, such that all viewers see the same hologram, no matter where they stand, and this hologram changes responsive to the movements of one of them.

Single Viewer, a Different Hologram to Each Eye

In some embodiments of the invention, the viewability space of a single hologram overlaps with the viewer's two eyes. In such embodiments, the viewer sees a full 3-D hologram, since the holographic nature of the image looked at provides all the depth cues of the original scene. These embodiments are based on image SLM that are about 6-8 cm wide, so as to cover two eyes of an adult human viewer.

In many embodiments, however, the image SLM is smaller, and has a width of about 5 to about 20 mm. In these embodiments, a single hologram can be seen only by a single eye, and presenting holograms to the two eyes requires presenting two holograms, one to each eye.

In some exemplary embodiments of the invention, the two holograms are of two different aspects of the same scene: one that would have been seen by a right eye of the viewer and the other that would have been seen by the left eye of the viewer, had the scene been on the stage. This way, the viewer can have a better depth feeling of the scene.

Single Hologram

In some embodiments, the system projects in all directions, for instance, 360° around, a single hologram. Such a system may be made simpler and less expensive than a walk-around system as described below. The system can fully function without eye-tracking and without being tuned to a particular viewer. Additional advantage of such a system is that the computation required for controlling the SLM is very simple in comparison to the computation required for providing each of a plurality of users a full holographic view.

In some embodiments, the computing unit controls the SLM to create a single hologram, which is made of two overlaid holograms. Optionally, the viewer is equipped with spectacles that filter out a different image from each eye. One such embodiment uses 2-color anaglyph, which for itself is well known in the art.

In some embodiments, a single hologram is projected such that it can be viewed from different heights. In some such embodiments, the same hologram is projected to different heights, and in each height 360° around. For example, the hologram is multiplied with prisms, such that at several different heights viewers see the same hologram.

Multiple Viewers and/or 360° Walk Around

The embodiment of FIG. 5 allows showing holograms to viewers that look at the direction of eyepiece 320. To allow the viewer to walk around the stage, or to present holograms to different viewers, viewing the stage from different places, eyepiece 320 may be made rounded as shown pictorially in FIG. 6A.

Figure 6A:
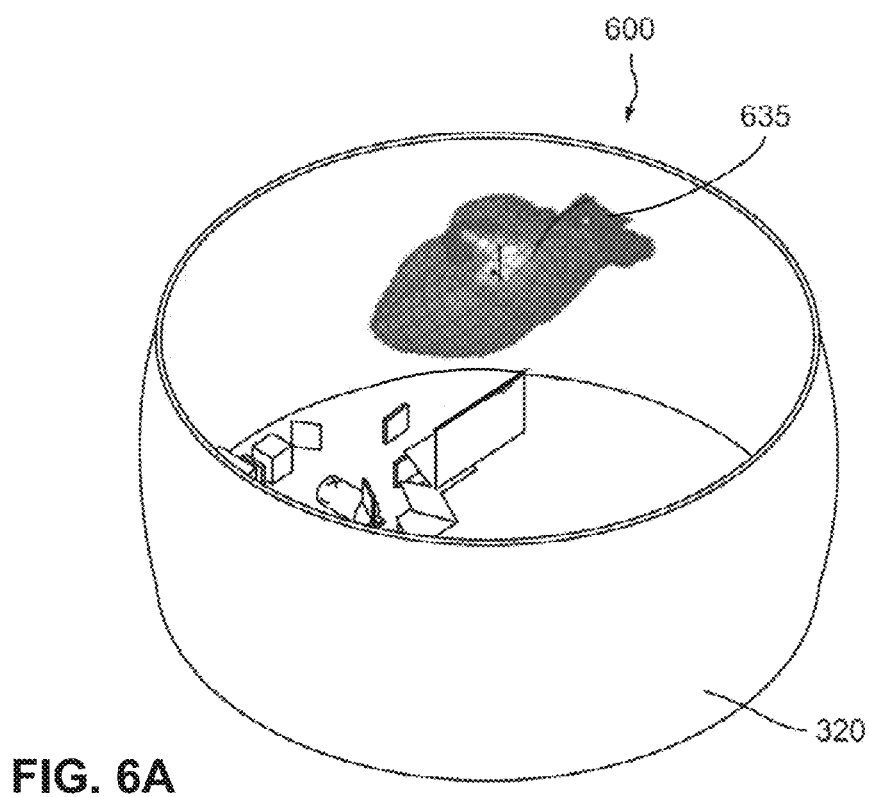
FIG. 6A is a pictorial presentation of a 360° walk-around image projection system according to an embodiment of the invention.

FIG. 6A is a pictorial presentation of a system 600 showing an image hologram (635) of a heart shown floating in the air. The figure shows mainly eyepiece 320, which optionally has an inner reflective surface shaped as a paraboloid of rotation. In this option, each vertical cross-section in eyepiece 320 has a shape of a parabola, and each horizontal cross-section has a shape of a circle. Alternatively, eyepiece 320 is a slice of sphere. Horizontal cross-sections are circles, and vertical cross-sections are circular arcs.

FIG. 6B is a schematic illustration of system 600. Eyepiece 320 is represented by two opposite vertical cross-sections of the rounded eyepiece pictorially depicted in FIG. 6A. The figure also shows a cylindrical mirror 605, used to shift the light away from the other optical elements and into eyepiece 320, such that the other optical elements don't shade eyepiece 320 from receiving reflections from the revolving mirror 510. The other optical elements shown in FIG. 6B are similar in structure and function to those shown in FIG. 4 or FIG. 5.

Figure 6C:
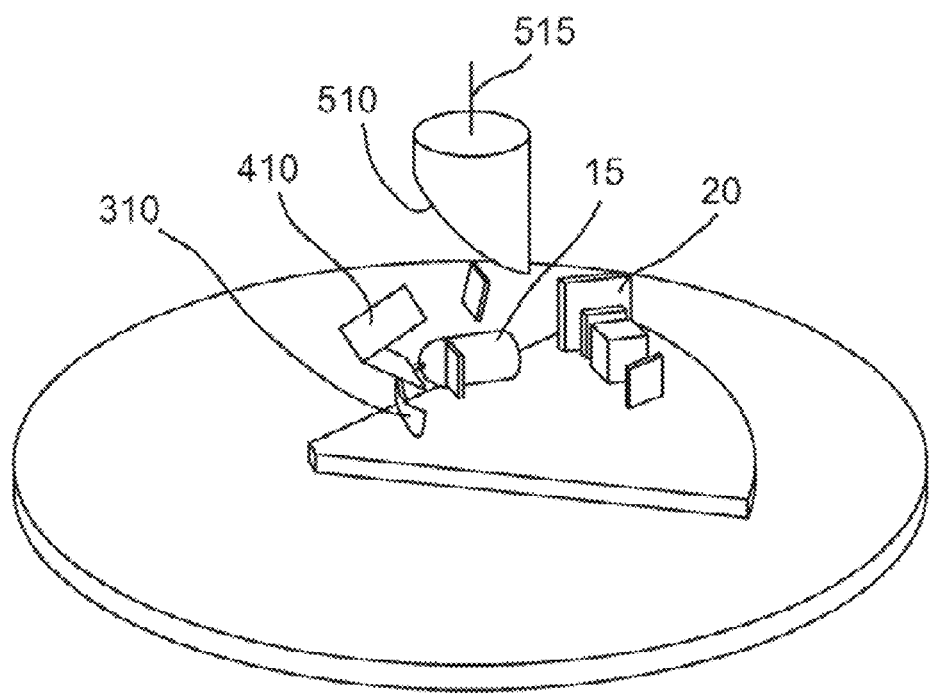
FIG. 6C is a pictorial presentation of a 360° walk-around image projection system with tilted mirror according to an embodiment of the invention.

Mirror 605 may be omitted, and the ray shifted by other means. For example, mirror 510 may be inclined in respect of the axis on which it revolves, as in FIG. 6C, which for convenience does not show eyepiece 320.

Cylindrical mirror 605 may be replaced by one or more plane mirrors.

Distortions introduced by cylindrical mirror 605 or by a plane mirror replacing mirror 605 are optionally corrected by pre-distortion of an image generated by the SLM.

It is noted that use of the mirror 605 optionally constrains a practical length of the optical path from SLM to the viewer, and omitting mirror 605 optionally removes the constraint and removes a need for pre-distortion compensating for the mirror 605.

The eyepiece 320 may be replaced by one or more plane mirrors.

Distortions introduced by eyepiece 320 are optionally corrected by pre-distortion of an image generated by the SLM.

When using plane mirror replacements for the mirror 605, and/or a plane eyepiece 320, locations where the plane mirrors abut each other are optionally not used for projecting the image. An optional encoder detects when the optical path crosses such locations and an image is not projected during that time.

Gaps may optionally be present in spatial coverage of the optical system, and an optional encoder optionally detects when the optical path crosses such gaps, and an image is not projected during that time.

Optionally, mirror 510 revolves around its axis 515 at a frequency of at least about 24 Hz, and the SLM creates a different hologram whenever the image SLM is projected to a different location, be it a different eye of the same viewer, an eye of another viewer, or the same eye of the same viewer after the viewer moved.

In some embodiments of the invention, both faces of mirror 510 are reflecting, such that in each revolution of the mirror images can be projected all around the mirror, spanning a 360° projection angle, or a smaller angle, such as above 150°, above 170°, above 180°, above 220°, above 260° or intermediate angles. Optionally, at the center of the mirror 510 there is a non-reflective point, to eliminate order 0 reflections (that is, reflections of the light source). Order 0 reflections may be similarly omitted by blocking light from reaching the center of mirror 510 or from being reflected from the center of mirror 510 by any other way.

In an exemplary embodiment of the invention, the image being viewed form the different angles is not distorted (e.g., as it would be on a flat panel display or other standard 2D imaging system).

It is noted that the methods and apparatus described herein may also be used for smaller angle displays, especially floating in the air, for example, between 10° and 150°, for example, less than 100°, less than 80°, less than 45°, less than 30° or intermediate angles.

In some embodiments, different viewers and/or different eyes are shown different types of images, for example, one eye may see a 2D image and one eye may see a 3D or hologram image. Optionally, the different images are created by different image creation modules in the system, which rotate in to place and/or whose line of sight is provided in time by a rotating flat mirror (e.g., 510).

Exemplary Light Source

In exemplary embodiments of the invention, the light source provides collimated light (and in some embodiments coherent light), so as to generate a paraxial object. Non limiting examples to collimated light sources include lasers and LEDs.

In some embodiments, a light source supplying to the eye 10-100 µW is used.

This light intensity is optionally chosen for an embodiments where the distance between revolving mirror 510 and eyepiece 320 is 1 m and the mirror revolves at 30 Hz. The considerations for choosing the above-cited light intensity may be summarized as follows:

To display an image to a viewer with such a system in lighted room, the light power at the viewer's pupil should be about 10 µW in a dark room and up to 100 µW in lighted room.

The estimation of 10 µW is based on the following considerations:

In the discussed embodiment, a light ray enters the pupil for 5 µs at each revolution. This estimation is based on the assumption that in lighted room the pupil is about 1 mm in diameter. Since the distant point of a light ray going from the mirror to the eyepiece travels, in each revolution of the mirror, 6.28 m, ($2\pi R$), and the mirror revolves 30 times per second, the distant point travels approximately 30×6.28=190 m=190,000 mm each second.

Therefore, 1 mm is scanned by the beam in $1/190,000$ sec, which is approximately 5 µsec.

To provide a clear image, 1 nanoW of light should arrive at the pupil for 50 msec.

Since the light swifts the eye during 5 µs, the system must provide all the light in 5 µsec and not in 50 msec. Thus, a power that is 10,000 larger than 1 nanoWat is required. 1 nanoWat times 10,000=10 µW.

The above estimation is suitable for displaying an image under average indoor lighting conditions. If the room is more lighted, higher light intensity is optionally supplied, for instance, light intensity that is 2, 5, or 10 times larger.

Exemplary Eyepiece

In exemplary embodiments, eyepiece 320 is a hollow body, having an optically active inner surface, for instance, a curved reflective inner surface. Optionally, the optically active inner surface is a reflective surface, for instance, of a curved mirror. Optionally, the inner surface is a surface of a lens.

Optionally, the hollow eyepiece converges light arriving from mirror 510. Optionally, hollow eyepiece 320 defines, at each point, two finite radiuses of curvature. Optionally, the two radiuses of curvature are equal to each other, as in a spherical shell.

Optionally, the reflective inner surface of the eyepiece is a closed surface. Optionally, it is an open surface, and allows viewing images from a limited viewing angle. For example, in some embodiment the eyepiece has a shape of a solid of revolution, formed by revolving a 60° arc half or ¾ of a cycle around an axis, such that the inside of the arc is generally aimed at the axis. These embodiments may allow seeing the images only from 180° or 270° around the stage, since a viewer watching the stage from a position where there is no eyepiece at the background of the stage, does not see the image, unless the eyepiece moves or is moved as it may, in some embodiments.

In some embodiments, the shape of the hollow eyepiece is of a solid of revolution formed by revolving an arc around an axis at which the concave side of the arc is generally aimed. Optionally, the distance between the axis of revolution and the arc is equal to the arc's radius. Alternatively, the distance between the axis of revolution and arch is different from the arc's radius.

In some embodiments, the hollow eyepiece has a form of a solid of revolution obtained by revolving an arc around an axis, the distance of which from the arc is different from the arc's radius.

In some embodiments, the hollow eyepiece is paraboloid, for instance, forming a portion of a paraboloid of revolution, formed by revolving a parabola around an axis perpendicular to the parabola's axis of symmetry.

Spherical eyepieces may be easier to construct than parabolic eyepieces. On the other hand, the parabolic eyepiece may be less susceptible to aberrations. However, in some embodiments the aberrations are small, or even negligible, due to the paraxial nature of the objects and images treated by the system. Optionally or alternatively, such aberrations or other aberrations in the optical system and/or viewer visualizing ability are compensated for by generating an adapted image, which provides pre-compensation.

Optionally, revolving mirror 510 is at the center of the eyepiece, directing light to different portions of the eyepiece as it revolves.

Optionally, the stage is inside the eyepiece.

Optionally, the entire optical path is inside the eyepiece.

In some embodiments, to see the image, the viewer has to look at the stage having at least a portion of the eyepiece reflective surface at site.

Optionally, the viewer looks at the eyepiece from outside.

Optionally, the viewer is inside the eyepiece, for instance, sits, stands, walks or lies down in a spherical room with a reflecting wall and/or ceiling or with an eyepiece and/or portions of an eyepiece mounted thereon. Optionally, a visual tracker images the eye piece and uses the image to determine where an image may be projected and where not and/or is used for adjusting imaging parameters, such as distance and light level. Optionally, such an eyepiece includes one or more markings, such as likes or crosses, visible by such a tracker camera or other imaging module in the display system.

Exemplary Modular Projection System

In some embodiments of the invention, two or more SLMs are used to provide different holograms to different eyes, viewers, and/or locations. For example, in one embodiment, there are two different SLMs, each dedicated to creating object holograms for one eye of a viewer. In some embodiments, each SLM creates several object holograms sequentially, for instance, up to 6 different holograms for three different viewers, one for each eye, and the revolving mirror brings each of the holograms to the stage and each of the SLM images to the eye, for view of which the hologram was generated.

Optionally, each SLM has its own optical system 210, and all the systems are co-tuned to provide the image holograms to the same stage, optionally to the very same point on the stage. This option may be advantageous, for instance, when the viewers are limited to some predefined regions, such that a full coverage of 360° is not required.

In some embodiments of the invention, two or more SLMs are used simultaneously, each with its own objective, and all with a common eyepiece and revolving mirror. It is noted that this allows overlaying the images generated by one SLM on the image generated by another SLM, even if of different type and/or color, at the viewer's eye.

Figure 7:
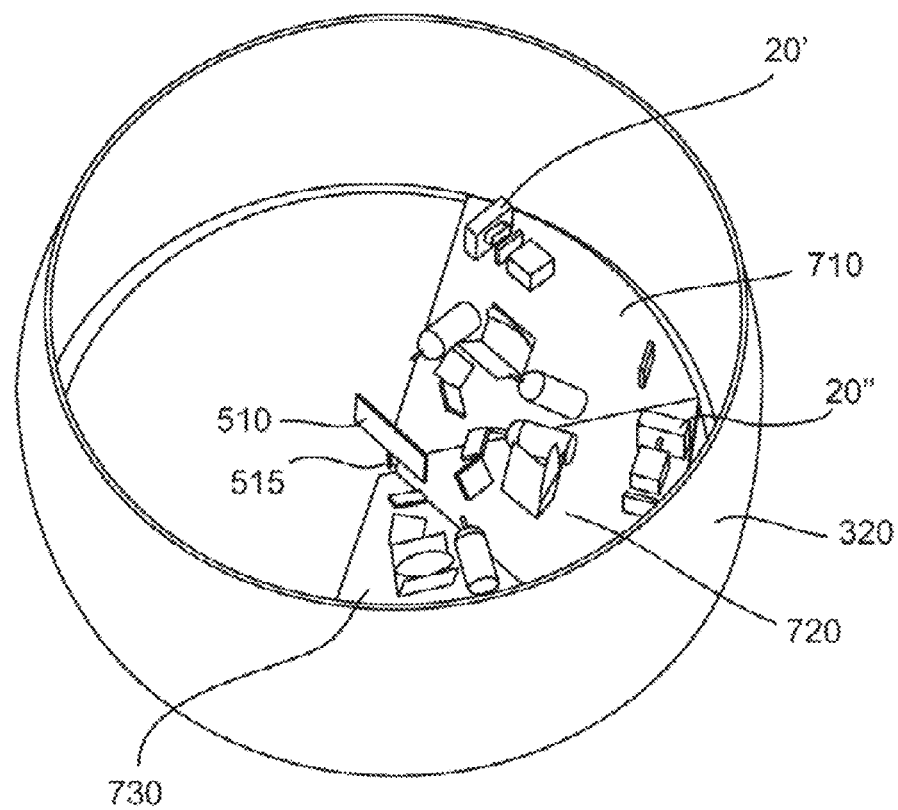
FIG. 7 is a pictorial presentation of a projection system with two optical systems having a common eyepiece 320 and a common revolving mirror according to an embodiment of the invention.

One such arrangement is depicted in FIG. 7, which is a pictorial presentation of a projection system 700, comprising two SLMs (20' and 20") having a common eyepiece 320 and a common revolving mirror 510. In the following, the parts of the projection system that are dedicated to a single SLM, including the SLM itself, is referred to as a unit cell. In FIG. 7 each unit cell is shown on its own base (710, 720, 730), allowing a modular construct of system 700.

In some embodiments, each unit cell is dedicated to generating holograms to be viewed by a different viewer or by a different plurality of viewers, associated with the unit cell. Optionally, the association of specific unit cell(s) to specific viewer(s) does not change during operation.

Optionally, the viewers sit in predetermined places, for example, in fixed chairs arranged in concentric circles around the stage. In this case adjusting the optical length, for instance with element 410, is only optional, and may sometimes be omitted. Similarly, face detection/tracking may be omitted.

Optionally, the association of a unit cell to a viewer changes in accordance with the location of the viewers. For instance, it may be convenient if switching from one viewer associated with a certain unit cell to another will not require much movement of the v-shaped mirror. However, in some embodiments, when the distance between a viewer and the stage changes, the v-shaped mirror has to move. Therefore, in some embodiments, when two viewers associated with one SLM move a part, such that one of them is much closer to the stage than another, one of the viewers is associated to another unit cell, to omit the need to repeatedly move the v-shaped mirror large distances back and forth.

360° Sit-Around Holographic TV

While the embodiments described in the previous section allow each viewer (or even each eye of each viewer) to watch a different hologram or video stream, some embodiments of the invention allow all the viewers to watch with both eyes the same hologram. This way, a lot of people can gather and have exactly the same experience, like in watching a standard TV or movie, but with holographic pictures. Although full depth feeling requires seeing a different hologram with each eye, seeing the same hologram with both eyes provides some depth feeling, which sometimes may be better than obtainable with some auto-stereo displays.

Thus, in some embodiments of the invention, a single hologram is projected for the entire duration of each cycle of the revolving mirror, and people sitting all around the stage can watch a same holographic video stream.

Such a system does not require angular tracking of the viewers' faces around the stage; knowing the viewer's distance from the stage may be sufficient.

Optionally, in a sit around configuration, the viewers sit in concentric circles around the stage, such that each group of viewers is at a different distance from the stage. Optionally, the sits are fixed, such that the distances are predetermined.

In some such embodiments, there is one unit cell dedicated to each circle of viewers, such that online optical path adjustment may be omitted.

In the present description and claims, an action is said to be taken online if it is taken when the viewer is watching. Optionally, online actions change what the viewer is seeing, the quality of the picture, and/or the orientation of the picture.

In some embodiments, the concentric sitting arrangement is utilized to presenting different viewing streams to different viewers. For instance, each circle can see a different movie. This arrangement is particularly simple, since there may be one unit cell showing each movie, and the system will show a different movie, coming from a different SLM, to the viewers sitting in each of the different circles.

Optionally, different areas of the same circle are shown different movies. It should be noted, that different content shown to different viewers can be of similar nature (for instance, two movies) or of different nature (for instance, one viewer watching a movie and another seeing a 2D stills image.

Optionally, the image projected is a 2D image, for example a conventional TV show, and the system allows the TV to be watched from up to 360 degrees around it. Optionally, different content can be projected to different areas (e.g., 2, 3, 4, 5, 6 or more different content/channels). For example, viewers watching the display from an angle of between 0° and 90° can watch the sports channel, viewers that watch the display from a viewing angle of 91° to 180° can watch the news channel and so forth. Optionally, 2D image streams are displayed, for example, using paraxial LCD displays, which may require optical manipulation as described herein, with conventionally control of the LCD. When different viewers look at different media streams, it may be preferable to provide the audio through personal headphones. It is noted that angles smaller than 360° may be supported as well, for example, 100°, 160°, 180°, 210° or smaller or larger or intermediate angles. For example, a viewing angle (effective, not necessarily instantaneous), can be, for example, at least 10°, 20°, 30°, 40°, 50° or intermediate angles. It is a particular feature of some embodiments of the invention that a small viewing angle image generator is operated to provide a wide viewing angle, for example, larger in area by a factor of at least 5, 10, 30 or 100. It is a particular feature of some embodiments of the invention, that rather than generate a hologram for all parts of a space where a viewer might be, a hologram (or other image) is calculated and/or displayed only for portions of space where a user is expected to be.

In some embodiments of the invention, a same general content (e.g., a house) is provided, but different layers of data (e.g., plumbing, electrical cabling) are provided at different angles (e.g., changes in rotation and/or azimuth). Optionally, there is a seamless change in transparency of one or more data types as the viewing angle changes.

It is a particular feature of some embodiments of the invention that a plurality of images are shown to one or more viewers substantially simultaneously, for example, within less than a second, within less than 0.1 seconds, at video rate or faster. In an exemplary embodiment of the invention, the system generates (and projects) at least 10, at least 20, at least 30, at least 40, at least 80, at least 150 or intermediate numbers of different images/holograms per second, using, for example, 1, 2, 3, 4, 5, 6 or more image generation modules.

Exemplary Dealing with Smearing

To appreciate possible smearing problems, it may be useful to consider an embodiment, where the image SLM is about 2 cm wide, the viewer is at about 1 m distance from the revolving mirror (implying about 6 m in circumference), and the revolving mirror revolves at 30 Hz. In this particular embodiment, if a single image is constantly and continuously projected, the image SLM sweeps the viewer's eye at a linear velocity of about 180 m/sec; and this sweeping might cause smearing of the hologram.

One way of dealing with such possible smearing is by activating the system only for a small portion of the time, at which the mirror directs an image SLM to the vicinity of the viewer's eye (hereinafter projection period). In the above example, the projection period is about 2 cm/6 m=1/300 of the mirror revolution period. The mirror revolution period, at 30 Hz, is 1/30 sec. Therefore, the projection period in this example is 1/9000 sec, which is about 100 μs. Activating the laser for only a small portion of this time, say, between about 1 and about 20 μs is usually reduces all the smearing. Optionally, the laser is activated several times each projection period, for example, 5 times of 2 μs activation with 18 μs non-activation in between. Optionally, the system is tuned such that in each mirror revolution, each eye is exposed to the system only once. In the above example this may be accomplished, for instance, by supplying each 80 μs a pulse with 20 μs width.

In some embodiments, the laser is activated in pulses. Additionally or alternatively, the laser light is continuous and a chopper is used to chop the light into shorter flashes.

Alternatively or additionally, the light source is shaped as a line, for instance, a vertical line that scans the SLM, for instance, horizontally. In this embodiment, each vertical illumination defines a sub-hologram, which describes the scene from a different and extremely narrow angle. The sub-hologram reaches the eye as vertical slit window. Optionally, the scanning covers the entire SLM, thus presenting to the vicinity of the eye all the SLM image, but the eye will see only one vertical slice of the SLM, the same one that falls exactly into the eye.

Figure 8:
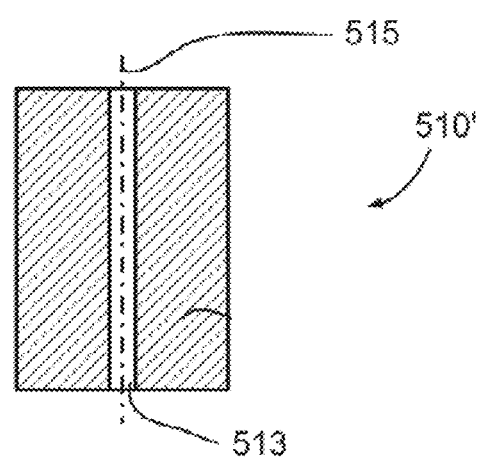
FIG. 8 is a schematic illustration of a mirror operable as a low-pass filter.

One potential way to filter out the smearing is by using a slit illumination source, using a slit 513 (see FIG. 8) in the revolving mirror 510'. The revolving mirror 510' is optionally partly reflective, and a slit 513 in the revolving mirror 510' sends light out from the mirror axis 515 to the lens 310, from there to the SLM, from there back to the lens 310, from there back to the slit 513, from there reflecting to the eyepiece 320, and to a viewer's eye.

Systems that follow a single viewer without revolving the mirror are optionally strobed conventionally to overcome smearing problems, as in such systems the smearing is less pronounced.

Exemplary Eye-Tracking Units

Eye tracking systems are well known in the art, and any such known system may be suitable for use with embodiments of the invention, as long as the tracking quality is compatible with the size of the SLM image: the tracking should be good enough to allow estimation of the position of the eye in each direction within a tolerance smaller than the size of the image viewability space in the same direction.

In an exemplary embodiment of the invention, the tracking unit provides only the position of the center of the face of the viewer and the positions of the eyes are calculated based on knowledge of the face of the viewer, or using general information on the distance between eyes of viewers. Such information may be provided for different viewing groups, for instance, children, grown-ups, etc. Knowledge may be acquired, for instance, by measuring the face of the viewer prior to tracking. Optionally, the measuring comprises standing at a known distance from the tracking unit and looking into the tracking unit. Then, the tracking unit detects the eyes of the viewer and the distance between the eyes as seen from the known distance, and uses this information to compute, during tracking, the distance between the tracking unit and the viewer, responsive to detected distance between the viewer's eyes.

In an exemplary embodiment of the invention, the tracking unit is built to inherently have the same coordinate system as the optical system. For example, one of the unit cells depicted in FIG. 7 can hold tracking unit optics.

Figure 9:
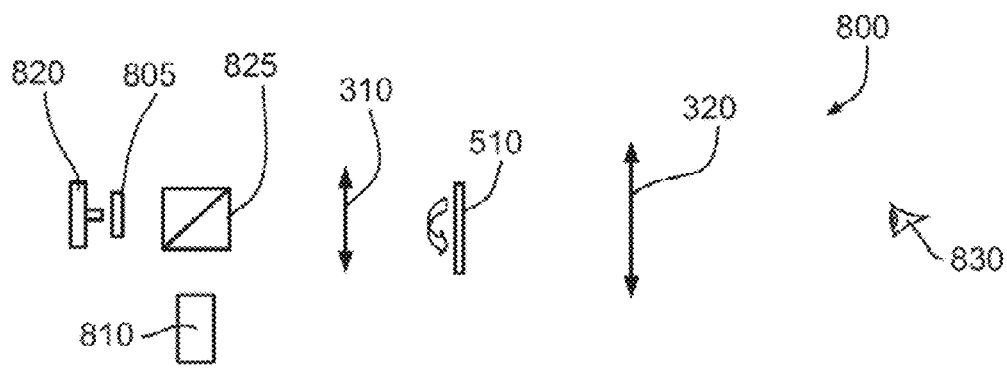
FIG. 9 is a schematic illustration of a tracking unit according to an embodiment of the invention.

FIG. 9 is a schematic illustration of an exemplary a tracking unit 800, useful in a tracking unit cell. Tracking unit 800 comprises a light source 810 and a light detector 820, positioned at the back focal length of tracking unit 800. Optionally, tracking unit 800 also comprises a filter 805, filtering out light of other wavelengths than that provided by light source 810.

The light provided by light source 810 and detected by detector 820 is of a kind selectively reflected by eyes. It is known in the art to use for such purposes infra-red light.

In an exemplary embodiment of the invention, light from Light source 810 is split by beam splitter 825, such that a portion of the light goes to detector 820 and another portion goes to the viewer's eye 830. Light reflected from eye 830 returns to the detector, and detected. This may be the case if coherent light is used for detection of interference between direct light and reflected light or if reflected light is used to provide a baseline of the instantaneous light level. In other embodiments, no light is reflected directly back to the detector, rather, only light reflected by the eyes or face (or artificial marker, such as on a hat, sticker or glasses) is reflected back to the detector In the embodiment shown, light from the beam splitter arrives at the viewer's eye through optical element 310, revolving mirror 510 and eyepiece 320, all of which were described above in detail. On the way from the viewer's eye to the IR detector, the light optionally travels through the same optical path, but in reversed order.

The direction at which the revolving mirror faces at the time reflected light is detected at detector 820 corresponds to the direction of the eye. The vertical elevation of the viewer's eye is optionally estimated based on the point at which the reflected light hits detector 820. Optionally, the elevation of the image is adjusted by optical means and/or by moving the image itself (e.g., shifting its encoding on the SLM). Optionally, different viewing directions have different elevations (e.g., for different viewer heights and/or distances).

Optionally, detecting two eyes within some predetermined distance, say, about 6.4 cm±1.5 cm, is interpreted as detection of two eyes of the same viewer.

Optionally, the distance between the viewer's eyes is measured before tracking begins, and the time difference between the signals received from the two eyes of the viewer is used for estimating the distance between the viewer and the system.

In an exemplary embodiment of the invention, detection of the eyes is adjusted to be biased towards detection (e.g., with, for example, a 10%, 30%, or 100% or intermediate or greater percentages of false detections as compared to correct detections). In an exemplary embodiment of the invention, sending an image where there is no eye has only a computational cost, possibly pre-compensated for by system component selection, while not sending an image where there is an eye can prevent the display from operating correctly.

Exemplary Adjustment of Holograms

When a viewer is watching an object while walking around the object, the viewer sees different faces of the object from each point.

A hologram displayed according to some embodiments of the present invention provides a similar effect without any adjustment of the optical system or the hologram generating unit. In other words, display of a single holographic frame provides a full walking around experience. However, this is limited to walking around keeping the eye within the borders of the hologram viewability space.

In some embodiments, when the viewer moves around, such that the eye is outside the image viewability space, the optical system is adjusted to follow the eyes, but the hologram displayed to the viewer does not change. In these embodiments, a viewer walking around a hologram of the globe, sees Europe, for instance, all the time no matter where he is standing. Optionally, in such an embodiment, instead of flowing the viewer's eyes, the system simply makes available the same hologram all around.

In some exemplary embodiments, when a viewer moves, the scene displayed to him is updated, such that when moving around a holograph of the globe, the viewer can see different continents. Optionally, this is achieved by updating the displayed hologram whenever the viewer's eye is tracked to be moving outside of the viewability space of the image hologram. The system estimates which portion of the object the viewer would have seen if the real object was on the stage, and presents on the stage a hologram of this portion.

Projecting each time a hologram of only that part of the scene viewable by the viewer allows saving a lot of computation power, without compromising the quality of image seen by the viewer.

In some embodiments of the invention, the scene itself changes over time. In one particular example, the scene is a video stream. In such case, the hologram is to be adjusted even if the viewer's eye doesn't move. Optionally, such adjustments are carried out about 24 times per second, as it is well known in the art that in such a frequency, the human mind sees a fluent movement.

Optionally, when showing a hologram of a video stream, each time the hologram is adjusted (i.e. a hologram of another "frame" of the video stream is displayed), the system is updated with regard to the eye position of the viewer, and projects only those portions of the frame that would be viewable to the viewer from the viewer's current viewing point. For example, this allows a viewer watching a movie of a basketball game to change seats and see the game from different angles.

Exemplary System and Control

Figure 10:
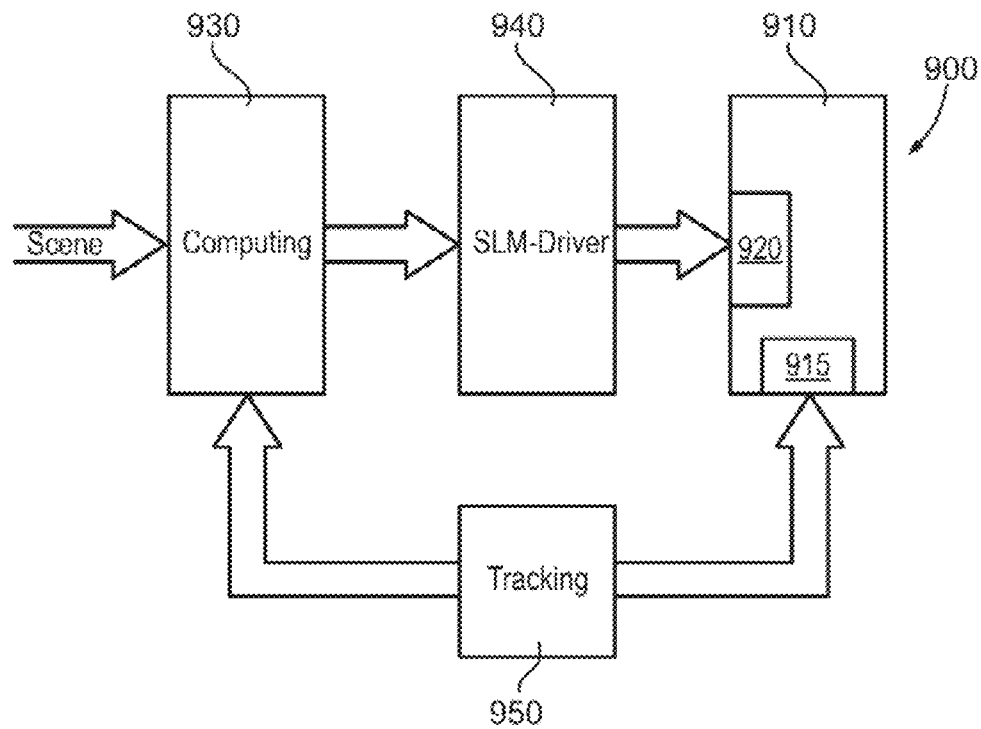
FIG. 10 is a simplified block diagram of a system according to an embodiment of the invention.

FIG. 10 is a simplified block diagram of an exemplary system 900, showing some main units of a projection system and the interactions between them.

System 900 includes: a projection unit 910 driven by driver 915 for generating and projecting holograms. Projection unit 910 comprises an SLM 920.

System 900 also includes a computation unit (930), for computing the desired optical behavior of each pixel of SLM 920; and SLM driver (940), for driving the optical behavior of each pixel in SLM 920 according to the desired optical behavior, as computed by computation unit 930.

Computing unit 930 receives as input, for example, a data set, an image or a video stream, optionally 3 dimensional or volumetric image, optionally, a stream of 3 dimensional or volumetric images. The input is optionally in digital form. Alternatively, input is in analogical form. In some embodiments, only a surface of the 3D image is provided. Optionally, the data is pre-computed for streaming to the SLM. Alternatively, unit 930 generates SLM data from the input, for example as described below. Optionally, unit 930 generates data and/or renders the input only for viewing direction where a user is or is expected to be at (e.g., assuming a certain movement speed of human head). Optionally, there is a lag (e.g., a few seconds or fractions of seconds) between the detection of a new user by the eye tracker and the presentation of an image (or complete image) thereto, for example, due to delay in obtaining data and/or delay in rendering such data.

Optionally, the volumetric 3D image stream data or any image data is stored in the system's memory ahead of time, and during projection, the stored data are approached and used for controlling the system. Optionally, the data is received online, and stored only temporarily, as required for controlling the system during projection.

Computing unit 930 computes, based on the input, what should be the optical behavior of each pixel of SLM 920, in order for a hologram produced with the SLM to reproduce the wave-front corresponding to the wave-front emanated from the scene. SLM driver 940 drives the pixels of the SLM into the computed optical behavior.

Optionally, unit 930 modifies its received data and/or data to be displayed to take into account the optical properties of the system, viewers and/or a calibration process. Optionally, a calibration process is visual and/or includes detecting a user's pointing device. In one example, a grid is shown and the user "touches" each point on the grid. In another example, the user is shown a series of images and provides feedback, for example, on color quality, shape, spatial distortion and/or other image properties. Optionally, the input is provided via the image, or using an input device (e.g., a mouse or button, not shown).

The shown system also includes a tracking unit (950), which optionally provides computation unit 930 information on the position of the viewer's eyes, thus allowing computation unit 930 to estimate which portions of the scene the viewer would see from his viewing point, and compute the optical behavior of the pixels to produce only the wave-front emanated from these portions.

Additionally or alternatively, tracking unit 950 provides the information on the positions of the viewer's eyes to driver 915 of the projection system 910, allowing it to adjust the position of the viewability space of the generated hologram to that of the viewer's eyes.

In an exemplary operation sequence, a video stream is inputted into computing unit 930, which computes the desired optical behavior of the various pixels of SLM 920. Computing unit 930 communicates the computed values to SLM-driver 940, which drives SLM 920 accordingly. Generation and projection unit 910 generates an object hologram using SLM 920, and projects the object hologram.

In the same time, the tracking unit tracks the viewer's position and orientation, and sends this information to the computing unit. The computing unit uses this information to compute a simplified hologram, that reproduces light emanated from the scene only in the direction of the viewer. The tracking unit also communicates the position and orientation of the viewer's eye to driver 915 of generation and projection unit 910, and driver 915 drives the projection unit to project the hologram to be viewable by the viewer.

Figure 11:
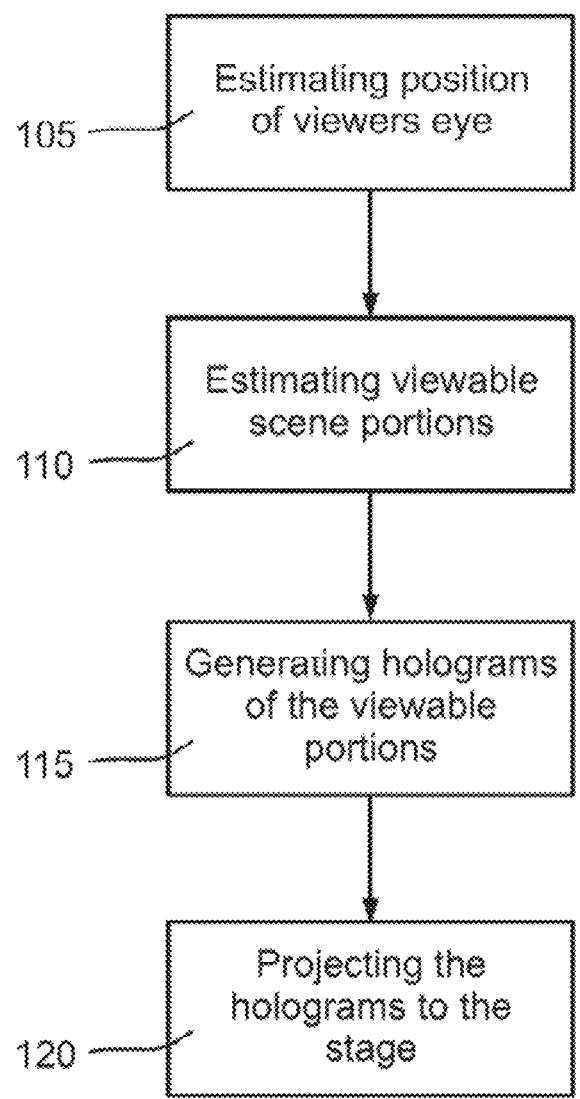
FIG. 11 is a flowchart of actions taken in performing a method according to an embodiment of the invention.

FIG. 11 is a flowchart of actions taken in a method of producing and projecting holograms to be seen by a viewer looking at a stage according to an embodiment of the invention.

At 105, the position of a viewer's eye is estimated. Optionally, the positions of both eyes are estimated. Optionally, the direction at which the viewer is looking is also estimated. Optionally, the system is configured to project the holograms to a predefined stage, and the positions of the viewer's eye and the stage determine the direction at which the viewer is looking.

At 110, the scene-portions viewable by the viewer if the scene was at the stage in some given orientation are estimated based on the viewer's eye location.

At 115, a hologram of only those portions of the scene, estimated at 110 to be seen by the viewer, are generated. Optionally, these holograms are generated by computing optical behavior of various SLM's pixels required to generate the hologram, and driving an SLM accordingly.

At 120, the holograms generated at 115 are projected such that the viewer will see the hologram from his location, when looking at the stage.

Figure 12:
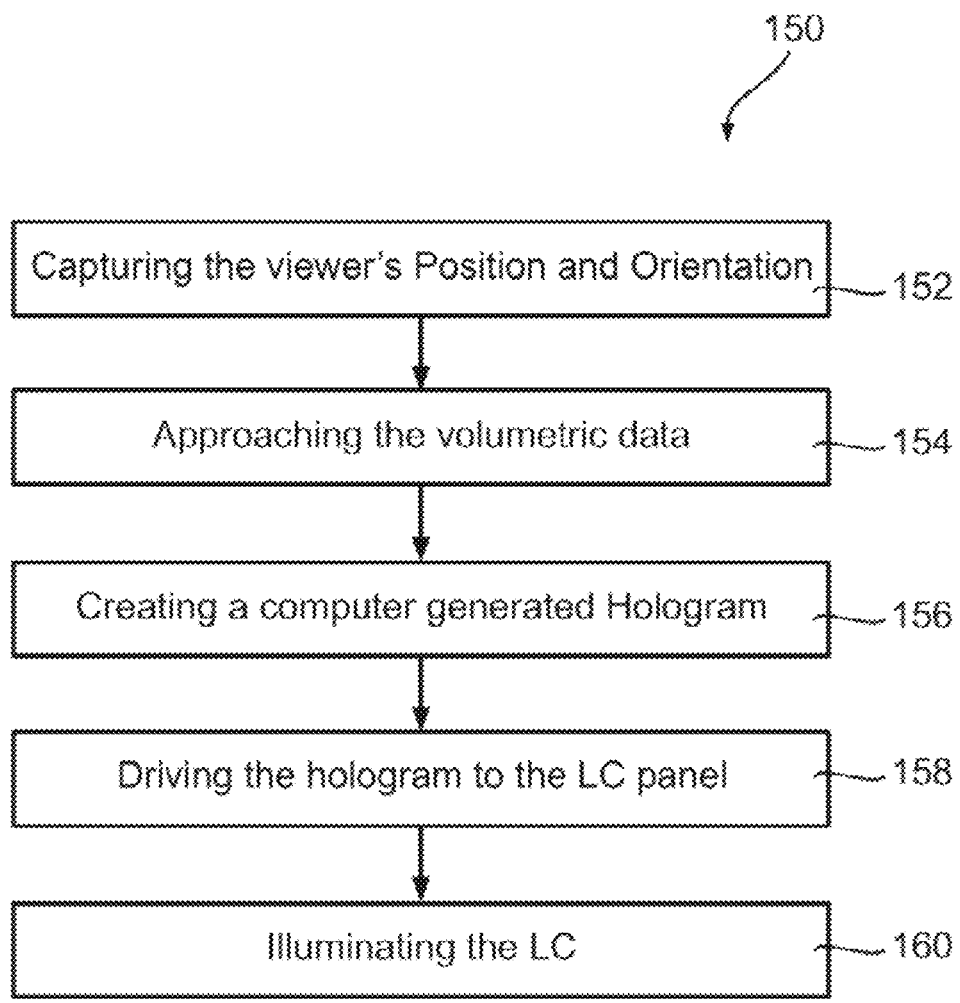
FIG. 12 is a flowchart of actions taken in a method of producing a hologram to be viewed by a viewer looking at the hologram from a given angle according to an embodiment of the invention.

FIG. 12 is a flowchart of actions taken in a method 150 of producing a hologram to be seen by a viewer looking at the hologram from a given angle.

At 152 the viewer's position is captured. Capturing the viewing position optionally comprises receiving input from a tracking unit. Optionally, capturing also includes processing said input. When capturing is accomplished, the system has determined the position of the viewer, and the angle from which the viewer would have seen the scene, if the scene was in fact on the stage.

At 154, volumetric data are approached. Optionally, the volumetric data are saved in advance in a memory of the system. Optionally, the volumetric data is received online, i.e., while the imaging process takes place, for instance, from a 3D imaging device, for instance, a CT imager.

Out of the volumetric data, the system filters out the data required for creating a hologram of that portion of the view that was determined at 152 to be seen by the viewer.

At 156, the computing system transfers the volumetric data to holographic data, comprising, for instance, setting a desired refraction index to each of the active pixels of the SLM in order to generate the hologram. Optionally, the SLM has non-active pixels that are not going to take place in generating the hologram. These pixels are optionally not illuminated at 160 (below). Optionally, preventing illumination of these pixels is performed by an additional transmission or reflective LCD or Digital Micro-mirror Device (DMD) placed between the light source and the SLM. The optional additional transmission or reflective LCD or DMD is not depicted in the drawings.

At 158, the SLM is controlled such that each pixel has in fact the refraction index set to it.

At 160 the SLM is illuminated to generate the object hologram.

Exemplary Interactions with a Hologram

Some embodiments of the invention allow the viewer to interact with the hologram. For example, the viewer can move his hand, or any other body portion, or any object the viewer is holding, for instance, a pointer, to touch the hologram. Optionally, sensors detect the position of the viewer's hand, and control an output device accordingly. In one example, a viewer touching a bell results in a ringing of the output device.

In another example, the viewer can interact with the hologram to manipulate the scene. For instance, a viewer touching a car-hologram at the engine cover can cause the hologram to change to a hologram of the inside of the car engine.

Alternatively or additionally, a viewer that touches some portion of the hologram can cause the output device to control the system to produce a hologram where the touched portion is in front of the viewer. For instance, a viewer watching the globe facing Switzerland can touch the globe at Spain, and the globe will rotate to bring Spain to the front of the viewer.

Alternatively or additionally, the viewer can interact with the hologram through a control panel, moving the hologram in space, rotating it around some predetermined axis, ad-hoc defining for the hologram an axis of rotation and rotating the hologram around the ad hoc defined axis, and perform any other manipulation on the orientation and/or the position of the hologram in space.

Optionally, two or more viewers can interact with holograms of the same scene simultaneously. For instance, two viewers can touch the same portion of the view in front of them, and, although each is watching a different hologram (or even each eye of each of them is watching a different hologram), when they two touch the same portion of the scene, for instance, both touch the bell, they also touch each other.

Colored Images

Various embodiments were described above in the context of monochrome images. Nevertheless, multicolor images may be provided by systems and methods according to embodiments of the invention just as well.

In some embodiments, a colored hologram is projected by a single SLM, which is sequentially lighted by red, green and blue light. Optionally, a colored scene is processed into three monochromatic scenes (one red, one green, and one blue), and the computational unit provides to the SLM data for sequentially generating monochromatic holograms that reproduce each monochromatic scene in its turn. Optionally, the light sources are synchronized with the computational unit such that each monochromatic hologram is formed with the corresponding light (a hologram reproducing a red scene is generated with red light, etc).

Optionally, simultaneously with projecting the holograms generated by the SLMs to the stage, images of the SLMs are projected to overlap with the viewer's eye.

In some embodiments, red, green and blue light are projected to three different SLMs, each reproducing one monochromatic scene. In some embodiments, each of the three SLMs is contained in a different unit cell, and in each revolution of the mirror images of all the unit cells are sequentially projected to the stage, such that the viewer sees a multicolor hologram.

In some embodiments, all three SLMs share a single optical system, such that the synchronization between them is optical. For instance, the three SLMs are three portions of a single SLM screen. Optionally, SLMs that share optical systems are all contained in a single unit cell.

A light source used for generating colored hologram images includes, for example, three different lasers. Another example is a light source comprising three different LEDs.

Exemplary Uses of Multiple SLMs

In some embodiments of the invention, creating the object hologram does not require activating a full SLM unit. In such cases, it is possible to use one SLM as a plurality of SLM units. For instance, one SLM of 1000×1000 pixels can function as a multiplicity of 4 SLMs, each 500×500 pixels, and obtain all the advantages of using a multiplicity of SLMs discussed below.

Optionally, several SLMs are imaged at the same eye of the same viewer. Such an arrangement may have several uses.

For example, as noted above, in some embodiments each SLM provides a monochrome image (red, green or blue), and the viewer who sees the three monochrome images, perceives them as a single, multicolor, image. It is noted that if a non-hologram image is shown, a color SLM may be used. Alternatively, different source colors may be aimed at different parts of a hologram-producing SLM, optionally with SLM elements for different colors being interlaced or otherwise intermingled.

In another exemplary embodiment, a multiplicity of SLMs are used for providing an image that is larger than an image provided by a single SLM. The system is controlled to form two half-objects, each by a single SLM, and image the half-objects one near the other on the stage. Both the SLMs are imaged to overlap with the same eye of the viewer. The viewer sees, therefore, with the same eye, an image composed of two images, one of each half-object. The composed image is optionally larger than any of the images composing it.

In another exemplary embodiment, a multiplicity of SLMs is used for broadening the angle from which an image is seen. In one such embodiment, two SLMs are imaged to the vicinity of the viewer, one near the other, optionally, with some overlap between the two SLM images. Each of the two SLMs optionally creates an object hologram of the same scene, and the two holograms are imaged to the stage. The viewer can see the image, no matter with which image SLM his eye overlaps. This arrangement allows loosening the requirements from the system's tracking mechanism, because only relatively large movements of the viewer require adjustments of the system.

In another exemplary embodiment, a multiplicity of SLMs is used for broadening the angle from which an image is seen. In one such embodiment, two SLMs are imaged to the vicinity of the viewer, one near the other, optionally, with some gap between the two SLM images, smaller then the viewer pupil. Each of the two SLMs optionally creates an object hologram of the same scene, and the two holograms are imaged to the stage. The viewer can see the image, no matter with which image SLM his eye overlaps. This arrangement allows loosening the requirements even more than the previous option, from the system's tracking mechanism, because only relatively large movements of the viewer require adjustments of the system.

Exemplary Applications

Exemplary Private Content Applications

In some embodiments of the invention, the content is being imaged to the eye of only one viewer, and other people in the vicinity of the viewer cannot see the content.

Optionally the viewer can watch the content from any desirable angle, and in some embodiments even move around the display, while others near him cannot see the content.

In some embodiments, when the tracking system loses track of the viewer, display is disconnected. Such embodiments may be particularly useful for handling confidential material. For instance, if a viewer reviews a confidential document with state of the art laptop display, a neighbor sitting next to the viewer can see the document. If the laptop is equipped with a display unit according to an embodiment of the present invention, the confidential document is displayed only to the viewer. Nevertheless, the viewer is not necessarily confounded to looking at the display from one angle. The viewer can go away from the display, and his neighbor will take the viewer's place in front of the display, and still will not be able to see anything, because the tracking system lost track of the viewer, and display was stopped.

Exemplary Medical Applications

In many medical applications physicians are provided with information on the three-dimensional structure of tissue. In some embodiments of the invention, this information is displayed to one or more physicians as a hologram that the physicians can interact with.

For instance, as a preparation for a minimal invasive cardiac procedure, a team of physicians acquires a dynamic 3D image of the heart using existing ultrasound techniques. Then, the team members can view the acquired images from different perspectives, for instance, each viewer from his own perspective, while having the ability to point and mark specific areas within the image as part of their discussion and preparation for the clinical procedure.

In an exemplary embodiment the image hologram is of the same size as the imaged scene (in the above example, the heart). Thus, in case an external component, for instance a stent, is to be inserted into the patient, the component may be fitted to the holographic image before the operation starts, so as to minimize the need to fit it to the patient during the operation. This feature is optionally enhanced by having a virtual "floating in the air" image.

Exemplary Computer Aided Design

In an exemplary embodiment of the invention, a computer designed model is displayed to a team of designers, allowing one, several, or each of the team members to walk around the model, relate to it and/or manipulate it. For instance, in a model of a mechanical part, such as the envelope of a new cellular phone, where the display is a touch screen, one designer can suggest modifying lighting of the display, and another will comment on the results of the modification and suggest adding real buttons and preset that instantly. Similarly, a single designer can look at the same detail from different angles. While reviewing a design, a member of the team can point to a specific part within the image (with a dedicated pen or with his finger). Optionally, all team members see the part pointed at, and the team members can discuss the view of that part, as seen from different perspectives. Optionally, the display comprises a system-human-interface, allowing a team member to manipulate a specific component within the full design, for example changing the color of a marked surface. As the team is viewing the image precisely from all angles, the described process eliminates some rapid prototyping phases within the development process, thus lowering its total time and cost.

Digital Advertising

Some embodiments of the invention may be utilized to gain attention of people who are exposed to the display without looking at it attentively. For instance, some embodiments of the invention may be used as advertising displays at public locations and gain considerably more attention than more traditional flat displays and posters gain.

For example a display according to embodiments of the invention can be posed in an exhibition, and the viewers going around it will see a holographic image of an advertised product, for instance, a cellular phone, or of a whole advertising promo. The holographic display attracts more attention than a usual poster or flat screen.

Optionally, in addition, one of the viewers manipulates the image while the others are viewing. Manipulation is optionally, by moving, rotating, or scaling the image, or interacting with the image in any other way. This embodiment optionally enhances viewers' attraction to the presented image, product or service.

Optionally, different views of the product are displayed to be seen by viewers standing at different locations around the display. It may be expected that people exposed to this kind of advertisement would be encouraged to go around the display, and pay the advertised product more and more attention.

Optionally, an advertising display according to an embodiment of the invention allows a viewer to manipulate the displayed scene as explained above under the heading "exemplary image manipulation". Allowing viewers to manipulate the viewed image may be expected to increase the viewer's attention and involvement with the advertised product.

Optionally, an advertising display according to an embodiment of the invention displays the same hologram 360° around it, and comprises an input device, allowing a user to indicate that the user is interested in closer look at the displayed scene. Responsive to receiving such indication, the system starts tracking the viewer's face and allows this particular viewer to see the advertised product from different angles as the viewer goes around the display.

User Interfaces 3D interaction occurs when users are able to move and perform interaction in 3D space. Human-machine interaction requires that both human and machine receive and process information, and then present the output of that processing to each other. Users perform an action or give a command to the machine in order to achieve a goal. The machine takes the information provided by the user, performs some processing, and then presents the results back to the user.

Ideally, users could interact with a virtual image the same as they could in reality. In contrast to standard input devices like a keyboard or a 2D-mouse, ideal operations in full three dimensions should also allow six degrees of freedom, which is natural for the users. This type of 3D interaction device should recognize and interpret human actions and gestures and transform them into corresponding manipulations of the virtual scene or information about the image. Some embodiments of the present invention, go much closer to the ideal than the above-mentioned standard input devices.

While some devices enable three dimensional interaction with up to six degrees of freedom, none of them enable doing so on an actual projected image, but only in another location in space, termed herein input space, while the image is projected on a 2D screen or some form of a 3D platform, termed herein display space.

In some embodiments of the invention, using the display of the invention described herein, an image provides a viewer with the depth cues of a real object, making viewing the user interface feel natural. Some embodiments of the invention enable users to actually "touch" a projected 3D image, while providing suitable visual depth cues, optionally having a wide viewing angle, optionally allowing viewing precise locations in space, and optionally from different viewing angle. Some embodiments of the invention project a "floating-in-the-air" image so the image appears at a distance of approximately 80 cm from the viewer, within reach of the viewer's arm.

In some embodiments, the apparent distance from the viewer to the image is such that the user may reach the image, that is, approximately a length of a non-extended arm, approximately a length of an arm, and/or approximately a length of an arm holding a stick or as pointer.

In some embodiments, the size of the display space corresponds to a range of motion of a user's arm, that is, approximately 1-2 meters across. In some embodiments, the size of the display space corresponds to a range of motion of a finger, that is, approximately 10-20 centimeters across.

In some embodiments, the resolution of input location corresponds to motion of a user's arm, that is, approximately 1 centimeter. In some embodiments, the resolution of input location corresponds to motion of a user's finger, that is, approximately 1 millimeter. Resolutions more coarse and finer are also optically possible, therefore some embodiments potentially operate at such resolutions.

In some embodiments, the user interface displays a floating-in-the-air object to one or more users, in one or more locations. The floating-in-the-air object optionally does not appear to change location with movement of a viewer. The floating-in-the-air object also optionally appears at the same location from different viewing directions.

In some embodiments, two user interfaces use two displays to display the same floating-in-the-air image in two different locations, enabling one or more users at a first location a partial or a full walk-around, at one or more walk-around rates, and at the same time one or more users at a second location a partial or a full walk-around at one or more other walk-around rates.

In some embodiments, the user interface displays a different floating-in-the-air image to different viewers. Displaying a different image to different users optionally takes many forms: displaying entirely different images, such as a red balloon and a green Ferrari; displaying the same object using a different coordinate system, such as a first image displaying a hammer placed in the center of the display and a second image displaying a hammer placed at a side of the display; displaying one part of an object in a first image and another part of an object in a second image, all the while the object being optionally located in the same place, same coordinate system, same size; displaying different colors for the same object, such as displaying an object to a first user and displaying the same object, contrast-enhanced, or color enhanced, or in a different range of hues, to another user; and displaying the same object at different sizes.

It is noted that displaying the same object at different sizes to different users raises a question: when a first user points a pointer into the display space, "touching" a location on the object which the first users sees, where should a display of the pointer appear for the second user. One option is that the image displayed to the second user should be displayed so that a touching tip of the pointer should appear to touch the same location in the second image as in the first image, even while the second object appears to be of a different size than the first object. The second image is displayed at coordinates such that the tip of the pointer appears to be touching the same location in the second image as in the first image.

In some embodiments, the user interface displays a different floating-in-the-air image to different eyes of the same viewer.

In some embodiments, the user interface enables a partial or a full walk-around the floating-in-the-air image, as described earlier, displaying different sides of the floating-in-the-air image as if the image is an actual object floating in the air.

In some embodiments, the user interface allows poking a finger or some other object onto and into the floating-in-the-air image.

In some applications of the user interface, the floating-in-the-air display utilizes embodiments of the volumetric display described herein. In other applications of the user interface other volumetric displays are optionally used, provided their properties support the specific application.

Figure 13A:
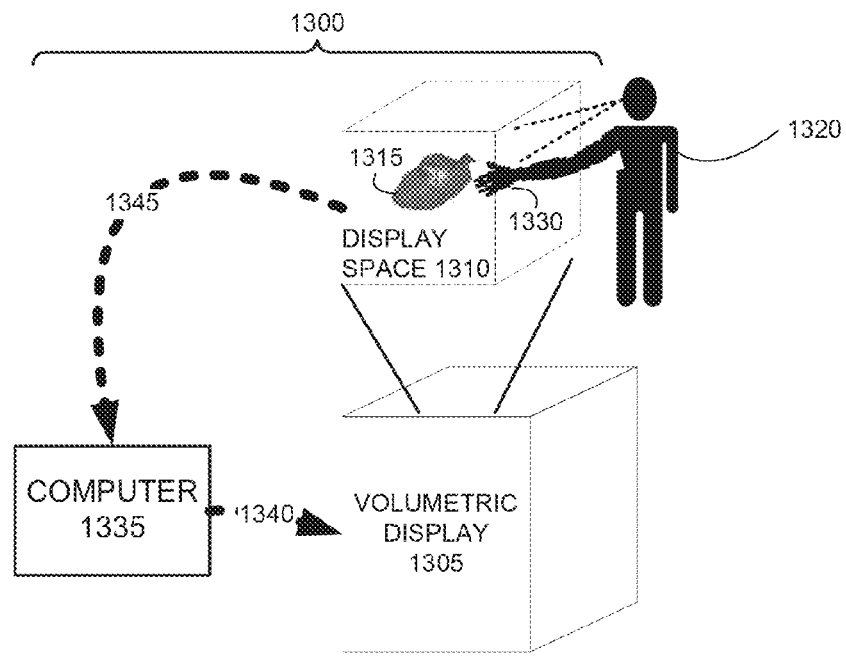
FIG. 13A is a simplified illustration of a user appearing to touch a finger to an object being displayed by a user interface constructed and operational according to an embodiment of the invention.

Reference is now made to FIG. 13A, which is a simplified illustration of a user 1320 appearing to touch a finger 1330 to an object 1315 being displayed by a user interface 1300 constructed and operational according to an embodiment of the invention.

The user interface 1300 includes a volumetric display 1305, which displays a first image in a floating-in-the-air three dimensional display space 1310. The image, by way of a non-limiting example, displays an object 1315, by way of a non-limiting example, a heart.

It is noted with reference to FIGS. 13A, 13B, 13C, 14, 15, and 16, where reference is made to a three dimensional display and/or a floating-in-the-air display, the reference is meant to include, by way of a non-limiting example, holographic image display as described above; paraxial image display as described above; and other image displays suitable for volumetric display.

It is noted that a two-dimensional display such as, by way of a non-limiting example, a television display and/or a computer monitor display, is suitable for transforming into a volumetric display by generating the two dimensional image as floating-in-air, similarly to a three dimensional image.

The user 1320 views the object 1315, and extends a finger 1330 to apparently "touch" the object 1315. The volumetric display 1305 allows inserting a real object into the display space 1310, since the volumetric display 1305 is a floating-in-the-air volumetric display, displaying a floating-in-the-air image.

The user interface 1300 also optionally includes a computer 1335, which provides control and data 1340 to the volumetric display 1305.

A location of the finger 1330 is located by a location determination unit (not shown). The location determination unit optionally determines the location of the finger by identifying real objects placed into the display space 1310.

The location determination unit optionally comprises a unit for locating objects (e.g. the finger 1330) in three dimensions, such as, by way of some non-limiting examples, cameras mounted to pick up images along different directions, and triangulate a location in three dimensions, and/or distance measuring units measuring distance to objects in the display space 1310.

In some embodiments of the user interface 1300, a variant of a unit cell, such as depicted and described with reference to FIG. 7, operates as the location determination unit. The variant of the unit cell is located such that a reverse optical path from the display space 1310 leads to the unit cell. The unit cell optionally measures location of an object (e.g. finger 1330) in the display space 1310 by a combination of a rotational angle to the object, relative to a unit cell base, and a distance to the object. The rotational angle optionally takes into account a revolving of the optical system.

In some embodiments of the invention distance to an object (e.g. finger 1330) is measured by a distance measurement system such as used in camera auto-focus systems. In some embodiments of the invention distance to an object (e.g. finger 1330) is measured by a conoscopic distance measuring system.

The location of the object is optionally used as an input 1345 to the computer 1335, and the computer 1335 optionally computes control instructions and data for displaying a second image, optionally with the location input highlighted on the image displayed by the volumetric display 1305, e.g. a location highlighted on the heart.

Optionally, in order to locate a specific location on an object inserted into the display space 1310, a specific location is selected on the object, and the specific location may further be highlighted. By way of a non-limiting example, a finger tip may be the location. By way of another non-limiting example, the finger tip may be highlighted by marking with a dye. The dye may be visible to a human eye, and/or the dye may be chosen to provide high contrast to a machine vision system which locates the location input.

Optionally, the interface 1300 tracks a location of the finger 1330 by 3D camera, available today, for example by 3DV Systems.

Optionally, the user interface 1300 tracks a location of the finger 1330, or some other location indication tool, and interprets a dynamic movement of the finger 1330 as command gestures to the user interface 1300. The command gestures optionally cause manipulations of the displayed image. Such use of the user interface provides a user with a feeling of directly (virtually) shaping of a displayed object and/or image and/or scene. The above feeling is especially enhanced when sensory feedback is provided.

Figure 13B:
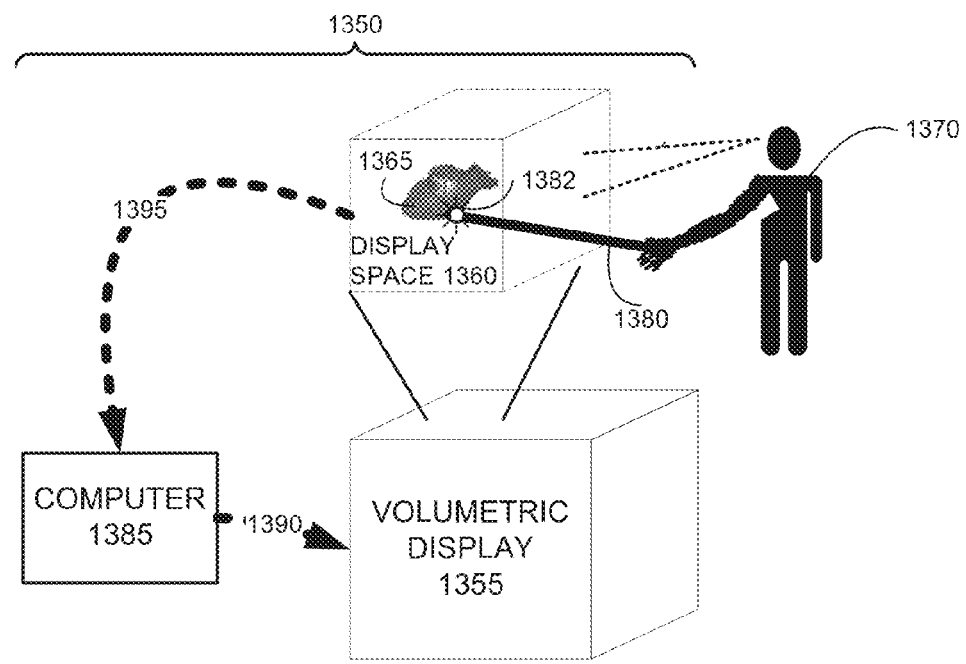
FIG. 13B is a simplified illustration of a user appearing to touch a pointer to an object being displayed by a user interface constructed and operational according to an embodiment of the invention.

Reference is now made to FIG. 13B, which is a simplified illustration of a user 1370 appearing to touch a pointer 1380 to an object 1365 being displayed by a user interface 1350 constructed and operational according to an embodiment of the invention.

The user interface 1350 includes a volumetric display 1355, which displays a first image in a floating-in-the-air three dimensional display space 1360. The image, by way of a non-limiting example, displays an object 1365, by way of a non-limiting example, a heart.

The user 1370 views the object 1365, and extends a pointer 1380 to apparently "touch" the object 1365. The volumetric display 1355 allows inserting a real object such as the pointer 1380 into the display space 1360.

The user interface 1350 also optionally includes a computer 1385, which provides control and data 1390 to the volumetric display 1355. A location of the pointer 1380 is located by a location determination unit (not shown) and optionally used as an input 1395 to the computer 1385. The location determination unit optionally determines the location of the pointer 1380 by identifying real objects placed into the display space 1360.

The pointer 1380 optionally presents a better defined location input than a finger. Optionally, it is easier to locate a tip of the pointer 1380 than a tip of a finger of a hand.

The tip of the pointer 1380 may be highlighted by marking with a dye or more than one dye.

In some embodiments the tip of the pointer includes a substantially compact light source 1382. The light source 1382 may be visible to a human eye, and/or the light source 1382 may be chosen to provide high contrast to a machine vision system which locates the location input.

In some embodiments of the user interface, the location input causes the user interface to capture data corresponding to a voxel located substantially near to the location input.

In some embodiments of the user interface, the location input causes the user interface to capture data corresponding to a sub-image located substantially near to the location input.

In some embodiments the user interface includes a display of an "actuator", that is, a display of a device such a button, a lever, or some such devices typically pressed, pushed, pulled, and so on. The user interface enables a user to put a hand and/or a pointer into the display space, a virtually "press the button", "push or pull the lever", and so on. When the user interface senses a hand and/or a pointer in the display space next to a location of the display of the actuator, the user interface optionally interprets the putting of the hand or pointer as an actuation of the actuator.

The user interface optionally provides sensory feedback to the user, such that the user feels somewhat as though pressing/pulling/pushing the actuator.

The user interface optionally changes the first display to move the image of the actuator corresponding to the actuating the actuator.

The user interface optionally changes the first display, showing an actuator that is actuated, a button that is pushed, and/or other such changes indicating that the user "pushed the button". It is noted that the display is controlled by the user interface, and therefore optionally provides feedback upon actuation. This is by way of contrast with, for example, existing holographic displays, which may display a hologram of a button, but cannot change the look of the holographic button since their hologram is a static display projected from film.

In some embodiments of the invention, the user interface displays an image of a robotic arm, and the computer optionally sends control signals and data so that a real robotic arm moves according to input provided by a user in the display space of the volumetric display of the user interface.

In some embodiments of the invention, the user interface optionally picks up more than one location input. The location inputs are optionally provided by several fingers in the display space of the volumetric display, and/or by several pointers, and/or by pointing to several locations consecutively. The location inputs are optionally provided by several points on one finger and/or pointer. The several points are optionally marked on the finger and/or on the pointer with a contrasting dye and/or sources of light.

In some embodiments of the invention, the user interface optionally picks up more than one location input. The location inputs are optionally provided by computing and/or estimating locations based on a shape of the object inserted into the display space. By way of a non-limiting example, a line is optionally computed based on a long axis of a substantially elongated object inserted into the display space.

The user interface optionally tracks a movement of one or more location inputs over time, and optionally displays one or more paths tracking the movement in the display space, optionally superposed upon an image displayed in the display space.

In an example application, the user interface optionally starts with an empty display, tracks the movement of one or more location inputs over time, and displays the one or more paths tracking the movement in the display space, optionally in real-time and/or near real-time.

In an example application, the user interface optionally accepts two location inputs, and defines a line in the three dimensions of the volumetric display passing through the two location inputs. The line optionally serves for further manipulating the image displayed by the user interface. Image manipulations using a defined line include, by way of a non-limiting example: rotations around the line; a measurement of the line length; and a division of a displayed object into portions on either side of the line.

In an example application, the user interface optionally accepts three location inputs, not on the same line, and defines a plane in the three dimensions of the volumetric display passing through the three location inputs. The plane optionally serves for further manipulating the image displayed by the user interface. Image manipulations using a defined plane include, by way of a non-limiting example: a measurement of an area of intersection of the plane and a displayed object; and a division of a displayed object into portions on either side of the plane.

In an example application, the user interface optionally accepts four or more location inputs, not on the same plane, and defines a volume in the three dimensions of the volumetric display based on the four or more location inputs. The volume is optionally defined as a volume contained within the four or more location inputs, and/or a volume contained within some function of the four or more location inputs, such a surface computed based on the four or more location inputs.

The volume optionally serves for further manipulating the image displayed by the user interface. Image manipulations using a defined volume include, by way of a non-limiting example: a measurement of the volume; and a division of a displayed object into portions inside of and outside of the volume.

In some example applications the user interface optionally picks up one or more location inputs. The location inputs are optionally used as input to initiate image processing functions such as, by way of some non-limiting examples: zooming in; zooming out; cropping an image; rotating the image; and slicing the image.

Figure 13C:
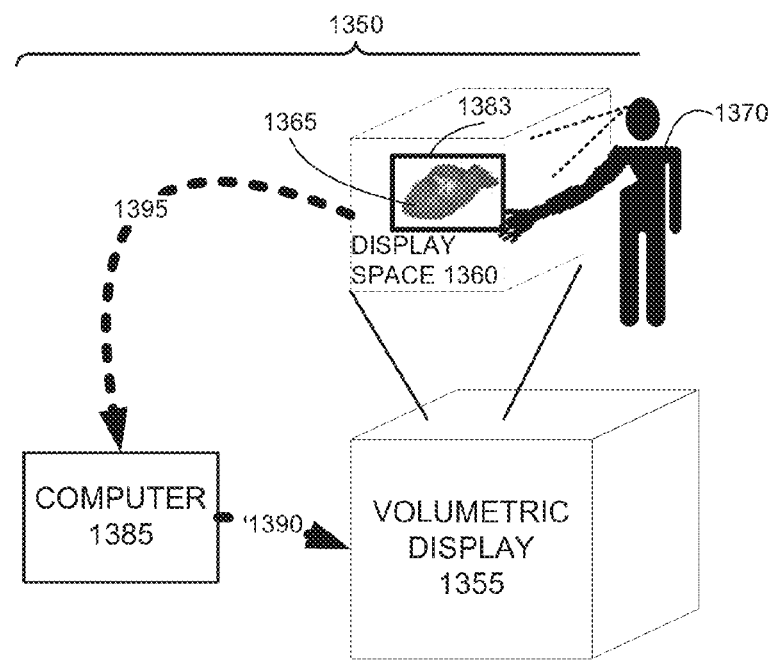
FIG. 13C is a simplified illustration of a user inserting a frame into a display space of a user interface constructed and operational according to an embodiment of the invention.

Reference is now made to FIG. 13C, which is a simplified illustration of a user 1370 inserting a frame 1383 into a display space 1360 of a user interface 1350 constructed and operational according to an embodiment of the invention;

The user interface 1350 includes a volumetric display 1355, which displays a first image in a floating-in-the-air three dimensional display space 1360. The image, by way of a non-limiting example, displays an object 1365, by way of a non-limiting example, a heart.

The user 1370 views the object 1365, and extends a frame 1383 to apparently "surround" the object 1365. The volumetric display 1355 allows inserting a real object such as the frame 1383 into the display space 1360.

The user interface 1350 also optionally includes a computer 1385, which provides control and data 1390 to the volumetric display 1355. A location of the frame 1383 is located by a location determination unit (not shown). The location of the frame 1383 is optionally used as an input 1395 to the computer 1385. The location determination unit optionally determines the location of the frame 1383 by identifying real objects placed into the display space 1360.

The frame 1383 optionally defines a location input which defines a plane, and optionally a limited area within the plane. Optionally, the plane defined by the interface is displayed to the viewer by means of the volumetric display of the invention. Optionally the defined plane is presented on a 2D display. Optionally the defined plane is displayed in real-time.

In some embodiment of the invention the frame 1383 is optionally a three-dimensional frame, for example a frame in a shape of a wire-frame cube. The shape of the frame is not limited to the examples of a rectangle, as depicted in FIG. 13C, or a cube, but includes a variety of wire-frame-like shapes.

The frame 1383 optionally presents a location input which defines a volume limited within the frame 1383.

Figure 14:
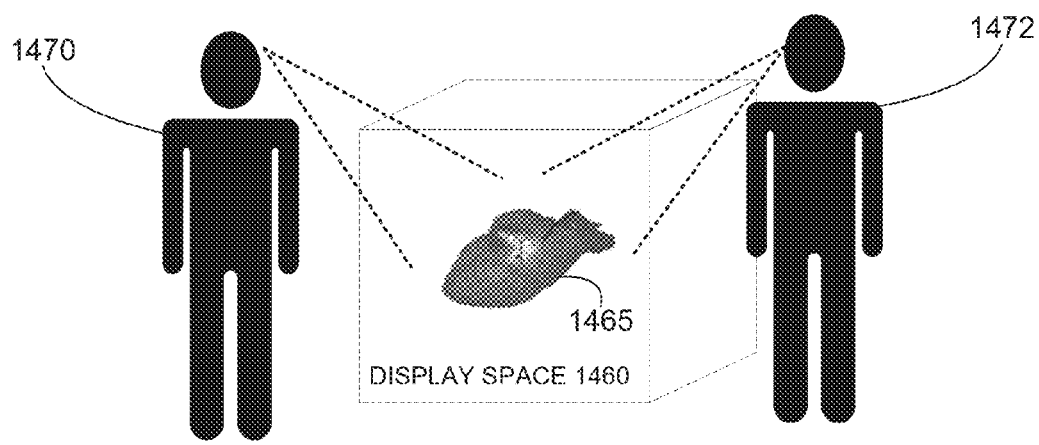
FIG. 14 is a simplified illustration of two users interacting with the same object being displayed by a user interface constructed and operational according to an embodiment of the invention.

Reference is now made to FIG. 14, which is a simplified illustration of two users 1470 1472 interacting with a same object 1465 being displayed by a user interface constructed and operational according to an embodiment of the invention.

The user interface, of which a display space 1460 is depicted in FIG. 14, displays a floating-in-the-air image to a first user 1470 and a second user 1472. The floating-in-the-air image is of the object 1465. The object 1465 appears at the same place and at substantially the same time to both of the users 1470 1472, each of the user 1470 1472 viewing the object 1465 from their respective location.

The user interface optionally implements the same-location same-time display using an embodiment of the volumetric display described herein. If the first user 1470 places a real object (not shown) in the display space 1460 of the volumetric display, such as, by way of a non-limiting example, a hand, a pointer, or a frame, the second user 1472 sees the real object at the same location as the first user 1470. If, for example, the first user 1470 uses a pointer to point at a location on the displayed object 1465, the second user 1472 sees the pointer pointing to the same location.

The term substantially at the same time is now explained, with reference to the above statement, that the two users see the object 1465 "at the same place and at substantially the same time". The image of the object 1465 is optionally displayed to each of the users 1470 1472 by being flashed at them for short periods of time, the flashes repeating at a rate of several times a second. Both users 1470 1472 get to see the object 1465 several times a second, during the same second, thus "at substantially the same time".

In some embodiments of the user interface, the floating-in-the-air display of the user interface displays a different image to the first user 1470 than to the second user 1472, as described above with reference to embodiments of the volumetric display of the present invention. (It is noted that FIG. 14 does not depict a first image displayed to the first user 1470 and a different, second, image displayed to the second user 1472). In the presently described embodiments, if the first user 1470 points at a first object in the first image, the second user 1472 sees the first user 1470 pointing at the display space, yet the second user 1472 does not see the first image, and the pointing usually has no meaning for the second user.

Figure 15:
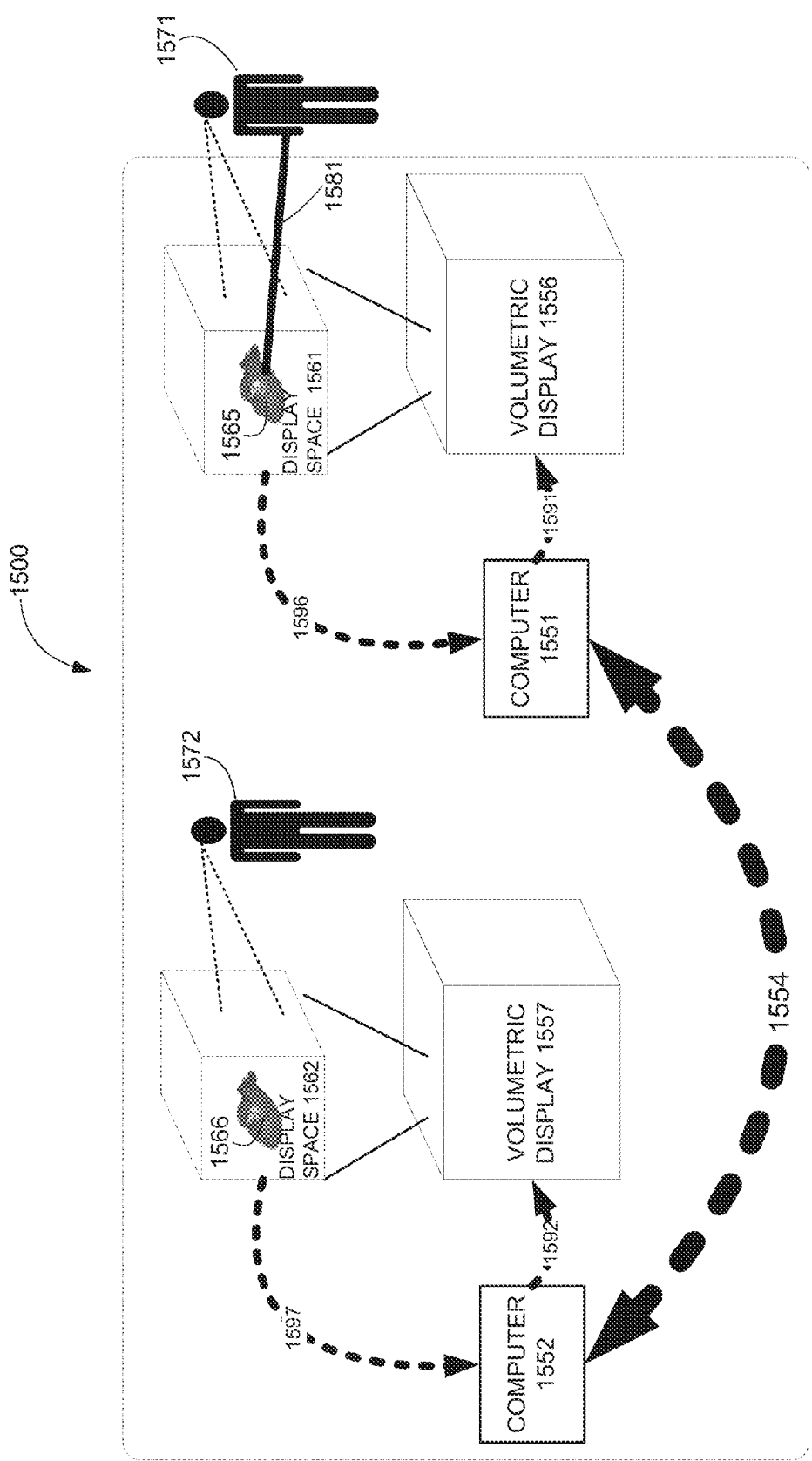
FIG. 15 is a simplified illustration of two users interacting with the same object being displayed by a user interface constructed and operational according to an embodiment of the invention.

Reference is now made to FIG. 15, which is a simplified illustration of two users 1571 1572 interacting with the same object being displayed by a user interface 1500 constructed and operational according to an embodiment of the invention.

The user interface 1500 of FIG. 15 includes two volumetric displays 1556 1557, optionally remote from each other. The two volumetric displays 1556 1557 are optionally each connected 1591 1592 to a computer 1551 1552, and the two computers 1551 1552 are optionally functionally connected to each other by a functional connection 1554.

In a first example use for the embodiment of FIG. 15, a first volumetric display 1556 displays a first object 1565 in the display space 1561 of the first volumetric display 1556. A first user 1571 uses a pointer 1581 to point at the first 1565 object. A location indicated by the pointer 1581 is picked up and transferred 1596 to a first computer 1551. The first computer 1551 optionally sends a signal and/or data to the first volumetric display 1556 indicating where the first user 1571 pointed, optionally providing feedback to the first user 1571, and optionally sends data to a second computer 1552 over the functional connection 1554.

The second computer 1552 optionally sends a signal and/or data to a second volumetric display 1557, which optionally displays an image of a second object 1566 in the display space 1562 of the second volumetric display 1557.

The image of the second object 1562 optionally appears the same as the image of the first object 1561. The image of the second object 1562 optionally also includes an indication where the first user 1571 pointed.

It is noted that the second user 1572 may point to the image of the second object 1562, and the location indicated by the second user 1572 may be picked up and transferred 1597 to the second computer 1552. The second computer 1552 may optionally sends a signal and/or data to the second volumetric display 1557 indicating where the second user 1572 pointed, optionally providing feedback to the second user 1572, and optionally sends data to the first computer 1551 over the functional connection 1554. The first computer 1551 optionally causes a display of an image and a location pointed to.

The functional connection 1554 optionally includes a network connection between the first computer 1551 and the second computer 1552.

In some embodiments the functional connection 1554 includes white-boarding software.

In some embodiments of the invention the first volumetric display 1556 and the second volumetric display 1557 do not necessarily display the same image. Some non-limiting example applications where the first volumetric display 1556 and the second volumetric display 1557 display different images include remote teaching, where a teacher and a student may view different images; and gaming, where one user sees a different image than another user, optionally one user sees more than another user and the game uses the difference in viewing.

FIG. 15 describes using two sets of volumetric displays 1556 1557. It is noted that more than two volumetric displays may be connected to function as described with reference to FIG. 15.

An embodiment of two or more volumetric displays connected to each other yet remote from each other is especially useful for medical and/or teaching purposes. A medical case may be presented as a three dimensional volumetric image, and users at each of the volumetric display sites can discuss the medical case, including by pointing out locations on the image, and "touching" the image. An implant or a prosthetic may be held up to the medical image, sizes compared, even when the implant is at one site, and the source of the medical image, that is, the patient, is at another site.

FIG. 15 describes using two computers 1551 1552, one for each volumetric display 1556 1557. It is noted that one computer may be used to power both volumetric displays 1556 1557, given sufficient computational power and given sufficient communication bandwidth through the functional connection 1554.

Figure 16:
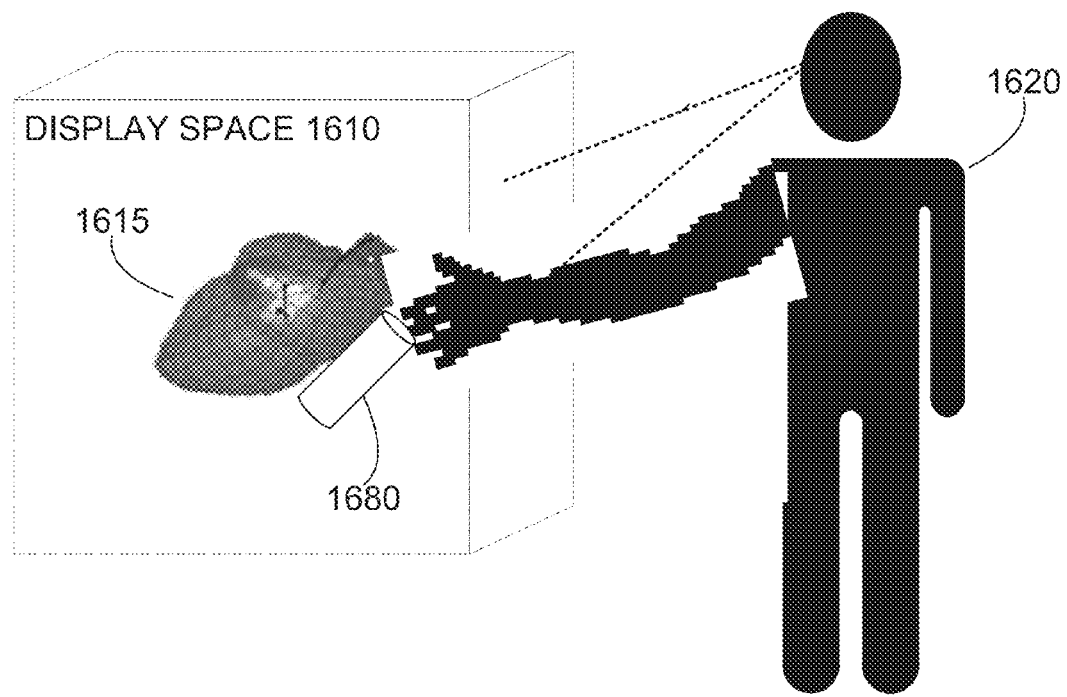
FIG. 16 is a simplified illustration of a user comparing a real object to an object being displayed by a user interface constructed and operational according to an embodiment of the invention.

Reference is now made to FIG. 16, which is a simplified illustration of a user 1620 comparing a real object 1680 to an object 1615 being displayed by a user interface constructed and operational according to an embodiment of the invention.

FIG. 16 depicts a display space 1610, which is portion of a user interface constructed and operational according to an embodiment of the invention. The user interface displays a floating-in-the-air object 1615 in the display space 1610. The user 1620 places a real object 1680 in the display space 1610, and compares the real object 1680 to the displayed object 1615.

A non-limiting example of applying the scenario of FIG. 16 to the real world includes displaying a floating-in-the-air object 1615 such as a heart or vessel structure using a three dimensional medical data set. The heart or vessel structure is displayed at actual size. A user, for example a doctor or a medical student, holds a stent up to the heart or vessel structure, and compares the size of the stent to a size of the heart blood vessel or vessel structure for which it is intended. Another example can be holding an artificial percutaneous heart valve up to the heart's displayed anatomical structure in which it is intended for implant. The real object 1680 being compared to the floating-in-the-air object is optionally placed at an implant location, and/or next to the implant location. In this non-limiting example, the user can interpret the position and orientation of the stent or the valve, providing good localization and an ability to select the specific stent or valve, in terms of, for example: size, specific manufacturer or specific technology.

The scenario of FIG. 16 enables teaching how an implant fits in the body; research and/or development of new implants; and pre-implant verification that an implant fits its purpose.

The user interface depicted in FIG. 15 enables a medical data set from a first location to be displayed at a second, remote, location, and optionally a session of remote medicine can be held, in which the remote location provides advice, guidance, measures sizes, compares implant and/or tool sizes, and so on.

Comparison of a first three dimensional displayed object 1615 in FIG. 16 is optionally performed with reference to a second three dimensional displayed object (not shown in FIG. 16). The first three dimensional displayed object 1615 is optionally compared to one of a set of three dimensional representations of objects, such as tools and/or implants, which are optionally kept for comparison purposes.

In some scenarios, a first three dimensional object is compared to a second three dimensional object by viewing the first and the second objects in a user interface including a volumetric display as described herein. The first and the second objects may be shifted and/or rotated in space using the user interface of the invention.

The scenario of FIG. 16 enables comparison of objects, not necessarily in medical circumstances. By way of a non-limiting example, a go/no-go gage may be held up to a floating-in-the-air display of an object, and test conformance of the object to a standard, provided the object may be displayed. Instead of bringing a gage to an object, a three-dimensional display of the object is brought to the gage.

The scenario in which a real object 1680 is compared to a display of an object 1615, coupled with measurement of the real object 1680 within the display space 1610, as described above with reference to FIG. 13A, enables measuring differences between the real object 1680 and the displayed object 1615. The differences include one or more of differences in length, planar area, surface area, and volume. The differences are optionally measured for objects, and/or portions of objects.

Some details of the user interface described above are now listed, with reference to four issues: a source of data for display; a display device; an interface device; and supporting software and communication devices.

Sources of Data for Display

Typically, for 3D representation, a cloud of XYZ points, also known as voxels or volumetric data, are optionally input and displayed. The input optionally comes from sources which generate such information, optionally from computer-based data such as CAD models, and/or externally acquired data such as CT or MRI scans in medical imaging.

Optionally the data can be two dimensional, for example a 2D image or image stream coming from a computer, a TV, cables, satellite, and so on.

Optionally, the 2D/3D data origin is holographic, that is, an interference pattern or a stream of interference patterns.

Optionally the data can come from the user interface of the invention, as described herein, including specific location input points in space marked by a user; a path drawn by the user; and/or other images which the user optionally produces while interacting with the user interface, and/or off-line, in the display space of the user interface.

Optionally, software interprets the user interface and produces 2D or 3D, including holographic, data, according to its mission. For example, a place which a user "touches" with an interface tool, the user interface optionally displays a pre-defined indication, such as, by way of a non-limiting example, a highlight and/or a specific shape such as a star or a cross.

By way of a non-limiting example, data optionally is input from 3D medical imaging, also known as real-time 3D, 4D, or volume rendering data, which provides volume and spatial renderings of the human anatomy.

Optionally, input is a stream of 3D data images.

Optionally the input is provided in "real-time", that is, 24 frames per second, or more.

The 2D/3D data is optionally extracted from 3D imaging modalities: CT; MRI; PET; 3D rotational Angiography; 3D ultrasound; and future/emerging technologies.

The 2D/3D data optionally includes a combination of the above modalities, super-imposing and/or fusing the data, also known as "combined imaging" or "image fusion". Examples include: fusion of CT and MRI results of a same patient; and MR guided ultrasound treatment.

The 2D/3D data optionally includes pre-defined anatomical models, as an anatomical library of various clinical cases, as well as image sets of individual patients.

The 2D/3D data optionally includes 2D/3D data origin from CAD tools, such as SolidWorks. The 2D/3D data may be still images and/or image streams. Example standards for some data include: IGES, 3DF, OBJ, and so on.

The 2D data optionally includes data from computers in a VESA standard, for example, and/or analog and digital video standards from TV related systems, such as composite video, DVI, and so on.

In some applications of the invention, no data is passed to the volumetric display. In such cases the user optionally draws lines, objects, 2D images, volumetric images, and performs digital volumetric sculpturing within the display space, optionally via an interface tool. The drawings and/or "sculptings" are optionally presented in near real-time by the user interface via the volumetric display, in the display space.

Display Devices

In order to interact with a floating-in-air image, a volumetric display device is optionally used. Generally, the device presents an image produced from data, "floating in the air", for the user to interact with the image.

The source of data for the image may be 2D, 3D, or volumetric.

Optionally using the broad viewing angle display of the present invention, data is optionally presented by an image having a symmetry axis through the center of the image and passing through the middle of the display device. 3D volumetric holographic data is optionally displayed using absolute coordinates, viewable by one or more viewers, and/or one viewer in different locations around the display.

2D information is optionally presented "floating in air" in various orientations, presenting a flat surface in any direction in a 360 degree circle. 2D Images optionally source from different origins, and different images are optionally displayed to different viewers.

Optionally the image is a re-image of a volumetric/2D non-"in air" image, making the re-image "in air" by using re-imaging optics.

3D parallax barrier images, presenting two different images to two eyes of the viewer are optionally displayed.

In some embodiments of the invention, for 3D images, the "floating-in-air" display uses a projected 3D image with absolute coordinates in a display space. A high quality, wide viewing angle, 3D display device is optionally used. Non-limiting examples of such display devices include the broad viewing angle display of the present invention and possibly future wide viewing angle 3D display devices capable of displaying an image "floating in air".

Interface Devices

Tools supporting 2D/3D user input or manipulation within the display space are considered for use as the interface medium. Such tools include, by way of a non-limiting example, hand-held tools, such as pen-like devices; gesture recognition interface units; object recognition interface units, such as for recognizing a finger and/or a tip of finger; and tracking systems with an ability to track a position and/or orientation of the hand-held tool or a finger.

Optionally, each separate finger or tool may be separately detected, optionally separately identified, optionally being marked differently.

An exemplary interface device is a stylus with an IR LED or LEDs. IR camera/cameras are located in proximity to the display space of the user interface, where interaction is to occur and an image is presented. The IR cameras optionally receive an IR signal from the LED, and a location and/or orientation, optionally at up to six degrees of freedom, is calculated by a location calculation unit. The location calculation unit may be implemented in hardware and/or software. Location calculation is optionally performed using image processing techniques. The location calculation unit optionally passes the position and/or orientation of the tool or finger to an optional computer for performing actions according to a user interface program. Exemplary actions, by way of a non-limiting example, are: marking points in space; drawing lines or images in space; calculating distances in space; drawing a path; calculating a path's absolute length; drawing a path; saving coordinates of a path; and so on.

Other exemplary methods for tracking the tool/object include: CCD camera/cameras and computational hardware to perform image processing extracting the tools/object location/orientation in space; tracking devices based on mechanical, magnetic, ultrasonic, optical, and hybrid inertial, a combination of some or all the above sensors, and/or other methods for locating a tool/object in space.

An emerging method of tracking objects in space is based on illumination of objects with coherent light or illumination patterns onto the objects, and processing a resultant image to interpret the location and orientation of the objects. The above is optionally performed in real-time, that is, calculating an image frame within the time it takes to capture an image frame. Real-time in this context also means at a rate of at least cinematic rate, such as 24 frames per second, or more, although optionally a rate of 2 frames per second, or 10 frames per second may be used.

Example companies which are developing such methods include: Prime Sense Inc., of 28 Habarzel Street, Tel-Aviv, Israel; and 3DV Systems, of 3DV Systems, 2 Carmel Street, Industrial Park Building 1, P.O. Box 249, Yokneam, 20692, Israel.

An example IR tracking company is NaturalPoint Inc, P.O. BOX 2317 Corvallis, Oreg. 97339, USA.

An Example inertial/ultrasonic tracking company is InterSense Inc., 4 Federal Street, Billerica, Mass. 01821 USA.

Supporting Software and Communication Devices

Supporting software and communication devices optionally process, synchronize between, and transfer data between, the source of data for display, the display device, and the interface device.

The Supporting software and communication devices are responsible for communication and data transfer between other units of the user interface, such that presented information includes original data, input data or interpreted actions produces as a result of the interface devices, in such a fashion that the combined data is optionally presented by the display device to the user/users.

Optionally, the combined data is presented in real-time on a still 3D image or a dynamic image.

Optionally, the image is 2D.

Optionally the image is holographic.

Optionally, the Supporting software and communication devices can communicate with other systems such as a robot for performing tasks in space, for example according to a path or other indications received from a user via the 3D interface.

Optionally, the communication transfers data or part of the data to a remote display device.

Optionally, the communication transfers data or part of the data to remote other systems which use the data, allowing interaction within the "in air" image to be exploited in remote systems, whether distant or near by.

Optionally, data is sent via RF.

Optionally data is sent via wired physical layers.

Optionally, two (or more) different users interact with the same volumetric or 2D "in air" image in the same location using the same device (system and display).

Optionally, two (or more) different users interact with the same volumetric or 2D "in air" image in different locations using separate yet communicated devices (system and display).

Example Applications

Some example applications of the user interface of the invention are described below.

"In Air" Marking of a Specific Point

For a projected volumetric image (optionally holographic) a user points to specific locations. By means of auditory and/or button clicking indications, the user marks specific points within the display space. For example, a stylus with a tracking sensor is used, and specific points are marked by the user in the volumetric image. The user interface records the spatial position and/or orientation of the stylus, and saves it in supporting hardware. The saved points are interpreted to a specific voxel or voxels, and the display device optionally presents the points in real time on the volumetric image.

Optionally, the user interface starts with no initial image projected in the display space, and only points subsequently marked by the user/s appear in the display space.

While the image is projected, the user interface enables capturing a point in display space by "touching" that specific point, also termed voxel, in the image. Optionally a proximity to the point enables the capture by a predefined "cloud" surrounding the point, so that a user does not have to touch an exact location, so for example using a human hand has some tolerance for inaccuracy.

Optionally, the display device projects specific marked points, which a user can optionally "grab" once the user points close enough, then the user can press a button on a pointing tool to "grab" the point.

Optionally, "marking" an image allows for "tagging' of a marked area so that in case of a dynamic image, the marked area may be isolated and movement of the marked area is optionally tracked over time. An example is tracking mitral valve leaflets, which are optionally tagged by the interface device. An untagged portion of the displayed image is optionally removed, and the dynamic valve leaflets are optionally tracked and studied specifically. Tagging is optionally performed pre- and post-medical intervention, and images are optionally overlaid to compare and evaluate efficacy of the medical intervention. Such tagging is optionally applied to other static and/or dynamic parts of an image including heart muscle pre- and post-resynchronization, electrophysiological pathways pre- and post-ablation, and so on.

Additional examples of "in air marking" include:

a tool for human-aided edge correction, optionally following edge recognition performed by supporting software, which is useful for medical imaging such as ultrasound-based diagnostics, interventional cardiology procedures and so on.

marking a location in an organ;

marking a location of a tumor;

marking a location in a space in a body for proposed implantation of a device, organ, and therapeutic intervention; and marking a position outside of a body, organ, which is referenced to a fixed point in the space or organ, and which maintains the relationship during movement of the body or organ or movement outside the body or organ, such as ECG gating, or respiration.

"In air" marking of a specific point enables "closing of the loop": from eye to hand; from hand to user interface; from user interface to display; and from display to eye, in an intuitive and precise manner by a viewer of the spatial image. Later on, a marked point or area may be transferred to and used by other systems dealing with the spatial area of interest. Examples can be, focused radiation on specific area for a tumor, robot or tool to perform ablation on specific point marked on an organ and so on.

Volume and Length Quantification

For an image projected, for example a bone tissue, the user optionally marks one end of a bone image, and then another end of the bone image. The user interface system indicates the marked points and by means of calculation via a software module the length of the bone is optionally calculated.

If a length of a path is required, the user optionally marks more than two points, and the path length is optionally calculated. Optionally, a continuous path is drawn by the user, and the user interface system calculates the length of the continuous path.

In order to quantify a volume, several points on the volume contour, for example 10 points, are optionally marked by the user, and the user interface software optionally calculates the volume between the points. Optionally, the software extrapolates measurements and displays a continuous volume, close in shape to an object marked by the points, and calculate the volume. Optionally the shape calculated is presented in real-time on the image, allowing the user to perform edge-correction by moving the calculated shape edges to edges of the real shape, allowing fine-tuning of the volume and quantification of the volume.

Optionally the projected image is projected with a 1:1 scaling. Optionally the projected image is magnified or presented smaller, optionally per user input. The user interface system optionally defines the scaling, so measurements can be made on an object displayed at various scales, and the user interface system optionally outputs absolute measurements using the scaling factor.

"In air" marking of a specific point enables in-air quantification of lengths, distances and volumes. The user marks 2 points in order for the system to calculate lengths or distances, or marks a plurality of points for the user interface system to calculate volume.

In the medical field there are accepted normal surface areas and volumes of different organs, sometimes calculated according to height, weight, and/or body surface area. The areas or volumes are expressed in ml, 1, cm squared or cubed, and are typically expressed in ranges with standard deviations and as Z values etc. Optionally, the user interface system projects the normal areas or volumes, static or dynamic, stand-alone and/or along with an actual image of the organ, static or dynamic, taken from a CT, a MRI, or other such modality for generating actual or calculated images, such as lung volumes.

Some example uses for quantification are listed below.

In the field of cardiology, quantifying an ejection fraction based on volume of a beating heart.

In the field of pulmonology, volumetric analyses of lung function.

Comparing true volumes of organs to predicted volumes of the organs, based on standard references.

In the field of obstetrics, diagnosing fetuses based on area and/or volume quantification of fetus organs or the fetus body.

Other fields where volumetric quantification is useful include Orthopedics, and Oncology, for example for mapping and measuring tumors.

A Frame-Like Interface Device

Users of the user interface, such as physicians, often wish to view specific planes within a volumetric image. The specific planes to be viewed can be of various orientations and locations. A method of a natural, for humans, selection of a specific plane, is described with reference to the user interface of the invention.

A volumetric image is projected, and a position and orientation of an interface device optionally defines a plane in the 3D volumetric image, as described below.

A plane frame, optionally with a diagonal length about the length of the longer axis of the image, is used. The plane can be made as a "wire-frame", that is, an outline, or as a piece of transparent material, optionally glass or polycarbonate. Markers may optionally be placed on frame edges, for example IR LEDs on corners. A user literally inserts the frame in the projected image, and indicates a specific plane in the projected image, or a frame within the plane. Data included in the specific plane or frame is processed and the specific plane or frame may optionally be projected on the volumetric display and/or on a regular 2D display.

Optionally, a continuous movement of the frame in the image produces a continuous stream of plane images on the same display or on corresponding 2D display/s.

Optionally, the volumetric display "crops" the image plane at limits of the frame.

Optionally, the frame can be of any size and shape which defines a plane. Optionally, the frame can be a three dimensional frame defining a three dimensional shape within the image.

Optionally, the marking of the plane allows for 'tagging' of the marked plane. Optionally in case of a dynamic projected image, the marked area is optionally isolated and movement of the marked area is tracked over time.

A non-limiting example use of the user interface includes, when using 3D rotational angiography (3DRA), during a trans-catheter procedure, a physician optionally choosing a specific plane for viewing on the 2D display, extracted from the volumetric image "floating" in front of the physician, and defined by the frame-like interface.

In-Air Image Manipulation Interface

For a presented volumetric image, a user optionally marks a point on the image or on the image contour, and by a gesture or some other point marking method, defines a rotation of the image in a specific direction. Optionally, the user marks two points, and causes the image to rotate such that the rotation axis is the axis defined by a line defined by the two points. The above-described manipulation is optionally performed based, at least partly, on receipt of the marked points, interpretation of the marked points by software and/or hardware, defining an image to be projected by the display, and optionally based on a specific "command", such as "rotate", provided by the user. The corresponding images are optionally rendered and presented via the display. Optionally this action is performed in real-time.

Optionally, the user defines a plane or a frame by marking three or more points in a displayed object, and "slices" the object so that only the plane or the frame are projected. Optionally, the user chooses to crop the image on either side of the plane, and/or outside the frame. Optionally, the user can repeat the cropping action, thus defining a series of "cropping" planes.

Optionally, per an orientation of the interface device, a real-time line is projected on the image, and the image is optionally cropped according to the "line's" path.

Optionally, per the orientation of the interface device, a real-time line is defined by the user, optionally acting as a symmetry axis around which the image can be rotated.

Optionally, "in air" buttons with indications such as zoom-in and/or zoom-out are displayed, and the user can "touch" the buttons with the interface device.

Optionally, the user uses the frame-like interface to "capture" a portion of the image, optionally when pressing a button or some such form of command. In such a case, the user is optionally able to move all the virtual image with his hand and/or with the frame, "as if" the virtual image is physically connected to the frame. The above-described capability is similar to moving an object which is connected to a stick, and the user optionally moves the object by moving the stick, like moving a popsicle.

"In Air" Navigation

The user interface system optionally receives a location of a location indicator and presents the location in the display space. The system optionally presents the image within which the tool is navigating, for example an image from CT data or a real-time ultrasound image. The system optionally super-imposes an indication of the location of the tool on the image, optionally after scale correlation, optionally from a variety of sources, such a unit for tracking the tool. A user then optionally visually checks if the tool is in the right location or on the right route. In case the tool location is not right, the user can virtually "touch" the tool location indicator within the projected volumetric image, and drag the tool location indicator to the preferred location and/or route. The new coordinates of the location and/or route are recorded by the interface tool and optionally provided to a tool navigation unit.

Optionally, the system which controls location indicator navigation corrects the actual location indicator movement according to the user's indication.

Optionally, a second doctor and/or user manually moves an interface device according to a first user's indications. As the interface device is optionally presented continuously on the image, a control loop is "closed" via visual control by the user.

Optionally, the user draws a path in display space, using an interface device. The system optionally records coordinates of every point in the path. The path coordinates can be used by a separate machine, such as a robot, to control the machine to follow the drawn path.

Optionally, the machine is monitored by a physician and/or automated machinery, optionally using the volumetric display to project the image of the machine, and real-time corrections of the path can be made.

3D Navigation has become an important application in electrophysiology-based cardiac procedures. "In air" navigation optionally allows a user to view a static or a dynamic image, as well as a location indicator and/or a path super-imposed on the image, optionally in real-time. As another example, Electromagnetic 3D navigation is also implemented in Pulmonology/bronchoscopy to provide minimally invasive access to lesions deep in lungs as well as in mediastinal lymph nodes.

The above-mentioned machine which is tracked may also be a tool or an implantable device or therapy, such as a drug; a stent; a catheter; a valve; a combination of permanent or temporary tools; a drug-eluting stent; chemotherapy attached to embolization particles; a device or a sensor which is affected by force or energy outside the body or organ such as radiofrequency or acoustic energy, ultrasound or HIFU; radiofrequency catheters for ablation; and catheters for cryo-ablation.

Remote Surgery

The above-mentioned manipulating of an image of a tool in display space, causing a remote robotic manipulation of a real tool somewhere, enables remote surgery and/or remote navigation through a body.

Optionally, a user manipulates a real tool in a display space of a first volumetric display, which also displays a human body. The manipulation is tracked, and real manipulation is effected onto the real tool at the remote location. Changes to a body at the remote location are picked up by a three dimensional imaging device, and sent to the first volumetric display. The user thus sees images of results of the real manipulation of the real tool.

Optionally, the user manipulates an image of a tool, that is, a virtual tool, in a display space of a first volumetric display, which also displays a human body. The manipulation is tracked, and real manipulation is effected onto the real tool at the remote location. Changes to a body at the remote location, and also changes to the real tool, are picked up by a three dimensional imaging device, and sent to the first volumetric display. The user thus sees images of results of the real manipulation of the real tool on the image of the body, and the image of the tool.

"In Air" Drawing

The present invention, in some embodiments thereof, provides a tool for drawing a point, a line, and/or a path within a volumetrically projected image, and enables a user to see the drawing in real-time. The "in air" drawing optionally provides a collaboration tool between users/physicians, allowing drawing a point or marking a space to allow a discussion on a specific anatomy or area of interest within the image.

Optionally, the "in air" drawing is computationally translated to coordinates of the display space, optionally in real-time. Optionally, the "in air" drawing is computationally translated to coordinates of some other space, optionally to be used by other instruments such as a robot.

A non-limiting example of medical use for "in-air" drawing is a real-time location of specific markers for guidance applications.

Localization of a Virtual Object Inside a Displayed Image

The present invention, in some embodiments thereof, provides a tool for combining an image of a virtual object in a displayed image produced from data from an input source. One use for localization of a virtual object inside a displayed image is optionally simulating equipment selection through displaying volumetric images.

Various tools/objects can be modeled in 3D, the modeling optionally to include dynamic operation.

A user optionally picks a virtual tool/object, and moves the virtual tool/object using a 3D interface within the display space, locating the tool/object in a specific location and orientation. For example, an image of a virtual cardiac valve is optionally generated, similar in size and shape to a specific valve. The user optionally drags the virtual valve onto an image of a patient's heart. The user optionally marks interface points on the image of the heart and corresponding points on the virtual valve. A display computing unit optionally computes a combined image of the heart and the virtual valve, and presents the combination to the user. The users optionally assesses if the valve is in the right location and orientation and, if needed, optionally performs another measurement/indication. The user optionally also assesses if the size of the valve fits.

Optionally, the virtual valve may be dynamic, and superimposed over a dynamic or static image of the heart.

Optionally, simulation of blood flow and tissue movement is predicted, calculated and displayed.

Optionally, the user calls up for display, within the display space, instances from a library of virtual images, each representing a specific actual tool or implant. In cases of expanding tools, such as cardiac stents, the library optionally includes the tools in unexpanded form, in expanded form, and a dynamic representation of the expansion process.

Other non-limiting examples of uses for localization of a virtual object inside a displayed image include valve localization; fitting orthopedic prostheses; fitting intra-cardiac and extra-cardiac prostheses, devices, implantable devices, stents, aortic grafts, stent grafts; and intra-ventricular devices such as ventricular assist devices Localization of an Actual Object Inside an Image The present invention, in some embodiments thereof, provides a tool for combining real objects with an image produced from data from an input source. The combining optionally serves for real equipment selection, such as cardiac valve selection.

A user optionally places a real object, optionally a real object which is later to be inserted to a body, into a displayed image. The real object may be inserted by hand, and/or may be inserted using a tool for holding the real object. The user optionally locates the object within a static or a dynamic image of an organ which is projected in the volumetric "in-air" display. The user/physician optionally thus assesses a way which he wishes to insert the real object into the body, a level of physical matching of the real object with body organs, and so on.

Another non-limiting example of uses for localization of an actual object inside an image includes valve localization.

Interactive Gaming

The insertion of a real object into the display space of a volumetric display enables use of the user interface system for gaming.

By way of a non-limiting example, a user optionally wields a game prop, such as a sword, tool, or some such, in a game with virtual reality display in three dimensions on the volumetric display.

An non-limiting example of a type of game which is supported is virtual sword fighting, with two or more users at two or more different volumetric displays connected by communications, as described above with reference to FIG. 15.

An interesting game which is especially supported by the volumetric display of the present invention is virtual piñata. A first user wields a "stick" within the display space of the volumetric display, and does not see a virtual piñata in the display space. Other users see the virtual piñata in the display space, and see the "stick" which the first user wields. The virtual piñata game may be played at one volumetric display with two or more users around the game, or at two or more volumetric displays.

Another interesting game is the game of "battleship" or "battleships", where each user sees only their own battleships, on a same volumetric display.

Another interesting class of game, based on the ability to insert a real object into the display space, includes games of hand-eye coordination such as pick-up-sticks, and Jenga. The games optionally use virtual game pieces displayed in three dimensions in the volumetric display, and users "grab" the game pieces while reaching into the display space. A tracking device optionally measures a gap between fingers to see when a user has hold of a game piece.

General Comments

It is expected that during the life of a patent maturing from this application many relevant spatial light modulators, hologram generating units, and volumetric displays will be developed and the scope of the corresponding terms is intended to include all such new technologies a priori.

The terms "imaging" and "projecting" are used herein interchangeably.

The term exemplary is used in the meaning of serving as an example, instance, or illustration.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "optionally" is used herein to mean "is provided in some embodiments and not provided in other embodiments". Any particular embodiment of the invention may include a plurality of "optional" features unless such features conflict.

As used herein, the singular form "a", "an" and "the" is used to denote "at least one", thus explicitly disclosing both "one" and "more than one", unless the context clearly dictates otherwise. For example, the term "a mirror" may include a plurality of mirrors.

As used herein the term "about" refers to ±10%.

Ranges are provided herein interchangeably in two equivalent formats: "from X to Y" and "between X and Y", and in both case cover X, Y, and any number between them.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for displaying a hologram to a variable direction comprising:
   using circuitry to determine a direction from a holographic projector to a viewer for projecting a hologram to a viewer; and
   projecting a hologram in the determined direction,
   in which the projecting the hologram is controlled so that when the direction of the viewer changes, the projecting the hologram changes such that a displayed scene appears to the viewer at a static orientation in space.

2. The method of claim 1 in which the determining the direction to the viewer comprises using at least some of a shared optical axis which the projecting a hologram uses.

3. The method of claim 1 in which the determining the direction to the viewer comprises using at least some optical elements also used by the projecting a hologram.

4. The method of claim 1 in which;
   the projecting the hologram comprises reflecting from a same mirror as the determining the direction to the viewer; and
   the mirror is controllable in direction so as to track the viewer.

5. The method of claim 4 in which the mirror is fully reflective.

6. The method of claim 1 in which the projecting the hologram comprises projecting a modified hologram, the modifying based, at least in part, on the direction of the projecting.

7. The method of claim 1 in which:
   the using circuitry to determine the direction of the viewer comprises determining a direction of a plurality of viewers; and
   the projecting the hologram in the determined direction comprises projecting in a plurality of directions, associated with the plurality of viewers.

8. The method of claim 7 in which each eye of each viewer is tracked separately.

9. The method of claim 1 in which the projecting a hologram comprises projecting a Computer Generated Hologram (CGH).

10. Apparatus for displaying a hologram to a variable direction comprising:
    a hologram projection unit; and
    a viewer tracking unit for determining a direction from the apparatus to a viewer, using a mirror for determining said direction by reflection off the mirror; and
    a computer that controls the hologram projection unit to project a hologram in the determined direction,
    in which the viewer tracking unit tracks the viewer by reflection off the mirror and through additional optical components located between the mirror and the viewer, and said additional optical components are also used for projecting the hologram.

11. The apparatus of claim 10 in which the hologram projection unit and the viewer tracking unit share a common optic axis for at least part of an optic path.

12. The apparatus of claim 10 in which the hologram projection unit and the viewer tracking unit share common optic elements for at least part of an optic path.

13. The apparatus of claim 10 in which the hologram projection unit uses a mirror for projecting the hologram by reflection off a same mirror as the viewer tracking unit uses for determining said direction.

14. The apparatus of claim 10 in which the mirror is fully reflective.

15. The apparatus of claim 10 in which the viewer tracking unit is mounted rotatably relative to the mirror, and the computer determines the direction of the viewer by detecting when a reflection of light off the mirror coming from a viewer arrives at the viewer tracking unit.

16. The apparatus of claim 10 in which the hologram projection unit is mounted rotatably relative to the mirror, and the computer controls timing of the projecting the hologram to the viewer based, at least in part, on the determining of the direction of the viewer.

17. The apparatus of claim 10 in which the mirror is movable and the computer controls movement of the mirror.

18. The apparatus of claim 10 in which the mirror is a rotating mirror and the computer determines the direction of the viewer by detecting when a reflection of the mirror from a viewer arrives at the viewer tracking unit.

19. The apparatus of claim 13 in which the mirror is a rotating mirror and the computer controls timing of the projecting the hologram to the viewer based, at least in part, on the determined direction of the viewer.

20. The apparatus of claim 10 and further comprising an eyepiece, the eyepiece comprising a mirror shaped on an inner surface of a hollow body of revolution, and the eyepiece being on an optical path between the viewer and the hologram projection unit and the viewer tracking unit.

21. The apparatus of claim 20 in which the eyepiece mirror forms a complete 360 degree ring.

22. The apparatus of claim 20 in which the viewer tracking unit is within the eyepiece mirror.

23. The apparatus of claim 10 in which the hologram projection unit is a Computer Generated Hologram (CGH) projection unit.

* * * * *